United States Patent
Legerton et al.

(10) Patent No.: US 7,040,755 B2
(45) Date of Patent: May 9, 2006

(54) CONTACT LENS AND METHODS OF MANUFACTURE AND FITTING SUCH LENSES AND COMPUTER PROGRAM PRODUCT

(75) Inventors: Jerome A. Legerton, San Diego, CA (US); William E. Meyers, Mesa, AZ (US)

(73) Assignee: CRT Technology, Inc., Mesa, AZ (US)

( * ) Notice: Subject to any disclaimer, the term of this patent is extended or adjusted under 35 U.S.C. 154(b) by 558 days.

(21) Appl. No.: 09/894,351

(22) Filed: Jun. 27, 2001

(65) Prior Publication Data

US 2002/0159025 A1 Oct. 31, 2002

Related U.S. Application Data

(60) Provisional application No. 60/214,554, filed on Jun. 27, 2000.

(30) Foreign Application Priority Data

Oct. 20, 2000 (CN) ............................. 00129863 A

(51) Int. Cl.
*G02C 7/04* (2006.01)
(52) U.S. Cl. .................................. 351/160 R; 351/177
(58) Field of Classification Search ............ 351/160 R, 351/177, 160 H, 161, 162; 606/5
See application file for complete search history.

(56) References Cited

U.S. PATENT DOCUMENTS

| | | | |
|---|---|---|---|
| 3,270,099 A | 8/1966 | Camp | |
| 4,297,008 A * | 10/1981 | Woodford | 351/177 |
| 4,787,732 A | 11/1988 | Siviglia | |
| 4,952,045 A | 8/1990 | Stoyan | |
| 5,191,365 A | 3/1993 | Stoyan | |
| 5,270,051 A * | 12/1993 | Harris | 424/427 |
| 5,349,395 A | 9/1994 | Stoyan | |
| 5,428,412 A | 6/1995 | Stoyan | |
| 5,436,678 A | 7/1995 | Carroll | |
| 5,626,865 A | 5/1997 | Harris et al. | |
| 5,690,123 A | 11/1997 | Medina | |
| 5,691,797 A | 11/1997 | Seidner et al. | |
| 5,695,509 A | 12/1997 | El Hage | |
| 5,788,957 A | 8/1998 | Harris | |
| 5,835,187 A | 11/1998 | Martin | |
| 5,880,809 A | 3/1999 | Lieberman et al. | |
| 5,929,968 A | 7/1999 | Cotie et al. | |
| 5,929,969 A | 7/1999 | Roffman | |
| 5,941,874 A | 8/1999 | Hohla | |
| 5,953,098 A * | 9/1999 | Lieberman et al. | 351/160 R |

(Continued)

*Primary Examiner*—Scott J. Sugarman
(74) *Attorney, Agent, or Firm*—Hahn Loeser & Parks, LLP

(57) ABSTRACT

The invention is directed to a contact lens design and methods of manufacturing, fitting and using such lenses. The contact lens may be designed for use in a corneal refractive therapy (CRT) program. The lens provides a design which allows proper fitting of a patient, whether for corrective contact lenses or for a CRT program. Due to the rational design of the lenses according to the present invention, a minimal number of lens parameter increments can be identified to cover the range of common corneas. It is therefore possible to provide pre-formed lens buttons or blanks which are easily formed into a final design, thereby simplifying and speeding up the treatment process. Further, any adjustment of the lens design which may be required based upon trial fitting or the like, is easily envisioned and implemented by the fitter.

35 Claims, 45 Drawing Sheets

U.S. PATENT DOCUMENTS

| | | |
|---|---|---|
| 5,963,297 A | 10/1999 | Reim |
| 5,964,775 A | 10/1999 | Gordon et al. |
| 6,010,219 A | 1/2000 | Stoyan |
| 6,099,121 A | 8/2000 | Chapman et al. |
| 6,132,735 A | 10/2000 | Harris et al. |
| 6,161,544 A | 12/2000 | DeVore et al. |
| 6,199,982 B1 | 3/2001 | Oyama et al. |
| 6,241,355 B1 * | 6/2001 | Barsky ..................... 351/177 |
| 6,305,802 B1 | 10/2001 | Roffman et al. |
| 6,361,169 B1 | 3/2002 | Tung |

\* cited by examiner

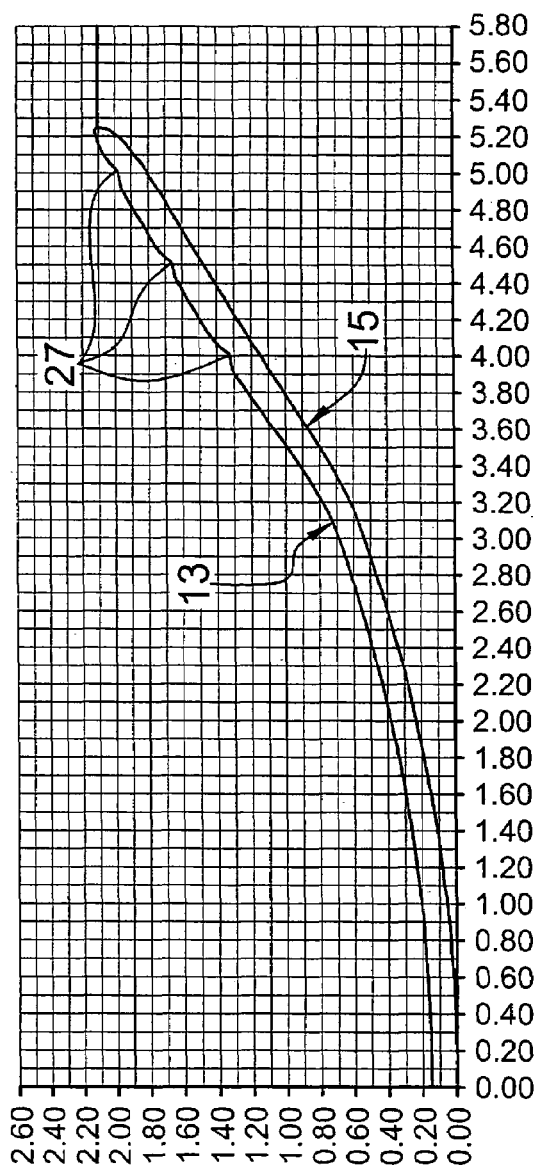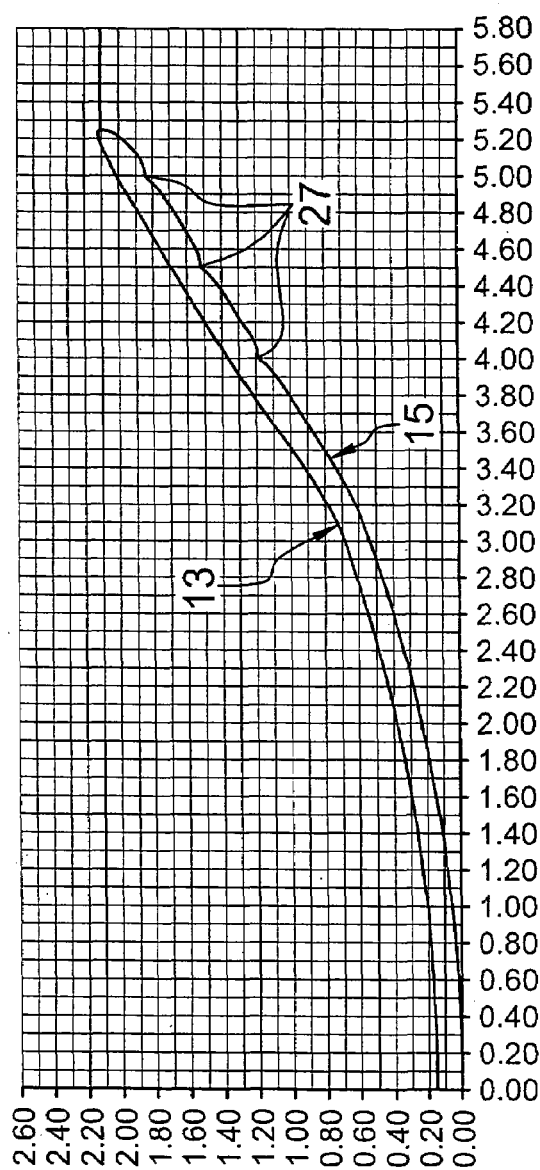
FIG. 4A
FIG. 4B

FIG. 9A

| | | | | |
|---|---|---|---|---|
| BC | selected bc (6.9-10.4/0.1) x 208 (7.70-9.1/.05) | 8.40 | Suggested Base Curve is 8.4 | |
| J1 | Radial distance (OZ/2) from the lens 210 center to 1st junction mm (1.0-5.9/0.1) | 3.00 | 1 | corneal apical radius (mm) |
| SW | Width of the S curve mm (.75,1) | 1.00 | EYE | 7.58 |
| MAT | 212 Lens material (FP30, FP60, FP92, FP151, HDS, Other) | HDS | Ref. Index of material used = 1.449 If 'other' was selected input R1 in Cell H4 | Volume between BC and cornea (uL) = 0.994 |
| P | lens power desired (-1.00, -0.50, 0.00, 0.50, 0.75, 1.0, 1.25, 1.5, 2.0, 2.5) | 214 0.50 | Front Surface central radius = 8.37 | Volume between S curve and cornea (uL) = 1.739 |
| Δ1 | Delta R (mm) translation of 1st junction radially from BC origin (0.08-0.2/0.02) | 222 0.14 | True center thickness (mm) = 0.152  224 | Volume between pretouch Landing Zone and cornea (uL) = 0.718 |
| Δ2 | Delta R (mm) translation of 2nd junction radially from BC origin (0.1-0.22/0.02) | 0.18 | True offset between landing zones at J2 = 0.179 | TOTAL VOLUME = 3.451(uL) |
| A | Angle of the landing zone (-25.5 to -50.0/.5) | 216 -35.00 | Present lens height (mm) above cornea at diameter of tangential touch = 0.040 | Diameter where LZ would make tangential touch = 9.08 |
| D | selected lens diameter mm (8.0-12.9/0.1) | 209 10.50 | Diameter 206 recommended from HVID = 10.6 | Dia giving desired LZ lift = 10.42 |
| SD | Selected depth of the S curve mm (.15-1.0/.05) x (0.3-0.65/.025) use next smaller than est. | 0.500 | Recommended depth (mm) S curve for desired correction @6u/D = 0.510 mm | Edge lift at selected diameter = 0.094 |

| BC | 200 | 202 | 204 |
|---|---|---|---|
| J1 | lens / cornea power (D) difference wanted | ellipticity of the cornea | HVID (mm) |
| SW | -4.50 | 0.5 | 11.6 |
| MAT | Actual power (D) difference between bc and apical cornea = -4.35 | Desired edge lift (mm) when landed at full Diameter = 0.083 | 1.45 |
| P | Recommended diameter for lentic = 8.024 | Ab, the long axis of the ellipse creating the base curve edge (below) | FOR SPHERICAL FRONTS target edge thickness (below) |
| Δ1 | Recommended radius of curve for lentic = 8.106 | 0.40 | 0.18 |
| Δ2 | Origin for lentic curve is on y axis displaced from apex of front curve = 8.068 | Af, the long axis of the ellipse creating the front curve edge (below) | SPHERICAL FRONTS- max thickness peripheral to J1 before lentic (in mm>Delta 2) see below |
| A | Estimated elevation at J2 = 0.070 | 0.40 | 0.01 |
| D | fixed (tear thickness) | base to front at which the transition from base ellipse to front ellipse is found (below) | Minimum thickness peripheral to J1 before lentic (in mm>Delta 1) see below |
| SD | 0.006 | 0.25 | 0.01 |

FIG. 14A

| | | | | | |
|---|---|---|---|---|---|
| BC | selected bc (6.9-10.4/0.1) x (7.70-9.1/.05) | 8.90 | Suggested Base Curve is 8.9 | | |
| J1 | Radial distance (OZ/2) from the lens center to 1st junction mm (1.0-5.9/0.1) | 3.00 | 2B | corneal apical radius (mm) | |
| SW | Width of the S curve mm (.75,1) | 1.00 | EYE | | 8.03 |
| MAT | Lens material (FP30, FP60, FP92, FP151, HDS, Other) | HDS | Ref. Index of material used = 1.449 If 'other' was selected input R1 in Cell H4 | Volume between BC and cornea (uL) = 0.926 | |
| P | lens power desired (-1.00, -0.50, 0.00, 0.50, 0.75, 1.0, 1.25, 1.5, 2.0, 2.5) | 0.50 | Front Surface central radius = 8.88 | Volume between S curve and cornea (uL) = 1.742 | |
| Δ1 | Delta R (mm) translation of 1st junction radially from BC origin (0.08-0.2/0.02) | 232 0.20 | True center thickness (mm) = 0.214 | Volume between pretouch Landing Zone and cornea (uL) = 0.867 | |
| Δ2 | Delta R (mm) translation of 2nd junction radially from BC origin (0.1-0.22/0.02) | 0.12 | True offset between landing zones at J2 = 0.119 | TOTAL VOLUME = 3.534(uL) | |
| A | Angle of the landing zone (-25.5 to -50.0/.5) | -33.00 | Present lens height (mm) above cornea at diameter of tangential touch = 0.041 | Diameter where LZ would make tangential touch = 9.26 | |
| D | selected lens diameter mm (8.0-12.9/0.1) | 10.40 | Diameter recommended from HVID = 10.4 | Dia giving desired LZ lift = 10.68 | |
| SD | Selected depth of the S curve mm (.15-1.0/.05) x (0.3-0.65/.025) use next smaller than est. | 0.450 | Recommended depth (mm) S curve for desired correction @6u/D = 0.457 mm | Edge lift at selected diameter = 0.071 | |

FIG. 14B

| BC | | 230 | |
|---|---|---|---|
| J1 | lens / cornea power (D) difference wanted | ellipticity of the cornea | HVID (mm) |
| SW | -4.00 | 0.6 | 11.4 |
| MAT | Actual power (D) difference between bc and apical cornea = -4.11 | Desired edge lift (mm) when landed at full Diameter = 0.08 | 1.45 |
| P | Recommended diameter for lentic = 6.006 | Ab, the long axis of the ellipse creating the base curve edge (below) | FOR SPHERICAL FRONTS target edge thickness (below) |
| Δ1 | Recommended radius of curve for lentic = 8.457 | 0.40 | 0.18 |
| Δ2 | Origin for lentic curve is on y axis displaced from apex of front curve = 8.430 | Af, the long axis of the ellipse creating the front curve edge (below) | SPHERICAL FRONTS- max thickness peripheral to J1 before lentic (in mm>Delta 2) see below |
| A | Estimated elevation at J2 = 0.075 | 0.40 | 0.01 |
| D | fixed (tear thickness) | base to front at which the transition from base ellipse to front ellipse is found (below) | Minimum thickness peripheral to J1 before lentic (in mm>Delta 1) see below |
| SD | 0.006 | 0.25 | 0.01 |

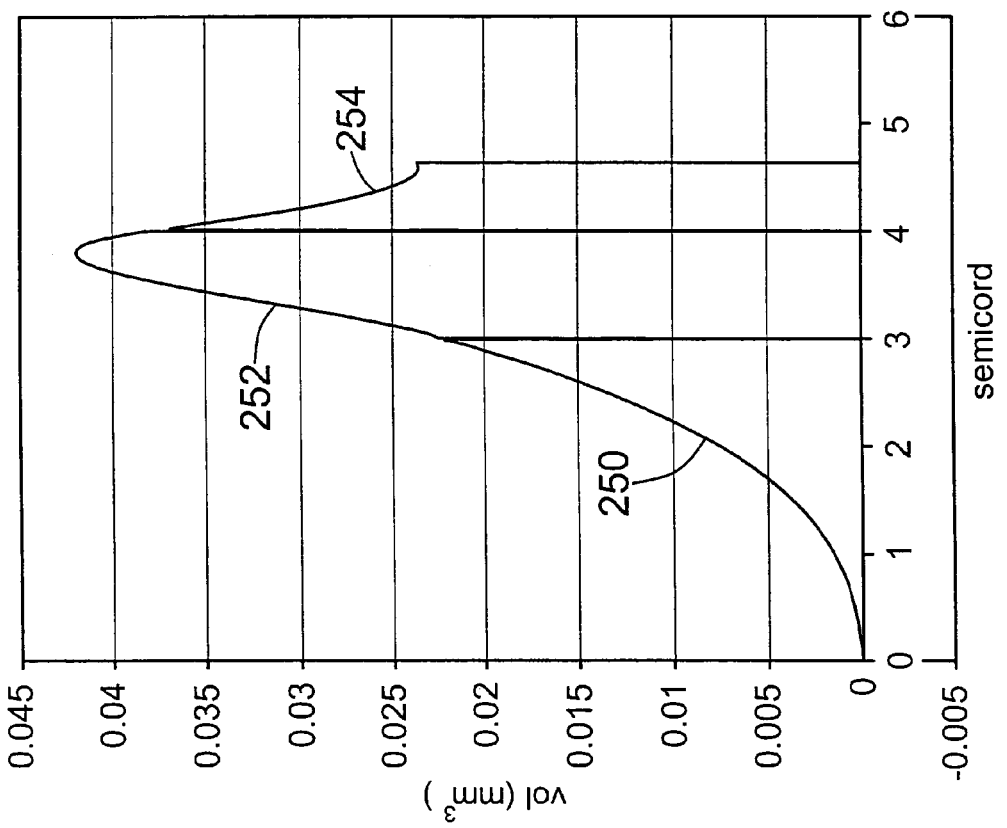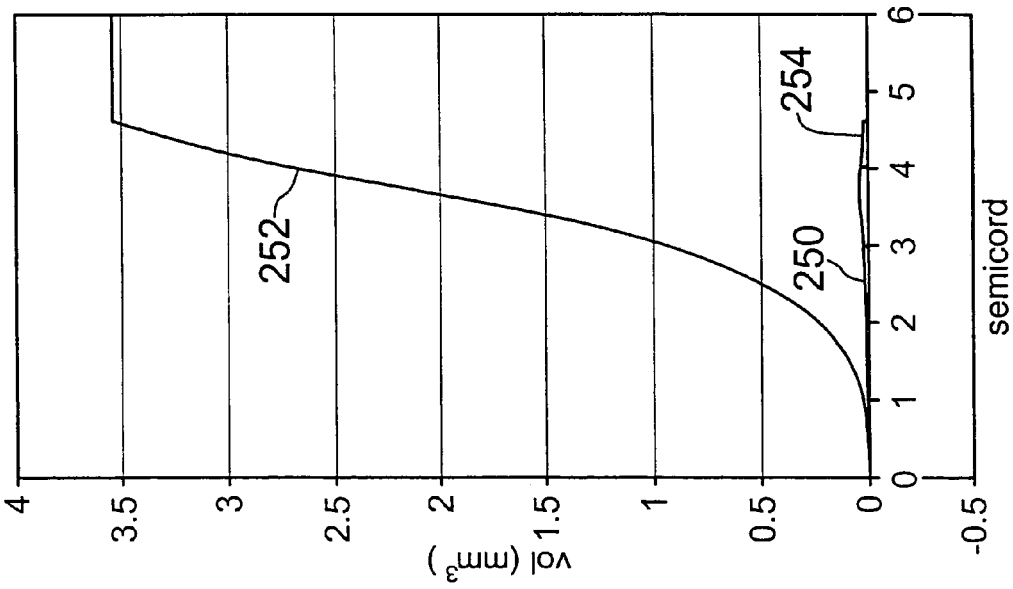
FIG. 16

FIG. 19A

| BC | selected bc (6.9-10.4/0.1) x (7.70-9.1/.05) | 8.35 | Suggested Base Curve is 8.3 | |
|---|---|---|---|---|
| J1 | Radial distance (OZ/2) from the lens center to 1st junction mm (1.0-5.9/0.1) | 210 2.50 | 3B | corneal apical radius (mm) |
| SW | Width of the S curve mm (.75,1) | 2.00 | EYE | 7.25 |
| MAT | 212 Lens material (FP30, FP60, FP92, FP151, HDS, Other) | HDS | Ref. Index of material used = 1.449 If 'other' was selected input R1 in Cell H4 | Volume between BC and cornea (uL) = 0.699 |
| P | lens power desired (-1.00, -0.50, 0.00, 0.50, 0.75, 1.0, 1.25, 1.5, 2.0, 2.5) | 214 0.50 | Front Surface central radius = 8.32 | Volume between S curve and cornea (uL) = 2.812 |
| Δ1 | Delta R (mm) translation of 1st junction radially from BC origin (0.08-0.2/0.02) | 0.14 | True center thickness (mm) = 0.148 | Volume between pretouch Landing Zone and cornea (uL) = 0.122 |
| Δ2 | Delta R (mm) translation of 2nd junction radially from BC origin (0.1-0.22/0.02) | 0.18 | True offset between landing zones at J2 = 0.179 | TOTAL VOLUME = 3.633(uL) |
| A | Angle of the landing zone (-25.5 to -50.0/.5) | -38.00 | Present lens height (mm) above cornea at diameter of tangential touch = 0.038 | Diameter where LZ would make tangential touch = 9.21 |
| D | selected lens diameter mm (8.0-12.9/0.1) | 10.20 | Diameter recommended from HVID = 10.2 | Dia giving desired LZ lift = 10.53 |
| SD | Selected depth of the S curve mm (.15-1.0/.05) x (0.3-0.65/.025) use next smaller than est. | 1.116 | Recommended depth (mm) S curve for desired correction @6u/D = 1.116 mm | Edge lift at selected diameter = 0.071 |

FIG. 19B

| BC | 200 | 202 | 204 |
|---|---|---|---|
| J1 | lens / cornea power (D) difference wanted | ellipticity of the cornea | HVID (mm) |
| SW | -6.12 | 0.4 | 11.2 |
| MAT | Actual power (D) difference between bc and apical cornea = -6.13 | Desired edge lift (mm) when landed at full Diameter = 0.09272 | 1.45 |
| P | Recommended diameter for lentic = 6.784 | Ab, the long axis of the ellipse creating the base curve edge (below) | FOR SPHERICAL FRONTS target edge thickness (below) |
| Δ1 | Recommended radius of curve for lentic = 7.615 | 0.40 | 0.18 |
| Δ2 | Origin for lentic curve is on y axis displaced from apex of front curve = 7.541 | Af, the long axis of the ellipse creating the front curve edge (below) | SPHERICAL FRONTS- max thickness peripheral to J1 before lentic (in mm>Delta 2) see below |
| A | Estimated elevation at J2 = 0.040 | 0.40 | 0.01 |
| D | fixed (tear thickness) | base to front at which the transition from base ellipse to front ellipse is found (below) | Minimum thickness peripheral to J1 before lentic (in mm>Delta 1) see below |
| SD | 0.006 | 0.25 | 0.01 |

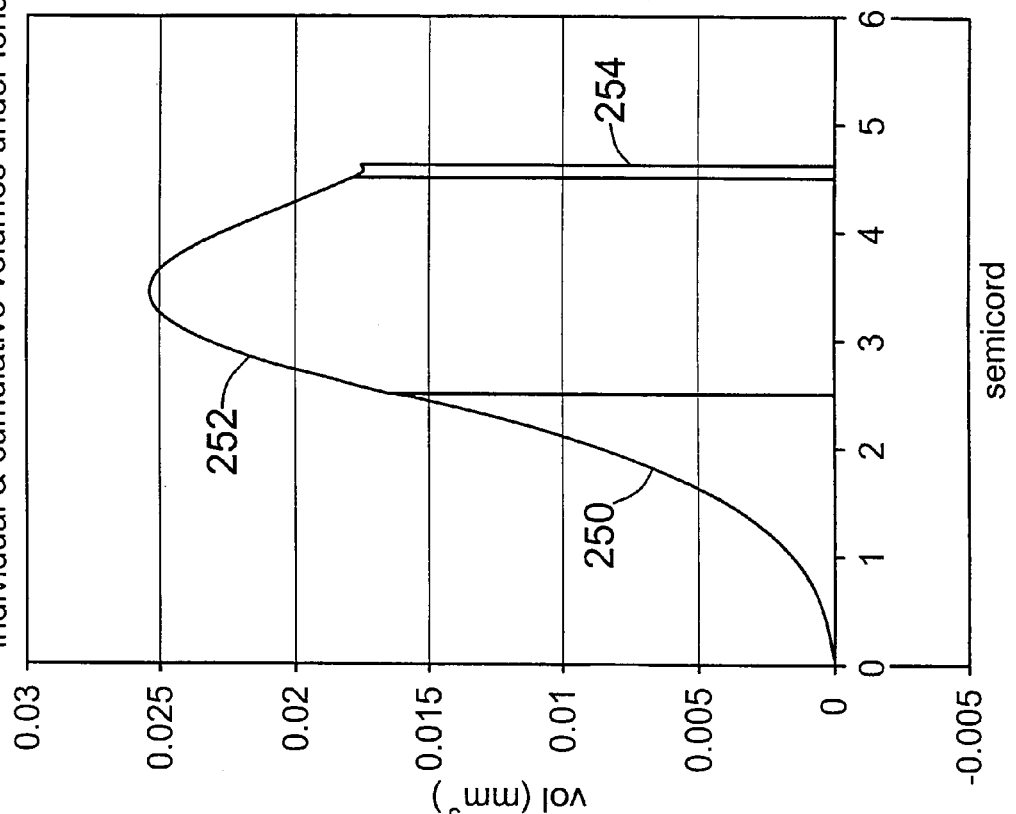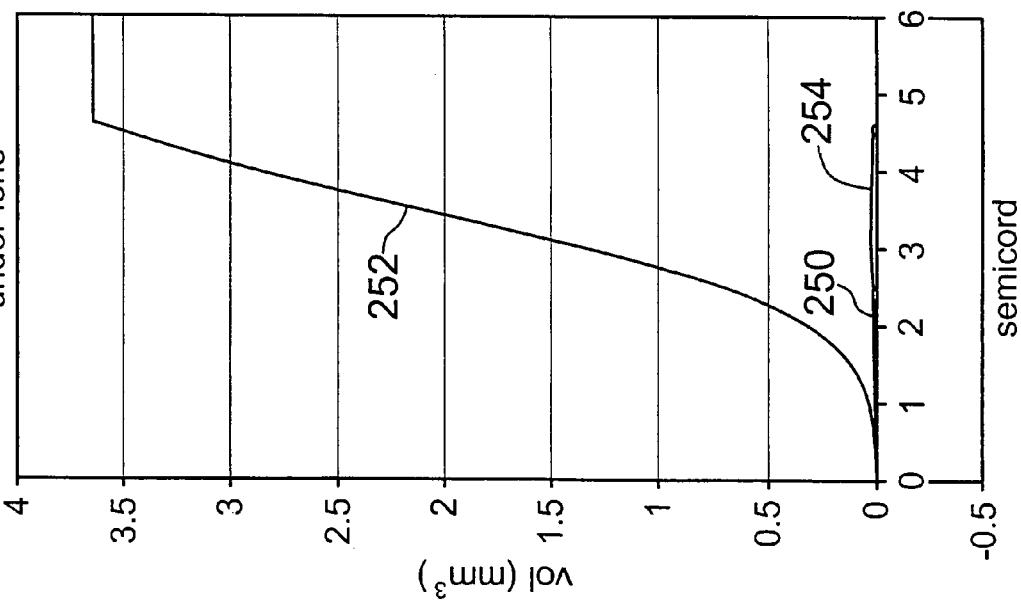
FIG. 21

FIG. 24A

| | | | | |
|---|---|---|---|---|
| BC | selected bc (6.9-10.4/0.1) x (7.70-9.1/.05) | 9.30 | Suggested Base Curve is 9.3 | |
| J1 | Radial distance (OZ/2) from the lens center to 1st junction mm (1.0-5.9/0.1) | 3.00 | 4B | corneal apical radius (mm) |
| SW | Width of the S curve mm (.75,1) | 1.00 | EYE | 8.13 |
| MAT | Lens material (FP30, FP60, FP92, FP151, HDS, Other) | HDS | Ref. Index of material used = 1.449 If 'other' was selected input R1 in Cell H4 | Volume between BC and cornea (uL) = 1.213 |
| P | lens power desired (-1.00, -0.50, 0.00, 0.50, 0.75, 1.0, 1.25, 1.5, 2.0, 2.5) | 0.50 | Front Surface central radius = 9.24 | Volume between S curve and cornea (uL) = 2.389 |
| Δ1 | Delta R (mm) translation of 1st junction radially from BC origin (0.08-0.2/0.02) | 222   0.08 | True center thickness (mm) = 0.088 | Volume between pretouch Landing Zone and cornea (uL) = 1.360 |
| Δ2 | Delta R (mm) translation of 2nd junction radially from BC origin (0.1-0.22/0.02) | 242   0.22 | True offset between landing zones at J2 = 0.217 | TOTAL VOLUME = 4.963(uL) |
| A | Angle of the landing zone (-25.5 to -50.0/.5) | -35.00 | Present lens height (mm) above cornea at diameter of tangential touch = 0.050 | Diameter where LZ would make tangential touch = 9.47 |
| D | selected lens diameter mm (8.0-12.9/0.1) | 209   10.90 | Diameter recommended from HVID = 10.9 | Dia giving desired LZ lift = 10.69 |
| SD | Selected depth of the S curve mm (.15-1.0/.05) x (0.3-0.65/.025) use next smaller than est. | 0.450 | Recommended depth (mm) S curve for desired correction @6u/D = 0.462 mm | Edge lift at selected diameter = 0.107 |

FIG. 24B

| BC | | | |
|---|---|---|---|
| J1 | lens / cornea power (D) difference wanted | ellipticity of the cornea | HVID (mm) |
| SW | -5.25 | 0.3 | 11.9 |
| MAT | Actual power (D) difference between bc and apical cornea = -5.22 | Desired edge lift (mm) when landed at full Diameter = 0.0875 | 1.45 |
| P | Recommended diameter for lentic = 9.791 | Ab, the long axis of the ellipse creating the base curve edge (below) 244 | FOR SPHERICAL FRONTS target edge thickness (below) 243 |
| Δ1 | Recommended radius of curve for lentic = 10.059 | 2.00 | 0.18 |
| Δ2 | Origin for lentic curve is on y axis displaced from apex of front curve = 10.191 | Af, the long axis of the ellipse creating the front curve edge (below) | SPHERICAL FRONTS- max thickness peripheral to J1 before lentic (in mm>Delta 2) see below |
| A | Estimated elevation at J2 = 0.106 | 2.00 | 0.01 |
| D | fixed (tear thickness) | base to front at which the transition from base ellipse to front ellipse is found (below) 245 | Minimum thickness peripheral to J1 before lentic (in mm>Delta 1) see below |
| SD | 0.006 | 0.40 | 0.01 |

FIG. 30A

| | | | | |
|---|---|---|---|---|
| BC | selected bc (6.9-10.4/0.1) x (7.70-9.1/.05) | 8.40 | Suggested Base Curve is 8.4 | |
| J1 | Radial distance (OZ/2) from the lens center to 1st junction mm (1.0-5.9/0.1) | 3.00 | 5B | corneal apical radius (mm) |
| SW | Width of the S curve mm (.75,1) | 1.00 | EYE | 7.75 |
| MAT | Lens material (FP30, FP60, FP92, FP151, HDS, Other) | HDS | Ref. Index of material used = 1.449 If 'other' was selected input R1 in Cell H4 | Volume between BC and cornea (uL) = 0.748 |
| P | lens power desired (-1.00, -0.50, 0.00, 0.50, 0.75, 1.0, 1.25, 1.5, 2.0, 2.5) | 0.50 | Front Surface central radius = 8.36 | Volume between S curve and cornea (uL) = 1.195 |
| Δ1 | Delta R (mm) translation of 1st junction radially from BC origin (0.08-0.2/0.02) | 222 0.10 | True center thickness (mm) = 0.110 | Volume between pretouch Landing Zone and cornea (uL) = 0.439 |
| Δ2 | Delta R (mm) translation of 2nd junction radially from BC origin (0.1-0.22/0.02) | 242 0.10 | True offset between landing zones at J2 = 0.100 | TOTAL VOLUME = 2.382(uL) |
| A | Angle of the landing zone (-25.5 to -50.0/.5) | -32.50 | Present lens height (mm) above cornea at diameter of tangential touch = 0.027 | Diameter where LZ would make tangential touch = 8.99 |
| D | selected lens diameter mm (8.0-12.9/0.1) | 10.00 | Diameter recommended from HVID = 10 | Dia giving desired LZ lift = 10.59 |
| SD | Selected depth of the S curve mm (.15-1.0/.05) x (0.3-0.65/.025) use next smaller than est. | 0.475 | Recommended depth (mm) S curve for desired correction @6u/D = 0.478 mm | Edge lift at selected diameter = 0.048 |

FIG. 30B

| BC | | | |
|---|---|---|---|
| J1 | lens / cornea power (D) difference wanted | ellipticity of the cornea | HVID (mm) |
| SW | -3.50 | 0.7 | 11 |
| MAT | Actual power (D) difference between bc and apical cornea = -3.37 | Desired edge lift (mm) when landed at full Diameter = 0.077 | 1.45 |
| P | Recommended diameter for lentic = 7.735 | Ab, the long axis of the ellipse creating the base curve edge (below) | FOR SPHERICAL FRONTS target edge thickness (below) |
| Δ1 | Recommended radius of curve for lentic = 9.295 | 0.40 | 0.18 |
| Δ2 | Origin for lentic curve is on y axis displaced from apex of front curve = 9.400 | Af, the long axis of the ellipse creating the front curve edge (below) | SPHERICAL FRONTS- max thickness peripheral to J1 before lentic (in mm>Delta 2) see below |
| A | Estimated elevation at J2 = 0.047 | 0.40 | 0.01 |
| D | fixed (tear thickness) | base to front at which the transition from base ellipse to front ellipse is found (below) | Minimum thickness peripheral to J1 before lentic (in mm>Delta 1) see below |
| SD | 0.006 | 0.25 | 0.01 |

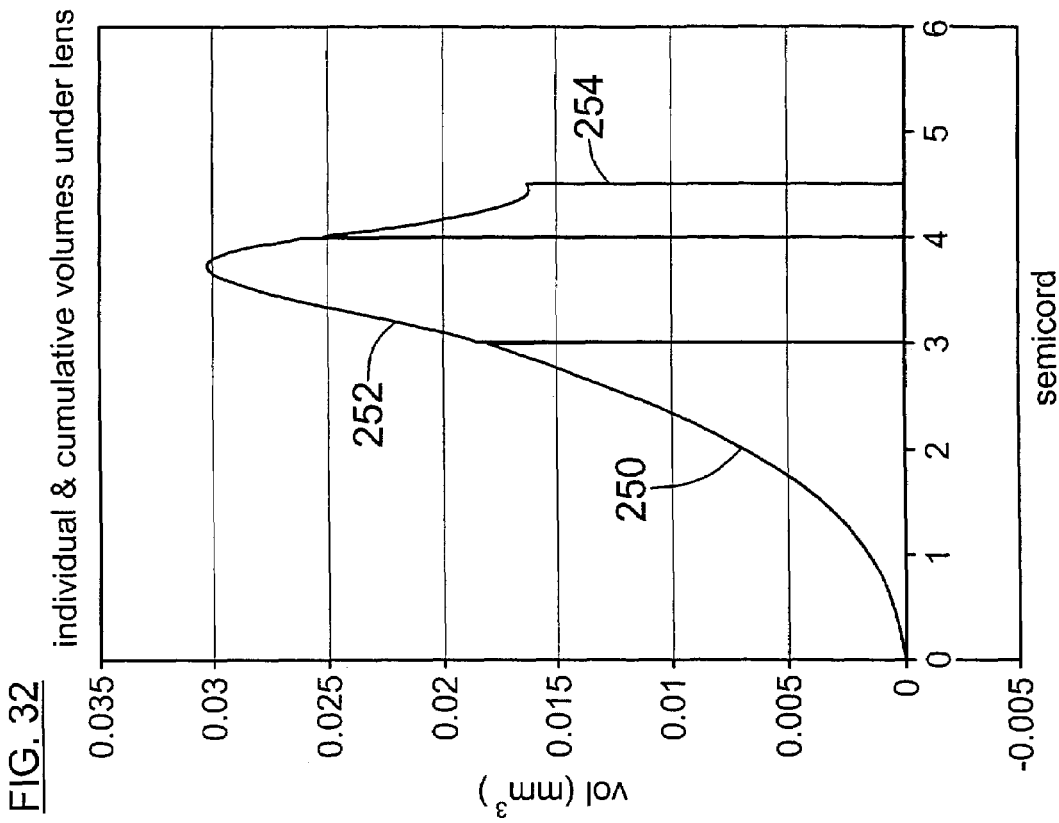
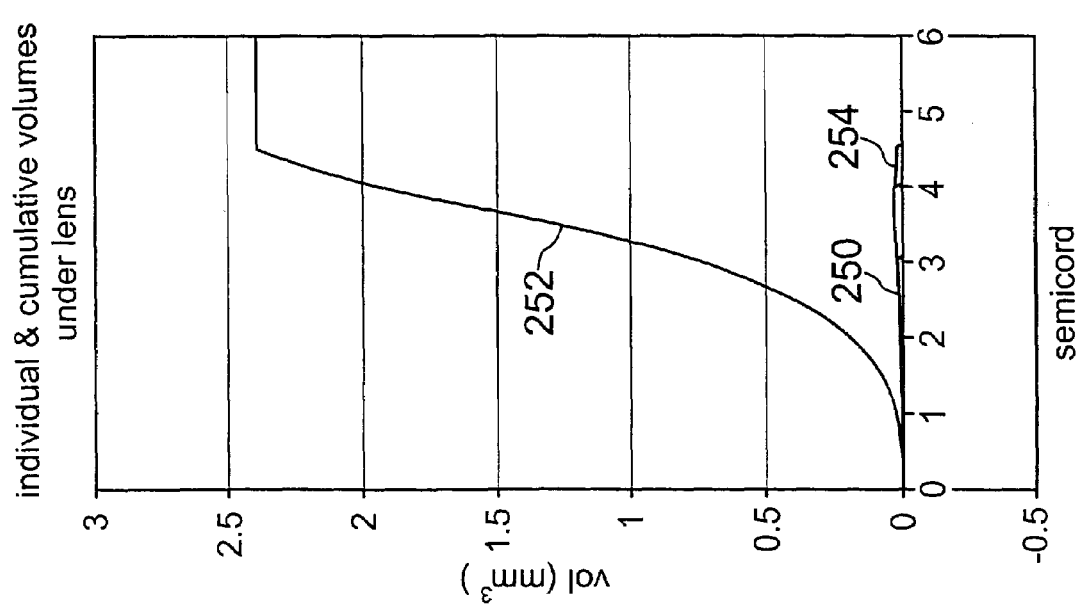
FIG. 32

FIG. 35A

| | | | | |
|---|---|---|---|---|
| BC | selected bc 208<br>(6.9-10.4/0.1) x<br>(7.70-9.1/.05) | 7.50 | Suggested Base Curve is 7.5 | |
| J1 | Radial distance 210<br>(OZ/2) from the lens<br>center to 1st junction<br>mm (1.0-5.9/0.1) | 2.50 | 5B | corneal apical radius (mm) |
| SW | Width of the S curve mm (.75,1) | 1.50 | EYE | 7:8 |
| MAT | Lens material (FP30, FP60, FP92, FP151, HDS, Other) | HDS | Ref. Index of material used = 1.449 If 'other' was selected input R1 in Cell H4 | Volume between BC and cornea (uL) = 0.298 |
| P | lens power desired (-1.00, -0.50, 0.00, 0.50, 0.75, 1.0, 1.25, 1.5, 2.0, 2.5) | 0.50 | Front Surface central radius = 7.49 | Volume between S curve and cornea (uL) = 1.383 |
| Δ1 | Delta R (mm) translation of 1st junction radially from BC origin (0.08-0.2/0.02) | 0.14 | True center thickness (mm) = 0.149 | Volume between pretouch Landing Zone and cornea (uL) = 0.491 |
| Δ2 | Delta R (mm) translation of 2nd junction radially from BC origin (0.1-0.22/0.02) | 0.18 | True offset between landing zones at J2 = 0.180 | 246<br>TOTAL VOLUME = 2.171(uL) |
| A | Angle of the landing zone (-25.5 to -50.0/.5) | 244<br>-35.00 | Present lens height (mm) above cornea at diameter of tangential touch = 0.024 | Diameter where LZ would make tangential touch = 9.08 |
| D | selected lens diameter mm (8.0-12.9/0.1) | 10.00 | Diameter recommended from HVID = 10.9 | Dia giving desired LZ lift = 10.52 |
| SD | Selected depth of the S curve mm (.15-1.0/.05) x (0.3-0.65/.025) use next smaller than est. | 0.636 | Recommended depth (mm) S curve for desired correction @6u/D = 0.646 mm | Edge lift at selected diameter = 0.047 |

FIG. 35B

| BC | 200 lens / cornea power (D) difference wanted | ellipticity of the cornea | HVID (mm) |
|---|---|---|---|
| J1 | | | |
| SW | 2.00 | 0.3 | 11.9 |
| MAT | Actual power (D) difference between bc and apical cornea = 1.73 | Desired edge lift (mm) when landed at full Diameter = 0.062 | 1.45 |
| P | Recommended diameter for lentic = 5.737 | Ab, the long axis of the ellipse creating the base curve edge (below) | FOR SPHERICAL FRONTS target edge thickness (below) |
| Δ1 | Recommended radius of curve for lentic = 8.482 | 0.40 | 0.18 |
| Δ2 | Origin for lentic curve is on y axis displaced from apex of front curve = 8.553 | Af, the long axis of the ellipse creating the front curve edge (below) | SPHERICAL FRONTS- max thickness peripheral to J1 before lentic (in mm>Delta 2) see below |
| A | Estimated elevation at J2 = 0.056 | 0.40 | 0.01 |
| D | fixed (tear thickness) | base to front at which the transition from base ellipse to front ellipse is found (below) | Minimum thickness peripheral to J1 before lentic (in mm>Delta 1) see below |
| SD | 0.024 | 0.25 | 0.01 |

CONTACT LENS AND METHODS OF MANUFACTURE AND FITTING SUCH LENSES AND COMPUTER PROGRAM PRODUCT

This application claims the benefit of U.S. Provisional Application No. 60/214,554 filed Jun. 27, 2000.

TECHNICAL FIELD

This invention relates to contact lenses and methods of manufacture, as well as methods for reshaping the cornea of an eye to treat visual acuity deficiencies. The invention is more particularly related to non-surgical methods of reshaping the cornea. This procedure maybe referred to as Corneal Refractive Therapy (CRT) when the therapy relates to designing and fitting a single contact lens to reshape the cornea, and/or orthokeratology (ortho K) when referring to the use of a series of lenses for the purpose of reshaping the cornea. The invention further relates to methods of fitting contact lenses and designing such lenses, as well as a software product for designing such lenses.

BACKGROUND OF THE INVENTION

In the treatment of visual acuity deficiencies, correction by means of eyeglasses or contact lenses are used by a large percentage of the population. Such deficiencies include patients having hyperopia or being far-sighted, myopia or near-sighted patients as well as astigmatisms caused by asymmetry of the patient's eye and presbyopia caused by loss of accommodation by the crystalline lens. Although the use of contact lenses is widespread, there are potential difficulties in properly fitting a lens for a patient, which in turn could damage the patient's cornea or cause discomfort. More recently, to alleviate the burden of wearing eyeglasses and/or contact lenses, surgical techniques have been developed for altering the shape of the patient's cornea in an attempt to correct refractive errors of the eye. Such surgical techniques include photorefractive keratectomy (PRK), LASIK (laser in-situ keratectomy), as well as procedures such as automated lamilar keratectomy (ALK) or implanted corneal rings, implanted contact lenses, and radial keratotomy. These procedures are intended to surgically modify the curvature of the cornea to reduce or eliminate visual defects. The popularity of such techniques has increased greatly, but still carry risk in both the procedure itself as well as post surgical complications.

Alternatives to permanent surgical procedures to alter the shape of the cornea includes CRT and ortho-K, where a modified contact lens is applied to the eye to alter the shape or curvature of the cornea by compression of the corneal surface imparted by the lens. The reshaping of the cornea in orthokeratology has been practiced for many years, but typically has required a series of lenses and an extensive period of time to reshape the cornea. It is also typical of orthokeratology treatment plans that the lenses used for reshaping of the cornea must be custom designed and manufactured, thereby greatly increasing the cost and complicating general use of such procedures. Further, orthokeratology lenses typically have various deficiencies, particularly relating to properly designing a lens for a particular patient to achieve best results in the treatment process. Specifically corneal abrasions from poorly distributed bearing, corneal warpage from decentered lenses, edema from tight fitting lenses and discomfort from excessive lens edge standoff are problems associated with an improperly fit lens.

The design of orthokeratology lenses have not lent themselves to be easily fitted for a particular patient and their needs, requiring a doctor or other practitioner to have significant skill in complex geometric computation to properly mate the lens shape to the patients cornea and a high level of expertise in properly fitting a patient. Further, even with a high level of expertise, a lens designer many times will design a lens which will not work properly with a patient, and must be redesigned to account for the errors of the original design. Such a process is lengthy and increases the cost of the treatment correspondingly. It would be desirable to provide a lens for corneal refractive therapy which would allow a novice fitter to more easily select and arrive at a final design to simplify the fitting process.

Another deficiency of ortho-K lenses is found in the complexity of the designs, which exacerbate the fitting problems mentioned previously. In the fitting process, if there is an aspect of the lens design which is not properly fitted for the desired treatment of the patients eye, or causes excessive discomfort to the patient, the lens must be redesigned accordingly. Unfortunately, in an attempt to redesign a lens, a practitioner may affect other aspects of the lens due to the interdependency between design features or may not anticipate manufacturing variances required by the altered design. It would be worthwhile to provide a CRT lens having independent features, which could be easily modified if required to attain a proper fit in a simpler and more cost-effective process. It would also be desirable to provide an CRT lens design which enhances the ability of a fitter and a consultant to discuss more clearly the lens cornea relationship, to enable parameters of the lens to be easily communicated to a finishing laboratory for forming a desired lens.

SUMMARY OF THE INVENTION

In accordance with the foregoing, it is an object of the present invention to provide a CRT contact lens, method of manufacturing such lenses and methods of designing and fitting lenses and a software product for design of such a lens. The contact lens according to the invention overcomes the deficiencies of the prior art, and provides a design which allows proper fitting of a patient, whether for corrective contact lenses or for use in an orthokeratology treatment program. The ability to properly fit a patient will alleviate, at least to a great degree, corneal abrasions from poorly distributed bearing, corneal warpage from decentered lenses, edema from tight fitting lenses and discomfort from excessive lens edge standoff. The simplified design allows a novice or relatively unskilled fitter to visualize the relationship between the contact lens and cornea of a patient's eye. The design and corresponding relationship to the patient's cornea allows selection of original trial lenses and any subsequent modifications to be easily designed or corrected. The lens design also provides improved ability of a fitter to consult with a lens designer to discuss clearly the lens cornea relationship for determining of the lens design. Due to the rational design of the lenses according to the present invention, a minimal number of lens parameter increments can be identified to cover the range of common corneas. It is therefore possible to provide pre-formed lens buttons or blanks which are easily formed into a final design, thereby simplifying and speeding up the treatment process. Further, any adjustment of the lens design which may be required based upon trial fitting or the like, is easily envisioned and communicated by the fitter and fabricated by the manufacturer.

In accordance with this and other objects of the invention, there is provided a contact lens comprising 1) a central zone having a posterior surface having a curvature determined by the correction or reshaping to be imparted to the cornea; 2) a connecting zone is provided adjacent and concentric to the central zone, the connecting zone having a shape defined by a first generally posteriorly concave portion adjacent the central zone (this concave portion being initially of longer radius than the central zone then becoming steeper than the central zone until nearly parallel to the central axis of the lens) and transitioning to a generally posteriorly convex portion thus having the appearance of an elongated backward "S" or sigmoidal shaped curve; and 3) a peripheral zone is provided adjacent and concentric to the connecting zone, and is provided with a conoid shape. In a CRT lens, the peripheral zone is used to facilitate redistribution of the corneal tissue with the central zone by maintaining centration during treatment. The design of peripheral zone also minimizes the potential for its extreme edge or its junction with the first annular zone to impinge directly on the cornea, even after ultimate contact.

In another aspect, the invention provides a contact lens having a central zone and first and second annular zones, wherein the second annular zone is initially positioned not to engage the cornea, and shaped such that only after the majority of redistribution of corneal tissue by the central zone is accomplished will the second annular zone contact the cornea acting to neutralize forces imparted on the cornea by the central zone. The first annular zone connects the central zone and the second annular zone in the contact lens.

The invention further relates to a method for altering the shape of a patient's cornea comprising the steps of determining the present shape of the cornea and a desired corrected shape therefore. Thereafter, imparting a force to the cornea to alter its shape by means of a contact lens comprising a central zone having a curvature corresponding to the desired corrected shape, and first and second annular zones concentric thereto. The second annular zone is positioned relative to the cornea and shaped such that upon redistribution of corneal tissue by the central zone, the second annular zone will contact the cornea acting to neutralize forces imparted thereon with minimal alteration of the peripheral cornea. The first annular zone connects the central zone to the second annular zone in the lens.

The invention also relates to a method for treating visual acuity deficiencies by wearing a contact lens for an amount of time to modify the shape of the cornea in a predetermined manner. In this method, the steps of providing a lens with a central zone having a shape designed to impart force on the cornea and an annular peripheral zone positioned relative to the central zone and shaped to selectively contact the cornea after an amount of redistribution of the corneal tissue by the force applied thereto. An annular connecting zone connects the central zone with the peripheral zone.

The invention also relates to a method for fitting a contact lens including enabling adjustment and visualization of the effect of adjustments on the fit of the lens to a patient's eye. The method enables a fitting technician to be easily taught as to the parameters of the lens which are modifiable to allow proper fitting based upon the characteristics of the patient's eye, and to assess and communicate a preferred geometry based upon the patient's characteristics. As an example, the sagittal depth of the contact lens can be directly adjusted and assessed relative to the patient's eye for proper fitting by changing only the axial length of the connecting or first annular zone provided in the lens geometry, without altering the characteristics of the central and peripheral zones in the lens design, and without altering the location of engagement of the central and second peripheral zones that had been observed with the unadjusted lens. The fitting of the lens may also be directed to adjusting the location of ultimate peripheral tangential contact by the conoid peripheral zone of the lens geometry with the cornea by adjusting the angle made by the peripheral zone to the central axis of the lens. The method of fitting is also provided by measuring central corneal curvature of the patient's cornea, computing the preferred corneal curvature needed to eliminate refractive error for a patient, and in one embodiment, determining only two additional parameters, connecting zone depth and peripheral zone angle. These parameters are identified by trial fitting lenses from a lens set having the central zone diameter, connecting zone width, lens diameter and edge profile provided with fixed dimensions. The needed parameters of connecting zone depth and peripheral zone angle may be derived by fitting lenses from such a fitting set having a fixed connecting zone depth with a series of base curves or alternatively, the fitting set may have a fixed base curve and a series of connecting zone depths. In addition to one or another of the two sets just described, another set having a fixed base curve, a fixed connecting zone depth with a series of peripheral zone angles from which the final angle selection is derived may be provided. Alternatively for angle selection, one of or the other of these sets may be configured to have a plurality of visible concentric rings, substantially allowing a determination of the lens diameter at which substantially tangential touch occurs between the lens and the cornea thereby making it possible to compute the correct angle of the at least one peripheral zone. Alternatively, although an embodiment of the invention restricts changes to the widths of the connecting zone and the central zone, in some cases it may be necessary to alter the volume distribution under the connecting zone or the size of the treatment zone. In such cases the central and connecting zone can be adjusted and assessed to allow proper tear flow and oxygen transmission beneath the lens by adjusting the diameter of the central zone, the axial length of the connecting zone and/or the radial width of the connecting zone.

As a further aspect of the invention, there is provided a computer program product and methods for designing and fitting a contact lens. The computer program product comprises a computer usable storage medium having computer readable program code means embodied in the medium. The computer readable program code means comprises code, responsive to user inputs, for modeling a contact lens to have a central zone with a curvature selected to impart force upon a patients cornea, and first and second annular zones. The second annular zone is positioned relative to the central zone, and is modeled to have a shape to fit the patient's eye in a predetermined manner to provide centration or to selectively engage the cornea upon altering its shape a predetermined amount. A first annular zone is designed to connect the central zone to the second annular zone. There is also provided computer readable program code for calculating cutting parameters for a lathe used to produce the lens from a blank of material. There is also provided a computer readable program to use observations mad with the fitting set lenses to compute the parameters most preferred for the patient. There is also provided a computer readable program for employing data supplied by a topographer to compute the parameters most preferred for the patient.

This computer program may have the following inputs: 1) Flattest keratometry reading; 2) manifest refractive sphere error (in minus cylinder form); 3) target final refractive error; and 4) Horizontal visible iris diameter (HVID); the fifth input varies depending on whether the fitting lenses used had variable base curves or variable connecting zone depths. In the case of the former the input identifies the base curve of the lens observed to just give simultaneous apical and tangential touch, or in the case of the latter the input identifies the connecting zone depth of the lens observed to just give simultaneous apical and tangential touch. The sixth input also depends on which fitting lens set type is used, concentric rings or variable angles. In the case of the former the input is the diameter of tangential touch by the lens having the concentric rings or in the case of the latter the input identifies the peripheral angle observed to meet the criteria of touch diameter relative to lens diameter.

In either configuration the program output by computation is: 1) Lens power to order, 2) Base curve to order; 3) Connecting zone depth to order; 4) peripheral zone angle to order; and 5) overall diameter to order.

These aspects of the invention along with other objects and advantages thereof will become apparent upon a further reading of the description of the invention in conjunction with drawings.

BRIEF DESCRIPTION OF THE DRAWINGS

FIGS. 4A and 4B show a partial cross-section of a lens as part of a set of fitting lenses.

FIGS. 9–13 show the lens design for a first example of the present invention, and include a spreadsheet of lens parameters, a graph showing the elevation of the lens zones from the cornea, a plot of the individual and cumulative volumes under the lens zones, a semi-meridian cross section of the lens and a plot showing the front and back curves in each of the zones of the lens.

FIGS. 14–18 show the lens design for a second example of the present invention, and include a spreadsheet of lens parameters, a graph showing the elevation of the lens zones from the cornea, a plot of the individual and cumulative volumes under the lens zones, a semi-meridian cross section of the lens and a plot showing the front and back curves in each of the zones of the lens.

FIGS. 19–23 show the lens design for a third example of the present invention, and include a spreadsheet of lens parameters, a graph showing the elevation of the lens zones from the cornea, a plot of the individual and cumulative volumes under the lens zones, a semi-meridian cross section of the lens and a plot showing the front and back curves in each of the zones of the lens.

FIGS. 24–28 show the lens design for a fourth example of the present invention, and include a spreadsheet of lens parameters, a graph showing the elevation of the lens zones from the cornea, a plot of the individual and cumulative volumes under the lens zones, a semi-meridian cross section of the lens and a plot showing the front and back curves in each of the zones of the lens.

FIGS. 30–34 show the lens design for a fifth example of the present invention, and include a spreadsheet of lens parameters, a graph showing the elevation of the lens zones from the cornea, a plot of the individual and cumulative volumes under the lens zones, a semi-meridian cross section of the lens and a plot showing the front and back curves in each of the zones of the lens.

FIGS. 35–39 show the lens design for a sixth example of the present invention, and include a spreadsheet of lens parameters, a graph showing the elevation of the lens zones from the cornea, a plot of the individual and cumulative volumes under the lens zones, a semi-meridian cross section of the lens and a plot showing the front and back curves in each of the zones of the lens.

DETAILED DESCRIPTION OF THE INVENTION

Figure 1:
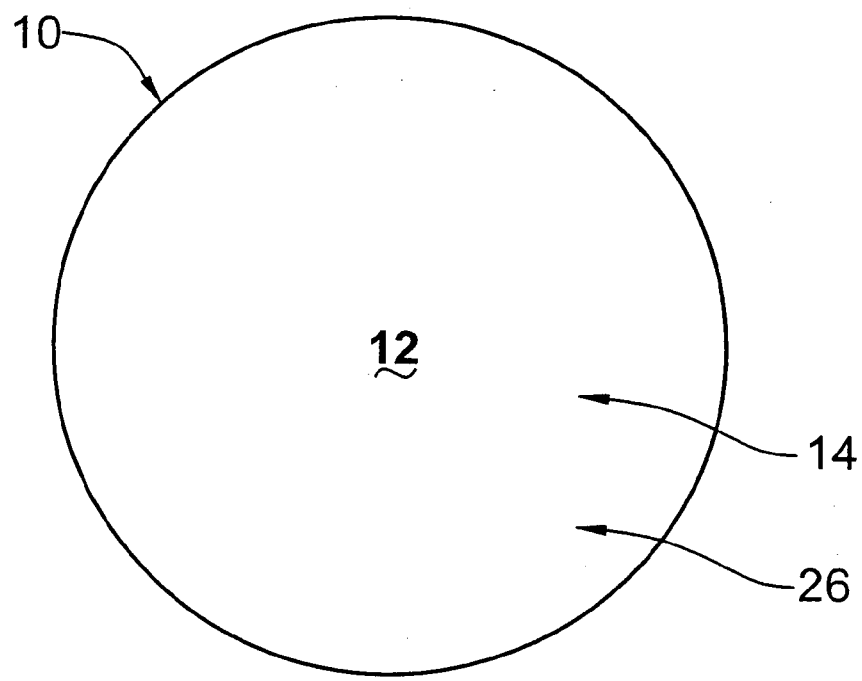
FIG. 1 is a front view of an embodiment of a contact lens according to the invention.
Figure 2:
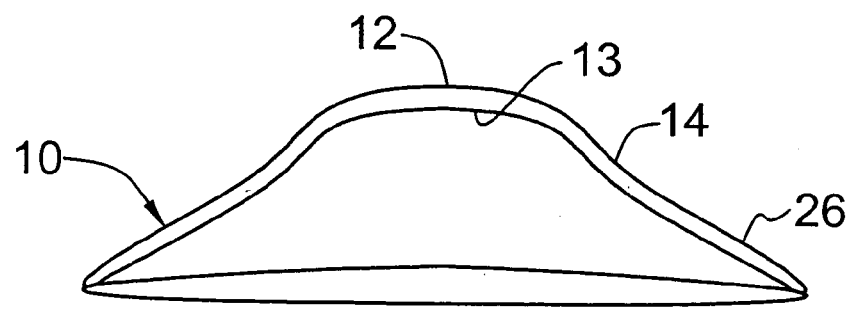
FIG. 2 is a cross-sectional side view of the embodiment as shown in FIG. 1.

In the following description of the invention, the contact lens, designing and fitting methods and computer program product refer to CRT lens design, but it should be understood that the lens according to the invention could also be designed for ortho K or to simply provide vision correction in a manner similar to typical contact lenses. In any lens designed according to the principles of the invention, the lens provides better centration, comfort or other advantages. Referring now to FIGS. 1 and 2, there is shown a first embodiment of a contact lens for positioning on a patient's cornea for reshaping the cornea to improve visual acuity. The lens 10 in general is dimensioned within normal ranges for corneal contact lenses, with an outside diameter generally between 7 to 13 mm, and generally in the range between 9.5 to 12 millimeters. More particularly, the diameter will normally be chosen to be as large as possible, but no larger than the horizontal visible iris diameter (usually 1 mm less) and to extend beyond the point of ultimate tangential contact by the peripheral zone (as will be described hereafter) to provide edge lift at the periphery of the lens and allow required tear flow under the lens. The extreme peripheral edge of the lens is smoothly contoured according to the invention as will be described hereafter. The desired edge lift preferably avoids excessive standoff, typically less than 100 microns and no more than about 150 microns. Typically, the lens standoff is in the range of 40–60 microns. In other ways, lens 10 is similar to other corneal contact lenses, having a cross-sectional thickness generally in the range of 0.05 to 0.5 millimeters or other suitable thickness, but being uniquely variable in thickness due to the "harmonic" correspondence between the front and back surfaces of the lens as will be described in more detail hereafter, along with the ability to independently adjust the central zone and peripheral zone thickness relative to any of the other zones. The lens 10 can be fabricated from any suitable contact lens material, such as fluorosilicon acrylate, silicon acrylate, polymethylmethacrylate or another suitable material. Oxygen permeable materials are preferred particularly when the lens is worn overnight to permit non-wear during the day.

Figure 3:
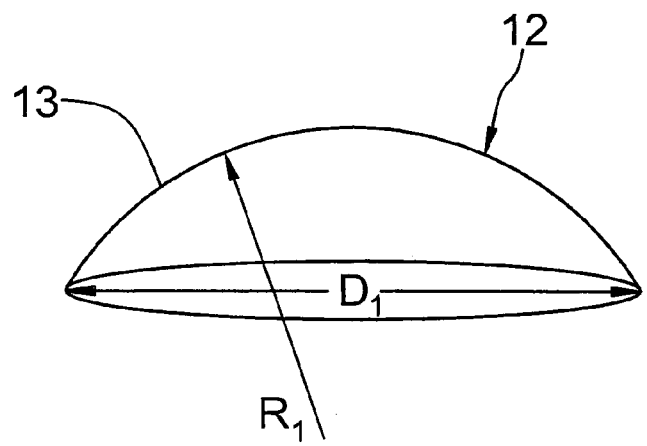
FIG. 3 shows an enlarged side view of the central portion of the contact lens as shown in FIG. 1.

The lens 10 in general comprises a lens body having a posterior surface 13 including a central zone 12 provided with a curvature determined by the reshaping to be imparted to the cornea of a patient for correction of visual defects. The posterior surface 13 also comprises a first annular zone 14 and a second annular or peripheral zone 26, each preferably being concentric with central zone 12. The central zone 12 is shown in more detail in FIG. 3, and is spherical in shape in this embodiment. Alternatively, the central zone 12 could be aspherical, toric, or comprised of a combination of annular spherical and/or aspherical zones. In the example shown in the Figs., the surface is spherical and is defined as having a radius of curvature $R_1$. The radius of curvature, $R_1$, may be chosen based upon characteristics of a patients eye for which the lens 10 is being designed, and particularly related to the amount of correction required. To determine the refractive error of the eye of a patient, typical refractive measurements may be used and/or keratometry measurements. Using a keratometer, a single point value for the radius of curvature at the apex of the patient's cornea may be measured. Thus, there may be no need for complex corneal topography measurements, such as by use of photokeratoscopy or videokeratoscopy techniques, to design the lens. Selecting the design of the other zones may be accomplished by trial fitting the lens of the present invention as an example, or in conjunction with a model eye. The objective of the trial lens fitting is to discern the sagittal depth of the cornea from its apex to the diameter at which ultimate tangential touch would occur and to select an angle making tangential touch at a diameter appropriate for the diameter of the treatment lens. Additionally, for some patients, other topographical knowledge of the cornea may be useful. Thus, if desired, the corneal topography of the eye could be determined by use of photokeratoscopy or videokeratoscopy techniques as an example, to facilitate determining the required reshaping for correction of visual defects. Generally, for most patients the diameter of tangential touch by the second peripheral zone of the lens with the cornea is beyond the diameter measured by corneal topographers. Sagittal depth of the cornea may be grossly estimated by extrapolating data from corneal topography beyond the range of measurement. Any suitable method for determining the amount of correction required or determining the corneal topography of the patient may be used. The central zone 12 is also defined as having a chord diameter $D_1$ as shown in FIG. 3. The base curve provided on the posterior surface of central zone 12, although shown as spherical, may also be aspherical if desired, or have such other shapes as are known to those skilled in the art to impart the desired shape to the cornea for correction of visual defects such as astigmatism or presbyopia. In general, the radius of curvature $R_1$ of the posterior surface 13 of central zone 12 is equivalent to the desired post treatment radius of curvature for the cornea that is undergoing reshaping. Typically, an CRT contact lens is to be fitted such that pressures exerted upon the lens during lens wear are transmitted to the cornea, with the corneal tissue underlying the portion of the lens applying pressure being effectively redistributed in a desired manner, but this need not always be the case. For example, the central zone 12 could be designed to correct presbyopia subsequent to lens wear by contacting and thus reshaping the central cornea, or be designed to correct presbyopia only during lens wear without contacting the cornea, depending again on the needs of the patient. The redistribution of corneal tissue causes the cornea to temporarily take on the radius of curvature of the posterior surface 13 of central zone 12 to provide correction of visual defects based upon the present topography of the patient's cornea. The intended effect of the CRT lens 10 is to sphericize the apical corneal cap and establish a new radius of curvature for it. In the embodiment as shown in FIGS. 1–3, the posterior surface 13 of the central zone 12 of lens 10, being spherical, requires only the designation of the base curve and the diameter as shown in FIG. 3. Fitting observations may be computationally translated to peripheral parameter choices. These choices provide that the peripheral design elements (connector zone depth, peripheral zone angle and overall diameter) allow apical corneal contact, promote lens centration, avoid excessive edge standoff and avoid pretreatment peripheral corneal engagement which would oppose pressure applied to the corneal apex by the central zone, and possibly other characteristics.

In order to simplify fitting, as well as to allow adjustment of the lens design, the visualization of the lens fit to the eye, the ability to teach a fitter and communicate changes in the preferred lens geometry for a given patient, as well as the ability to assess adjustments and the fit of the lens, it is desirable to use the minimum number of variables describing easily visualizable geometric shapes in selecting and designing lenses. As will be seen in more detail as the lens geometry is described, the invention is directed in part to a method of fitting a contact lens, wherein the fitter can be provided with a lens set where the central zone 12 diameter, connecting zone 14 width, lens diameter, lens optical power and edge profile have been predetermined by a manufacturer. The corneal curvature needed to eliminate refractive error and the central corneal curvature can be determined by typical refractive measurement and/or simple keratometry measurements, thereby enabling the lens design to be characterized by specifying the depth of the connecting zone 14 and the angle of the peripheral zone 26 relative to the central axis of the lens 10. Minimizing the number of variables, as well as enabling adjustment of these variables without impacting the design or function of the other zones, provides unique and extremely powerful fitting capabilities. As an example, in this manner, the fitter may be provided with a set of fitting lenses having a fixed depth for the connecting zone 14, with a series of base curves for the central zone 12 or with a set of fitting lenses with fixed base curve an a series of connecting zone depths to determine sagittal depth of the cornea from its apex to the point of tangency between the cornea and the second peripheral zone. Similarly, the fitter could be provided with a lens set with the sagittal depth of the base curve and connecting zone 14 fixed, by necessity having a fixed sagittal depth greater than normal corneas, and the angle of the peripheral zone 26 varied in a series to determine the desired relationship between these zones. The set of fitting lenses may be configured to have a plurality of visible concentric rings 27 on either the posterior surface 13 as shown in FIG. 4A or the anterior surface 15 as seen in FIG. 4B, allowing accurate determination of the lens diameter at which substantially tangential touch occurs between the lens and the cornea to determine the angle of the at least one peripheral zone. In the embodiment of FIG. 4, the rings 27 are formed during the manufacture of the lens by lathe, such as by forming grooves in the surface 13 or 15. In the fitting procedure, fluoroscene may be used to assess the relationship of the lens to the cornea. The formation of the rings 27 as grooves allows fluoroscene to accumulate slightly within the grooves, such that the fluoroscene highlights the ring allowing easier viewing of the lens diameter at which substantially tangential touch occurs between the lens and the cornea. Alternatively, the visible rings may be formed in any other suitable manner, such as by laser etching, printing, embossing or any other suitable approach. The final lens design can then be selected by simple computation of the angle. Table 1 as follows illustrates the fitting sets contemplated according to the invention.

TABLE 1

| Set # | Base Curve | Connector Depth | Peripheral zone angle | Plurality of rings on some or all of the set lenses |
|---|---|---|---|---|
| 1 | V | F | F | N |
| 2 | F | V | F | N |
| 3 | F | F | V | N |
| 4 | V | F | N | Y |
| 5 | F | V | N | Y |
| 6 | F | F | V | Y |

Where F = fixed, V = variable, Y = present, N = not present

Fitting may be performed using set 1 with set 3, or set 2 with set 3, or with set 4 alone or set 5 alone, or though it may be slightly redundant set 4 or set 5 with set 6. Further, although the description above relates to determining certain parameters of the lens design, if desired, the other variables in the lens design of the invention could also be adjusted if desired, but limiting the number of variables which are adjusted in the fitting process may provide significant advantages.

For example, it has been observed that the flexibility of the rest of the design features of the lens according to the present invention make it extremely rare that a diameter of the central zone other than 6 mm will be required, such that this possible variable may be held constant while allowing a fitter to properly design an appropriate lens for a given patient the same time in cases of patients with high refractive error, low corneal eccentricity, hyperopia, narrowing this diameter and expanding the connecting zone width can avoid deep tear zones under the lens that might cause bubbles as will be described in more detail hereafter. Thus, it is possible to provide a lens design with design variables minimized, and yet to allow suitable designs for such rare cases as this are enabled. The variables which are possibly modified to achieve particular characteristics are available to the fitter, but also may be held constant for a variety of lens designs to simplify the fitting process. In this example, both variables are excluded from those used in normal fitting. The benefit to excluding design variables may outweigh their utility for many lens designs, and again simplifies the design and fitting process. As an example, the design may accommodate nearly every patient using only four variables, with correction provided for nearly any eye. These variables include the base curve, connecting zone depth, peripheral zone angle and overall diameter. Two of these (Base curve and Diameter) are so firmly dictated by needed correction, corneal curvature, and HVID, that they can be in most cases fixed for a patient from records of normal eye exams. Hence, the proper fitting and design of the lens may require selection of only two variables (connector depth and peripheral zone angle) and these are easily determined, visualized and discussed between fitter and manufacturer or consultant.

Thus, the design of the central zone 12 is simple and easily configured to produce the desired reshaping of the cornea based upon the patients measured characteristics. In general, the base curve is generally determined by those skilled in the art of corneal refractive therapy at approximately 0.2 millimeters greater in radius of curvature than the present corneal shape, for each diopter of myopia that is to be corrected. Other visual defects may require different configurations to result in the desired reshaping. Based upon typical patient populations, and refractive errors generally found in human eyes, the radius of curvature $R_1$ may be in the range from 5 millimeters to 12 millimeters, or more typically in the range from 6.8 millimeters to 10 millimeters radius.

The other parameter of the central zone 12 relating to chord diameter $D_1$ is generally fixed at 6 mm, but in cases where it is necessary to change this variable, it is determined by correlation to the full pupil diameter of the patient, as measured under dark conditions. Such a design rule is not required in the present invention, and it may be easier to achieve large visual defect correction with smaller diameter central zones 12, and thus the relationship of the chord diameter $D_1$ to the pupil diameter may vary. In a particular situation, such as hyperopia or very high myopic corrections, such as above 6 diopters, it may be acceptable to achieve the visual defect correction desired, to use smaller diameter central zones 12. This still may be acceptable even though under low lighting conditions, some flare or visual aberrations may be experienced. In general, the chord diameter $D_1$ is in the range from 2 to 10 millimeters, and more typically 3.5 millimeters to 8.5 millimeters. Thus, once the corneal characteristics and/or topography of a patient is determined, the design of the central zone 12 may be configured to impart the desired amount of pressure to the cornea for reshaping and redistribution of corneal tissue. Thus, the posterior surface 13 of central zone 12 is designed with particular attributes, while the characteristics of the anterior surface 15 of central zone 12 are of less significance. The front surface 15 of the lens 10 could therefore be configured to be similar to the geometry of standard contact lenses with or without lenticulation. As examples, the anterior or front surface 15 of lens 10 may be configured from contiguous spherical surfaces, contiguous aspherical surfaces, toric surfaces or combinations thereof. It is also possible and may be preferable to design the front surface of the lens 10 to mirror or be substantially the same shape as the posterior or back surface 13 using identical design techniques. In the embodiment as shown in FIGS. 1–2, The anterior surface 15 of the lens 10 is made to mirror the back surface, such that the anterior surface 15 exactly parallels the posterior counterparts of the lens with equal spacing between anterior and posterior surfaces from the center to the peripheral edge of the lens 10. At the same time, it is also possible to design the front surface to mirror the back surface, but to do so with different spacing between the surfaces from the center to the peripheral edge of the lens as will be described in more detail with respect to an alternative embodiment.

It may also be desirable to impart the lens 10 with a desired optical power based upon the patient's vision characteristics. In this regard, the anterior surface 15 may be configured in combination with the computed posterior base curve of lens 10 to impart the desired optical power to lens 10. It is however normally true that the base curve which will yield the intended correction compensates fully for any necessary optical correction needed by the patient thus the optical power for all lenses offered can be set a single value near plano. Typically a base curve which would provide a correction slightly greater than required is employed and a power just slightly deviating from plano to compensate is provided in the lenses.

Figure 5A:
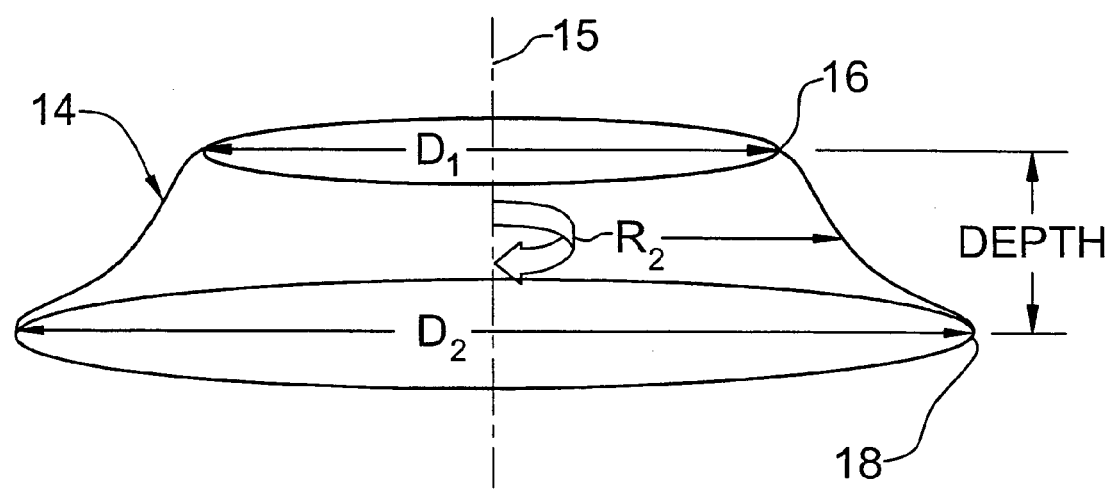
FIG. 5A shows a schematic illustration of the connecting zone in the lens of the invention.

Turning now to FIG. 5A, a schematic illustration of the annular connecting zone 14 is shown. The connecting zone 14 is adjacent and concentric to the central zone 12, and in general is designed to have a sigmoidal configuration, or the shape of an elongated "S" which is rotated circumferentially about central axis 15 through space at a radius $R_2$ associated with the middle of the sigmoidal form or transition from a concave curvature to a convex curvature in the connecting zone 14. The connecting zone 14 is a surface of rotation about the central axis of the lens 10, with a beginning point defined as a circle circumscribed by the upper limit of the rotated sigmoidal shape having a diameter $D_1$, at 16, and terminating at a bottom point defined as a circle with a diameter $D_2$ circumscribed at the bottom of the rotated sigmoidal curve at 18. The connecting zone 14 has a depth $Z_1$ equal to the distance from the plane containing the upper circumscribed circle at 16 and the plane containing the lower circumscribed circle at 18, measured parallel to the central axis. The end points of the connecting zone 14 (associated with circles 16 and 18) represent junctions to the central zone 12 and peripheral zone 26 respectively. As previously mentioned, the anterior surface 15 of the lens 10 may be made to mirror the posterior surface, such that the location of junction points, which may be referred to as J1 and J2, are selected by translating radially from the analogous junctions on the posterior surface. The translation of J1 and J2 are individually chosen and determine the separation of the anterior and posterior surfaces and along with the front curve radius and peripheral zone angle define the equations for the profile of the anterior connecting zone.

Figure 5B:
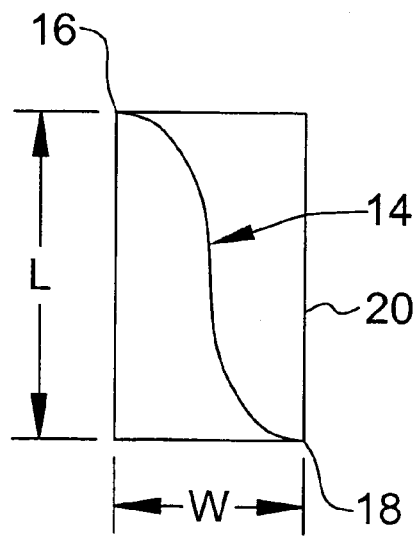
FIG. 5B shows an enlarged side view of the annular connecting zone according to the invention.

Turning to FIG. 5B, the design of the connecting zone 14 may be better understood with reference to a semi-meridian section corresponding to the zone 14, inscribed within a rectangle 20, and how it may be designed. The characteristics of connecting zone do not alter those of the central zone 12 or the second annular zone 26, and thus a lens designer or fitter can design the dimensions of the inscribing rectangle independently and adjust as necessary without affecting the design of adjacent zones. As should be understood with reference to FIG. 2, the connecting zone may be designed such that connecting zone 14 smoothly joins the central zone 12 at the beginning point 16, corresponding to top left of rectangle 20. Similarly, the connecting zone 14 may be made to smoothly join the peripheral or second annular zone 26 at point 18, at the bottom right corner of the rectangle 20. The primary design consideration for the connecting zone 14 relates to defining the posterior surface 13 of zone 14 to begin at a point coinciding in space with the periphery of the posterior surface of the central zone 12, and terminating at a point in space where the posterior surface of the peripheral zone 26 begins. In designing lens 10, the design of central zone 12 will dictate the beginning point 16 and the slope associated with the connecting zone 14 at this point. Once this position and slope are located on a meridian section of the posterior surface of lens 10, the width and length of the imaginary rectangle 20 may then be set such that connecting zone 14 terminates at position 18 corresponding with the beginning of the posterior surface of the peripheral zone 26 to be described hereafter. Furthermore the slope of the posterior surface second annular zone 26 dictates the slope of connecting zone 14 at position 18. The design of the meridional profile of connecting zone 14 thus may be defined or described by its axial length and horizontal width. Changes to the shape of the sigmoidal curve therefore only relate to the location in space of the central zone 12 and peripheral zone 26 and their slopes at the points of their connection to the sigmoidal curve, but do not define or reflect upon the shape of these zones, and any design parameters for these zones would be acceptable. In this way, the design of the connecting zone 14 allows a fitter or lens designer to freely determine the location of the central zone 12 relative to the peripheral zone 26, with the connecting zone 14 then matched to correspond to such locations.

The design of the connecting zone 14, being a sigmoidal curve in this embodiment, also assures the maximum "void space" geometry imparted by the sigmoidal shape of the curve as it relates to positioning on the cornea of a patient. Additionally, providing the ability to design the connecting zone 14 based upon the beginning and ending point 16 and 18 respectively, allows the fitter to easily visualize this element of lens 10 as a simple rectangle and ultimately easily visualize any changes made in the design of this zone. The ability to more easily visualize how changes in the design will impact proper fitting to the patients eye and cornea, makes it easier to properly select parameters to achieve good fit more simply and efficiently. As the characteristics and design parameters of the connecting zone 14 are independent of the design parameters of central zone 12 or peripheral zone 26, judgement about design parameters of the connecting zone 14 are not complicated by possible effects on the shapes or function of the other zones. In the preferred embodiment, the design parameters of the connecting zone 14 are desired to only affect the relative location in space of the other zones 12 and 26.

In order to achieve comfort in wearing the lens 10, it is also a feature of the embodiment as shown in the Figs., that the connecting zone 14 be designed such that the slope of the sigmoidal curve at the points of intersection 16 and 18 with the central zone 12 and peripheral zone 26 respectively, be substantially or exactly matched to the slopes exhibited at these locations in the zones 12 and 26. The meridional profile of the connecting zone is thus shaped to substantially match the slopes of the central zone 12 and peripheral zone 26 on adjacent sides. The matching of the slopes of the sigmoidal curve at the points of intersection 16 and 18 eliminates the need for any curve blending or manual curve fitting between independent, non-continuous surfaces as in the present invention. Such curve blending if accomplished by means of polishing imparts an unknown and indescribable and irreproducible shape to this important region of the lens and may well affect to optical quality originally imparted to the central zone by precise lathing. If blending is accomplished by manual curve fitting it is not possible to automatically compute a lens design for a particular eye but rather requires a designer to make unique choices for every individual greatly slowing the delivery and increasing the cost of the lens. Further, the sigmoidal shape of the posterior surface of connecting zone 14, and the matching of the slope to that of central zone 12 at 16, tends to create the desired void space between the lens posterior surface and the pretreatment cornea, at the position of surface 14 adjacent central zone 12. The void space between the posterior surface of the lens and the pretreatment cornea is initially filled with tears and allows redistribution of corneal tissue therein. In the present invention, the connecting zone 14 is designed to provide a desired amount of void space at the desired location.

Figure 5C:
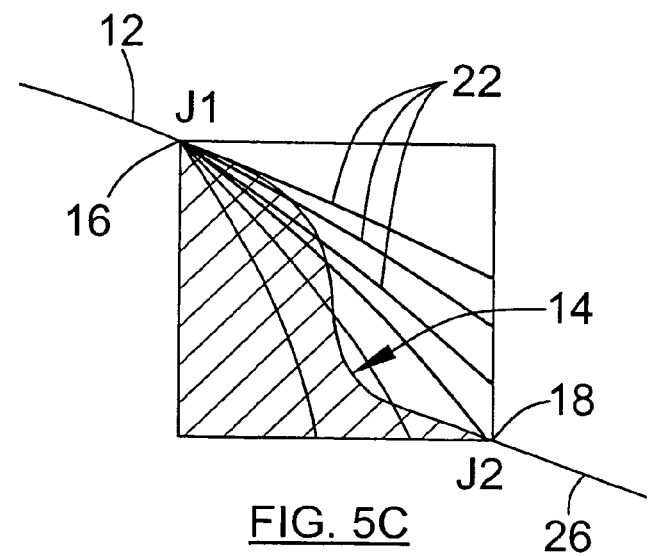
FIG. 5C is a schematic diagram showing the design of the connecting zone, with spherical or conic sectional curves that might be found in a similar location in conventional ortho-K lenses.

In prior art orthokeratology lens designs, the use of "reverse curves", several indicated by reference numeral 22 in FIG. 5C can create too much void volume at this location, leading to bubbles between the lens and cornea, or too little room or void space for proper displacement of corneal tissue. Further, it should be noted that such "reverse" curves require at least a radius and origin be specified before the location of the upper left and lower right corners can be computed. The difficulty of this computation and the consequent lathe set up preclude most fitters and lab operators from defining these locations except by trial and error, and that the sharp junctions created require such intense polishing that even if the intended locations were designated they could not be guaranteed or located in the final product. Providing rationally spaced continuum of lenses using such "reverse curves" to meet the biodiversity of human corneas cannot be accomplished without the use of nearly intractable parameter spacing relationships and is so difficult that manufacturers are forced to offer a restricted range of lenses whose parameters give little insight into the fitting characteristics and no guidance on how to improve a misfitting lens. The sigmoidal curve design of the connecting zone 14 according to the present invention, provides a majority of the void volume at the location it is needed near junction 16, while allowing matching slopes to be attained to avoid curve blending. Any use of "reverse curves" or radial arcs 22 would at best distribute any void volume uniformly throughout the reverse zone which is not optimum. Based upon the possible creation of bubbles or the like, the volume created between the lens and the cornea must be considered, and would limit the choice of reverse arcs available for use. Thus, the sigmoidal curve design according to the present invention provides the desired attributes without limiting the designer as the use of reverse arcs would. Further, since the sigmoidal curve is mathematically defined (see below) by the choice of the depth (and possibly the width) of the defining rectangle 20, this eliminates any need for the designer to participate in its designation beyond specifying the rectangle's depth while being assured it is of optimum ultimate configuration. The prior art use of reverse curves has also taught that such reverse curves are of shorter radius than the base curve or other adjacent arcs in the ortho-K lens design, such as in alignment or anchor zone arcs at the periphery of the lens. In the present invention, the sigmoidal curve design is not limited in this respect, the connecting zone 14 may be provided with effectively flatter geometry's than the adjacent central zone over a portion of its traverse. Additionally, the computed meridional profiles of the zones 10, 12 and 26 may be different at different angles of rotation about the lens central axis allowing non-rotationally symmetric designs. And such non-rotationally symmetric designs are easily visualized in each meridian in the same manner as is used for one meridian in a rotationally symmetric design. Modern computer controlled lathes can easily cut flatter radii in this zone as required and the variable curvatures in non-rotationally symmetric designs. Reverse curves 22 as presently practiced (steeper than the central base curve with origin on the central axis) present a particularly undesirable difficulty. Whenever such curves are altered to achieve greater sagittal depth in a particular zone, the diameter at which the desired sagittal depth is achieved varies with the steeper radius chosen. This diameter shift then alters the entire spatial location of all structures peripheral to the "reverse zone". Although a "reverse curve" 22 could conceivably be provided with a flatter radius by moving its origin away from the central axis of the lens this would not improve the ability to predict and visualize the result of such a change on peripheral structures, avoid the creation of junctions which require manual polishing and curve blending, nor would it improve tear film distribution in the zone. The mathematically described sigmoidal shaped curve of the connecting zone 14 alleviates these problems and simplifies design, fitting and manufacture of the lens.

The posterior surface 13 of the connecting zone 14 is determined mathematically once various parameters are measured or determined for a given patient's condition and the desired reshaping to be imparted to the cornea. Again, it is desired that the connecting zone 14 interact to properly position the peripheral zone 26 at a desired position relative to the central zone 12, as will be hereinafter further described. Thus, the inputs for determining mathematically the curve in the connecting zone 14 will include the base curve of the central zone 12, which again may be spherical and defined by a radius ($r_B$) as well as the slope (M) of the peripheral zone 26. The connecting zone may further be defined by inputs including the length or "depth" of the sigmoidal curve (L), the radial distance from the center of the lens to the base curve junction with the sigmoidal curve ($J_1$), the radial distance from the center of the lens to the junction of the sigmoidal curve with the peripheral zone, and the width of the sigmoidal curve (W) computed by subtracting ($J_2$) from ($J_1$). In this embodiment, the equation for the sigmoidal curve is $$y_s := A \cdot x^3 + B \cdot x^2 + C \cdot x + D \quad \text{(Eq. 1)}$$

Figure 12:
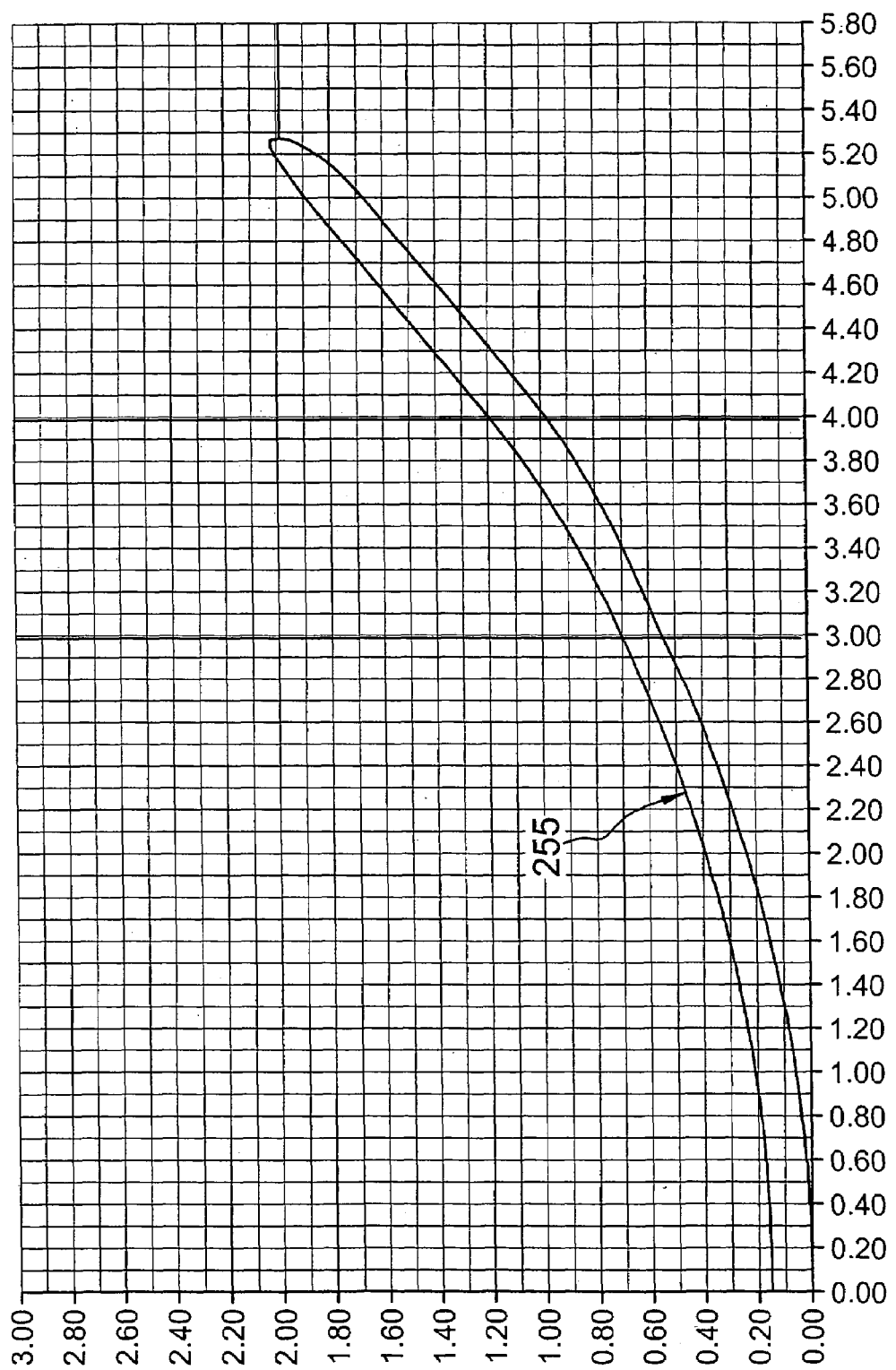

Using the above inputs, various intermediate results may then be determined to yield a design of the lens which can be visualized with respect to fitting properly for the patients eye and treatment desired, allowing the fitter to more easily vary certain parameters to adjust and properly fit the lens. As each zone of lens 10 is a surface of rotation, the lens design may be visualized with respect to a transmeridian section, such as shown in the example of FIG. 12. The embodiment shown in FIG. 12 shows the thickness of the lens 10 varying from center to edge. For a particular patient, a designer may prefer to provide the central zone 12 having mirrored front and back surfaces, but thin, and the peripheral zone 26 mirrored but thicker. In such an embodiment, the transition takes place in the connector zone 14, which mirrors but gradually changes thickness. Using the above information, the Y value for the junction ($J_1$) between the central zone 12 and connecting zone 14 is defined by the equation $$y_{j1} := \sqrt{r_b^2 - J_1^2} \quad \text{(Eq. 2)}$$

The X value for the junction ($J_2$) between the connecting zone 14 and peripheral zone 26 is defined by the equation $$x_{j2} := J_1 + W \quad \text{(Eq. 3)}$$

While the Y value for the junction $J_2$ is defined by the equation $$y_{j2} := y_{j1} - L \quad \text{(Eq. 4)}$$

With these values in hand one can compute the coefficients A, B, C, D for the equation of the sigmoidal curve in this same coordinate system.

The values for the coefficients A, B, C and D of equation 1 are defined by equations 5–8 as follows:

$$A := \frac{-\left[\frac{-1}{(2 \cdot J_1 - 2 \cdot x_{j2})} \cdot M - \frac{1}{[(2 \cdot J_1 - 2 \cdot x_{j2}) \cdot \sqrt{r_b^2 - J_1^2}]} \cdot J_1 + \frac{1}{(J_1^2 - 2 \cdot J_1 \cdot x_{j2} + x_{j2}^2)} \cdot J_1 \cdot M + \frac{1}{(J_1^2 - 2 \cdot J_1 \cdot x_{j2} + x_{j2}^2)} \cdot y_{j2} - \frac{1}{(J_1^2 - 2 \cdot J_1 \cdot x_{j2} + x_{j2}^2)} \cdot x_{j2} \cdot M - \frac{1}{(J_1^2 - 2 \cdot J_1 \cdot x_{j2} + x_{j2}^2)} \cdot \sqrt{r_b^2 - J_1^2}\right]}{\left[\frac{-3}{(2 \cdot J_1 - 2 \cdot x_{j2})} \cdot J_1^2 + \frac{3}{(2 \cdot J_1 - 2 \cdot x_{j2})} \cdot x_{j2}^2 + \frac{1}{(J_1^2 - 2 \cdot J_1 \cdot x_{j2} + x_{j2}^2)} \cdot J_1^3 - \frac{3}{(J_1^2 - 2 \cdot J_1 \cdot x_{j2} + x_{j2}^2)} \cdot J_1 \cdot x_{j2}^2 + \frac{2}{(J_1^2 - 2 \cdot J_1 \cdot x_{j2} + x_{j2}^2)} \cdot x_{j2}^3\right]} \quad \text{(Eq. 6)}$$

$$B := \frac{-\left(A \cdot J_1^3 - 3 \cdot J_1 \cdot A \cdot x_{j2}^2 + J_1 \cdot M + y_{j2} + 2 \cdot A \cdot x_{j2}^3 - x_{j2} \cdot M - \sqrt{r_b^2 - J_1^2}\right)}{(J_1^2 - 2 \cdot J_1 \cdot x_{j2} + x_{j2}^2)}$$

$$C := -3 \cdot A \cdot x_{j2}^2 - 2 \cdot B \cdot x_{j2} + M \quad \text{(Eq. 7)}$$

$$D := y_{j2} + 2 \cdot A \cdot x_{j2}^3 + B \cdot x_{j2}^2 - x_{j2} \cdot M \quad \text{(Eq. 8)}$$

Inserting these values of A, B, C, D into Eq. 1 for the sigmoidal curve and solving the equation over the range of x values from the first junction J1 to the second junction J2 yields the location of all points along the curve in coordinates usable by modem computer controlled lathes such as the Optoform 50. Again the posterior surface 13 is defined to have particular attributes, while the design of the anterior surface can mirror the posterior shape or may be shaped as in a typical contact lens. Specifically the relationship of a mirrored anterior surface is easily determined by locating the corners of the anterior sigmoid defining rectangle in reference to those of the posterior sigmoid defining rectangle. The anterior peripheral zone departs from the lower corner of the anterior defining rectangle with the same slope as its posterior counterpart and thus remains parallel, at least until the edge zone of the peripheral zone 26 is reached, which may include edge contour characteristics, as will be hereinafter described in more detail. The anterior central zone departs from the upper corner of the rectangle with the radius of curvature required to yield the appropriate lens power. Since this power is usually near plano in CRT (the tear lens gives the necessary power correction), the thickness at the starting point essentially equals that at the lens center thus placing no constraint on the lens design when selecting the relationship between the posterior and anterior defining rectangles with following examples indicating this relationship as being variable.

Figure 6:
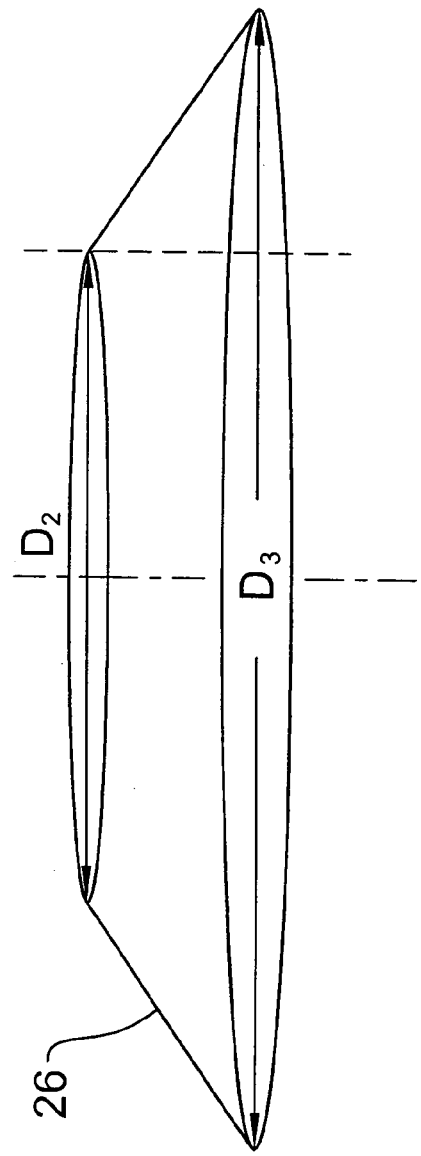
FIG. 6 is a diagram showing the conoid peripheral zone.

Turning now to FIG. 6, a peripheral or landing zone 26 according to an embodiment of the invention is shown in more detail. The peripheral zone 26 in general is a second annular zone adjacent and concentric to the first annular or connecting zone 14, and thereby is connected to the base curve 12 by means of the connecting zone 14. The peripheral zone in this embodiment is formed as a truncated conoid which may be uncurved over at least a substantial portion thereof. The conoid may be defined by the diameter of the upper limit of the truncated conoid, being $D_2$, corresponding to the diameter of the bottom limit of the rotated sigmoidal curve forming the connecting zone 14. The peripheral zone 26 may further be defined by the diameter of a bottom limit of the truncated conoid at $D_3$. The angle that the interior or posterior surface of the conoid makes with a plane containing the central axis of lens 10 may be defined as the angle of the conoid, which is chosen by the lens designer or fitter. The relationship of the meridional profile of the peripheral zone 26 to the meridional profile of the connecting zone 14 may thus be described by the angle the meridional profile of the peripheral zone 26 makes with the a line perpendicular to the central axis of the lens 10. In the design of the peripheral zone 26, the proper design for a given patient's cornea and the amount of redistribution of corneal tissue which is desired by the CRT treatment, will in turn dictate relatively precisely the design of the peripheral zone 26. The meridional profile of the peripheral zone 26 may be described by the angle it makes with a line perpendicular to the central axis of the lens, its curvature and its extension from the central axis of lens 10. The peripheral zone 26 is again separate and independent from the central zone 12 and is joined by means of connecting zone 14, and altering its design in general does not effect the design shape or location of the central zone. At the same time, depending upon the characteristics of the central zone 12, the peripheral zone is designed to work in cooperation therewith in a particular manner in an embodiment of the lens.

In a properly fit lens at the beginning of a CRT treatment procedure, the central zone 12 is designed to contact the cornea at its apex, and impart a desired amount of pressure on the cornea depending upon the amount of correction desired. Similarly, the length of the connecting zone 14, as represented by the length of the imaginary rectangle as shown in FIG. 5B, as well as the angle of the truncated conoid forming the peripheral zone 26, are selected such that the peripheral zone 26 is generally elevated above the peripheral corneal surface a desired amount. The amount of elevation is generally selected such that the peripheral zone 26 does not engage the cornea until the central cornea has been sufficiently redistributed to yield the desired final corneal shape or change in the spherical radius of the cornea. Generally, about 3–7 microns of elevation above the cornea at the tangent point for every diopter of correction sought may be acceptable. It should also be recalled that there is a thin layer of tear (5–6 microns deep) which is believed to be non-displaceable from the corneal surface even by CRT pressures. As corneal tissue is redistributed, and at a later point in the progression of the process, the design of the peripheral zone 26 tangentially engages the curved cornea in a predetermined manner, for example approximately half way between the lens edge and J2 or slightly nearer the lens edge. By selecting the extension of the peripheral zone and its angle, the fitter is able to place the location of the tangential touch at the greatest corneal diameter possible. Due to the greater slope of the cornea at the larger chord diameters relative to the central cornea, the ratio of approach of the lens surface to the cornea at the periphery is only a fraction of that observed at the corneal center. Employing the widest diameter possible for the ultimate tangential touch allows the elevation of the lens peripherally to be at a minimum relative to the displacement necessary centrally for refractive correction. Having minimized the peripheral elevation improves lens comfort and centration thus allowing greater consumer satisfaction and larger corrections. As further distribution of corneal tissue occurs, and the engagement with the peripheral zone 26 increases, the compressive force of the lens on the cornea is borne in a progressive amount by the peripheral zone spreading equally in both directions from the original point of tangential contact 26, until the counteracting force imparted on the cornea by the peripheral zone 26 grows to effectively neutralize the central compressive forces imparted by the base curve 12. In this manner, an equilibrium corneal shape is established, with the peripheral zone 26 contributing to the equilibrium achieved while assuring that neither the lens edge nor the connecting zone can dig into the cornea.

In rare cases, the desired correction to be imparted to the corneal shape is significant, such that to achieve the full desired correction, the pre-correction elevation of the peripheral zone 26 would be so great that wearing the lens would create discomfort, or lead to dislocation or decentering of the lens from the desired location on the cornea. In such an instance, the correction imparted by the lens 10 may be performed in step-wise (orthokeratological) fashion, with each step requiring a lens of a similar design to that described, but designed for only partial correction of the corneal shape before equilibrium is achieved by means of the peripheral zone 26. Subsequent lenses in the step-wise series would thereafter take up where the preceding lens terminated in terms of redistribution of corneal tissue, to continue the process. The step-wise approach would continue until the desired correction was fully achieved. In such a process, parameters of subsequent lenses in the step-wise series could in effect remain the same except for shortening the length of the sigmoidal curve (within its imaginary rectangle) as described with reference to FIGS. 5A and 5B, to in turn provide the desired pre-correction elevation of the peripheral zone 26 relative to the partly reshaped cornea.

Figure 7:
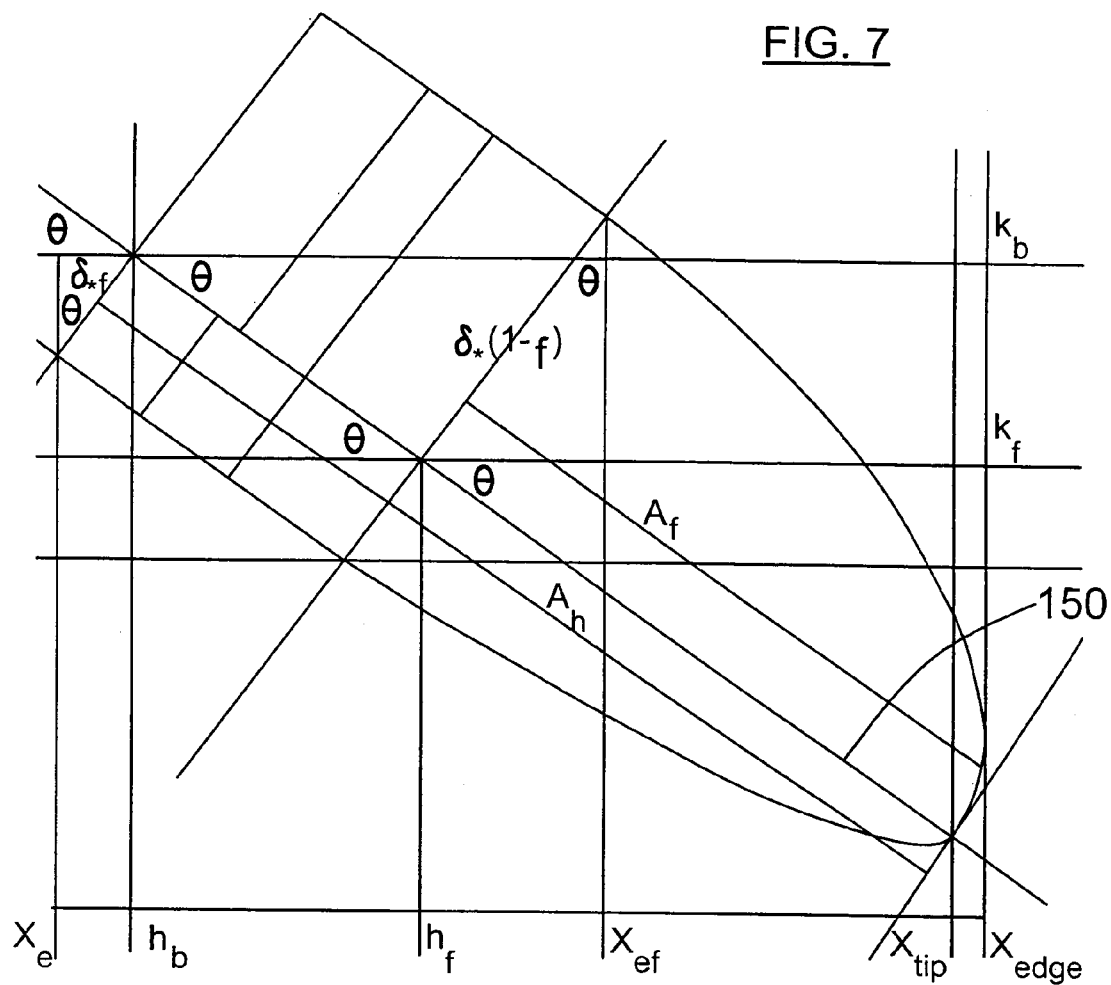
FIG. 7 is a diagrammatic illustration of an edge zone in the peripheral zone of a lens according to an embodiment of the invention.

Turning now to FIG. 7, an edge portion of the peripheral zone 26 is shown schematically, and is specially designed to provide comfort and proper function in a contact lens for normal wear or in CRT process. As shown in FIG. 7, the edge of a lens according to the invention may be provided with a smoothly contoured profile, which is facilitated by the generally parallel relationship between the interior and posterior surfaces in the peripheral zone 26, as well as by the straightness of the peripheral zone 26 itself in this embodiment. The edge terminus of the peripheral zone 26 is shown in cross-section in FIG. 7, and a dividing line bisecting the lens at this region may be envisioned. Such a dividing line may be envisioned to be substantially parallel to and between the anterior and posterior surfaces as shown at 150. This imaginary dividing line may be nearer to the anterior or posterior surface in the edge region. In the embodiment as shown in FIG. 7, this line may be positioned in closer relationship to the posterior surface. A designer can then imagine a quadrant of an ellipse whose center is on this dividing line and whose long axis would extend from the selected ellipse center along the chosen dividing line, to just reach the very edge of the lens. The short axis of the ellipse would extend perpendicularly to the long axis from the center point to contact one or the other sides of the lens. As shown in FIG. 7, the short axis extends toward the posterior surface meridional profile to intersect the posterior profile. Where the short axis reaches the edge, the ellipse would parallel the edge, and where the long axis reached the tip, the ellipse would have curved so as to be perpendicular to the edge at the point where it meets the dividing line. The profile of the quadrant of the ellipse thus merges smoothly with the profile of the peripheral zone 26 and replaces that portion of the meridional profile of the peripheral zone 26 in that region beyond the intersection of the short axis and the profile of the peripheral zone 26 to become the profile of the posterior lens terminus. This posterior terminus can join a similar but inverted structure on the profile of the anterior surface of the lens at the ultimate tip of the lens to form a smooth junction. The dividing line being chosen to be at a location 10 to 90% of the thickness of the lens from the posterior to the anterior and the long axis of the ellipse chosen to be about 0.01 mm to 2.0 mm in length.

A "mirror image" of this ellipse may be imagined on the other side, joining the anterior cross-sectional edge to the tip. The apices of the ellipses would necessarily meet at the dividing line 150, at the tip, and each would roll back to parallel an adjacent edge of the lens. When the dividing line is not midway between the anterior and posterior surfaces, the ellipse quadrants would be differently shaped, but would always smoothly join each other at the tip, and roll smoothly back to meet the original cross-sectional edges. The two ellipse quadrants need not have equal long axis, although their short axis are defined by the placement of the original dividing line 150. By manipulating the location of the dividing line between the anterior and posterior surface, such as by a fraction of this thickness, and manipulating the lengths of the long axis of the ellipse quadrants in each ellipse, one can achieve mathematically and geometrically a desired edge shape. A desired edge shape is then easily cut by means of computer controlled lathes or the like. Altered edge configurations may be better suited to a particular patient, to better accommodate patient characteristics, such as lid aperture and tightness, as well as high amounts of peripheral astigmatism in the corneal shape. The ability to alter the edge configuration again makes the lens according to the invention flexible and adaptable to a particular patients needs, while providing a simple design which is more easily fitted to the particular patient. In examples as will follow, in many cases, the edge configuration suitable may include using equal long axis of 0.4 mm, with a dividing line 150 at approximately 25% of the way between the posterior and anterior surfaces of the lens. Another example as will be seen hereafter, provides an altered edge configuration for use with a very large diameter lens, which includes a thick peripheral zone, for use on corneas with high eccentricities. In such a special case, a long axis of 2 mm with a dividing line at 45% of the distance between the posterior and anterior surfaces may be desirable. It should also be recognized that the anterior profile of the peripheral zone can be designed to have an equivalent angle to that of the posterior profile in the peripheral zone. The anterior lens terminus will have an elliptical curvature derived from a quadrant of an ellipse and extending to the intersection point with the posterior surface.

Figure 8A:
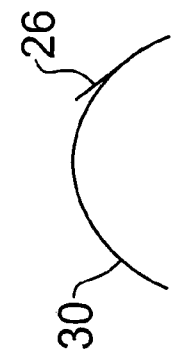
FIG. 8A–8C show schematically the relationship between the peripheral zone and the corneal surface of a patient.
Figure 8B:
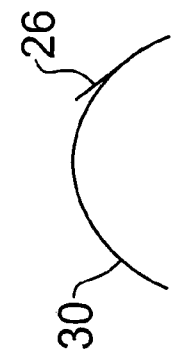
Figure 8C:
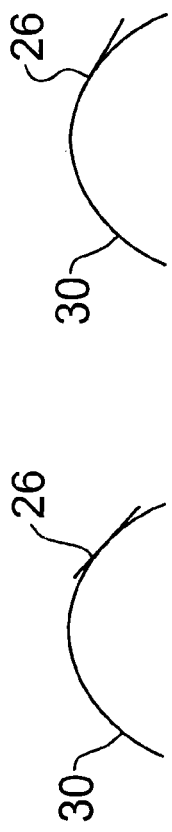

Turning now to FIGS. 8A–8C, in the design of the peripheral zone 26, the angle of the conoid and its chord diameter $D_3$ are preferably chosen so that upon engagement with the cornea after redistribution of corneal tissue as described above, the first point of contact of the cornea with the peripheral zone 26 is approximately midway between the junction ($J_2$) of the peripheral zone 26 with the connecting zone 14 and the outside peripheral edge of the lens 10, and may be slightly nearer the peripheral edge. This engagement is shown in FIG. 8A for a portion of zone 26 on cornea 30. In this manner, the chance of "toe down" or "heel down" engagement of the peripheral zone 26 with the corneal surface, as shown in FIGS. 8B and 8C respectively, is minimized. Such heel down or toe down engagement can lead to corneal abrasion or other complications, and in general, creates undesired discomfort and minimizes the extent of achievable correction. These conditions are easily avoided even after treatment completion when the non curving (infinite radius) peripheral zone is employed, but which are common (probably mandatory) with common ortho K lens designs which use cornea facing concave curvatures with radii less than 17 mm. It remains unrecognized by those skilled in the art that much flatter radii are desirable, as historically making such curves with lathes designed to cut radial arcs has been very difficult.

As described above, the peripheral zone 26 is designed to be elevated from the cornea at initial stages of treatment, with first engagement of the cornea with zone 26 occurring after a predetermined amount of corneal tissue redistribution. After first engagement, further redistribution of the central cornea will lead to further engagement by the flat peripheral zone 26. Further engagement with the peripheral zone will result in symmetric spreading in the width of the engagement zone about the point of first engagement, which ultimately will deter additional corneal flattening while still avoiding heel down or toe down engagement.

In general for a CRT procedure, a designer may start with a diameter approximately 1 mm smaller than the (HVID). The HVID gives a good estimate of the total size of the cornea. The designer then can find the angle whose point of tangency is half way to two thirds of the way from J2 at 8 mm (the sum of standard central zone width (6 mm and connector zone width 1 mm (2 mm considering both sides)) and the overall diameter. The lens base curve is computed from central keratometry and the correction required so all that is left is to use one method or another to determine the rectangle depth that leaves the tangent point elevated above the cornea approximately 3–7 microns per diopter of needed correction. The angle of the truncated conoid forming the peripheral zone 26 in the embodiment as shown is determined to assure that the ultimate engagement of the peripheral zone 26 will be sufficiently far from the junction $J_2$ with connecting zone 14 to avoid toe down engagement. This determination may be made by simultaneous modeling of the patients cornea and a lens designed in accordance with the present invention to visually or mathematically determine the point of engagement upon corneal tissue redistribution, or the same point may be located by trial fitting. With the angle of the conoid determined, it is possible then to select the final diameter of the lens, which in general is selected in trial fitting by noting the diameter at which a flat surface will deviate from the corneal surface sufficiently to yield the lens designer or fitters desired "edge lift". The edge lift of the peripheral zone 26 is the region at the periphery of the lens which is generally required to assure good tear flow under the lens, and to more closely approximate the corneal shape when excursions are made beyond the limbus. This will avoid abrasive interaction between the periphery of rigid lens and the corneal and scleral surface. This edge lift is common to all rigid lens designs as is well known to those skilled in the art of rigid lens design and fitting and is described in texts relating to rigid lens fitting. Beginning at the tangential contact point of the peripheral zone 26 with the redistributed corneal tissue, and extending the peripheral zone 26 outward, the posterior lens surface deviates further and further from the cornea generally. In the lens design, the diameter will normally be set at a value where this deviation between lens and cornea is estimated to be sufficiently great to allow required tear flow under the lens. It should be recognized that the simplicity of selecting a proper diameter for the lens 10 according to the invention for a given lens or patient provides a significant advantage to the lens designer. In an embodiment, the posterior surface of the truncated conoid effectively provides a flat surface relative to the curved surface of the cornea, the proper diameter to achieve the contact between the peripheral zone 26 and cornea as described above is relatively simple, as compared to use of a curved arc. With a curved arc, estimating the location of the first engagement with this arc and the curved cornea is more difficult, and even further, estimating the edge lift at a given diameter is also difficult to accomplish accurately. Thus, providing the peripheral zone 26 in accordance with this embodiment of the invention simplifies the design process, and makes proper fitting of the lens easier and more cost effective.

The design of the peripheral zone 26 is also beneficial to the lens designer in other respects. In some patients, the lens design may be susceptible to decentering, and the fitter will look to stabilize a decentering lens using a larger diameter. Using a peripheral zone 26 which is non-curved, the angle of the conoid of the peripheral zone 26 may simply be increased to move the contact point of peripheral zone 26 with the cornea further from the junction with connecting zone 14 allowing a larger diameter to be used without excessive edge lift. Again, because the zones of the inventive lens are separate and distinct from one another, the ability to increase the angle of the peripheral zone 26 is provided without effecting the design elements of the central zone. Again this process is easily visualized by a lens designer or fitter to arrive at an acceptable design more easily than in prior art lens configurations. Designing the peripheral zone 26 in accordance with the principals of the invention provides a lens design which either initially or in some cases a final lens of a treatment series, provides a lens which may be continuously used by a patient as a "retainer" lens. For such a purpose, the "retainer" lens must in its final engagement configuration perform as a typical rigid contact lens would, with regard to tear flow, centration and non-abrasive contact. Providing the peripheral zone to tangentially engage the curved cornea in the final engagement configuration assures this relationship after redistribution of the corneal tissue is completed. This eliminates the need for an additional lens dispensing after correction has been achieved.

Several examples are set forth below.

EXAMPLE 1

This example is based upon a patient having a prescription as follows:

1. 44.50×46.00@180, Rx−4.00−0.75×180, e=0.5, HVID 11.6

Figure 10:
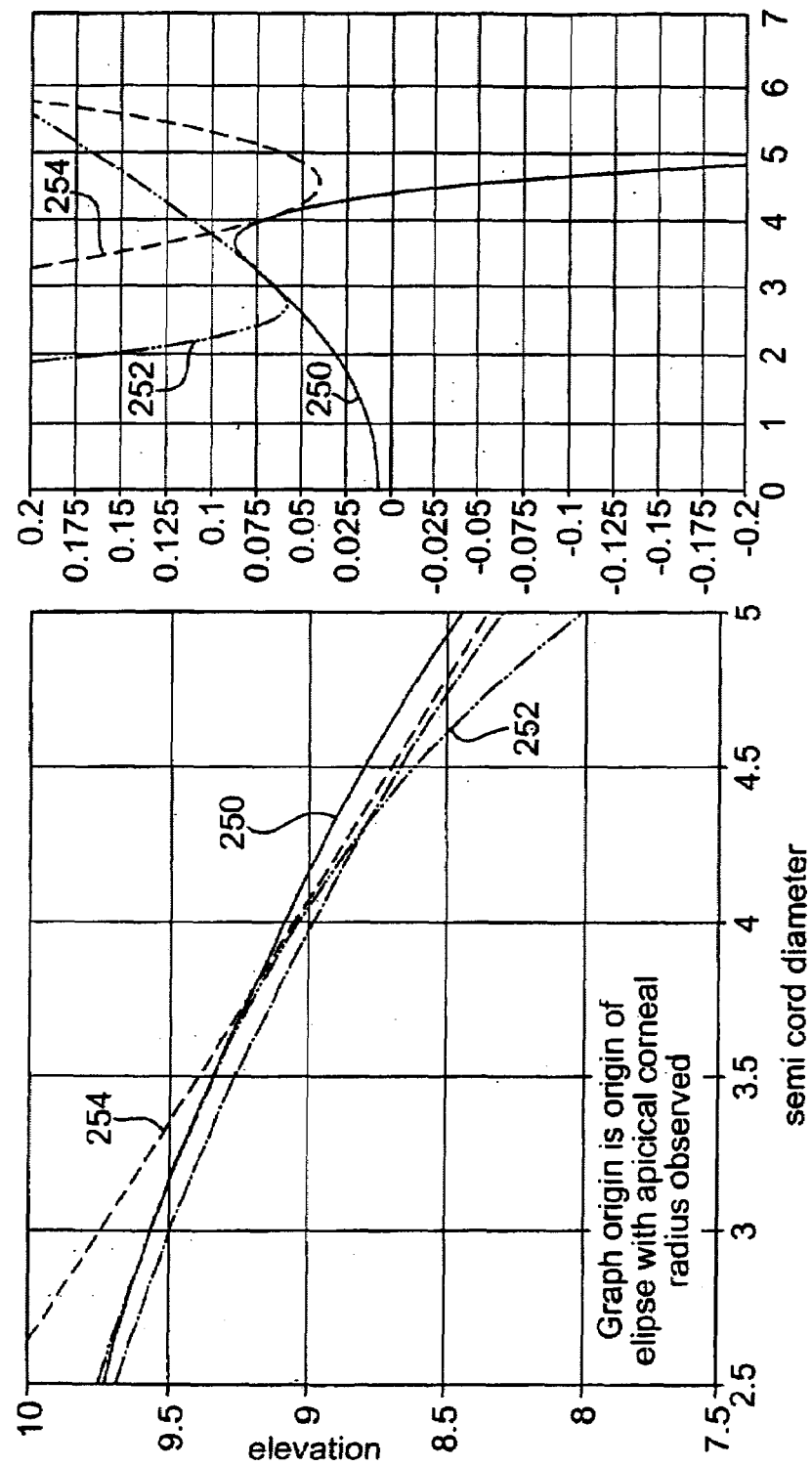
Figure 11:
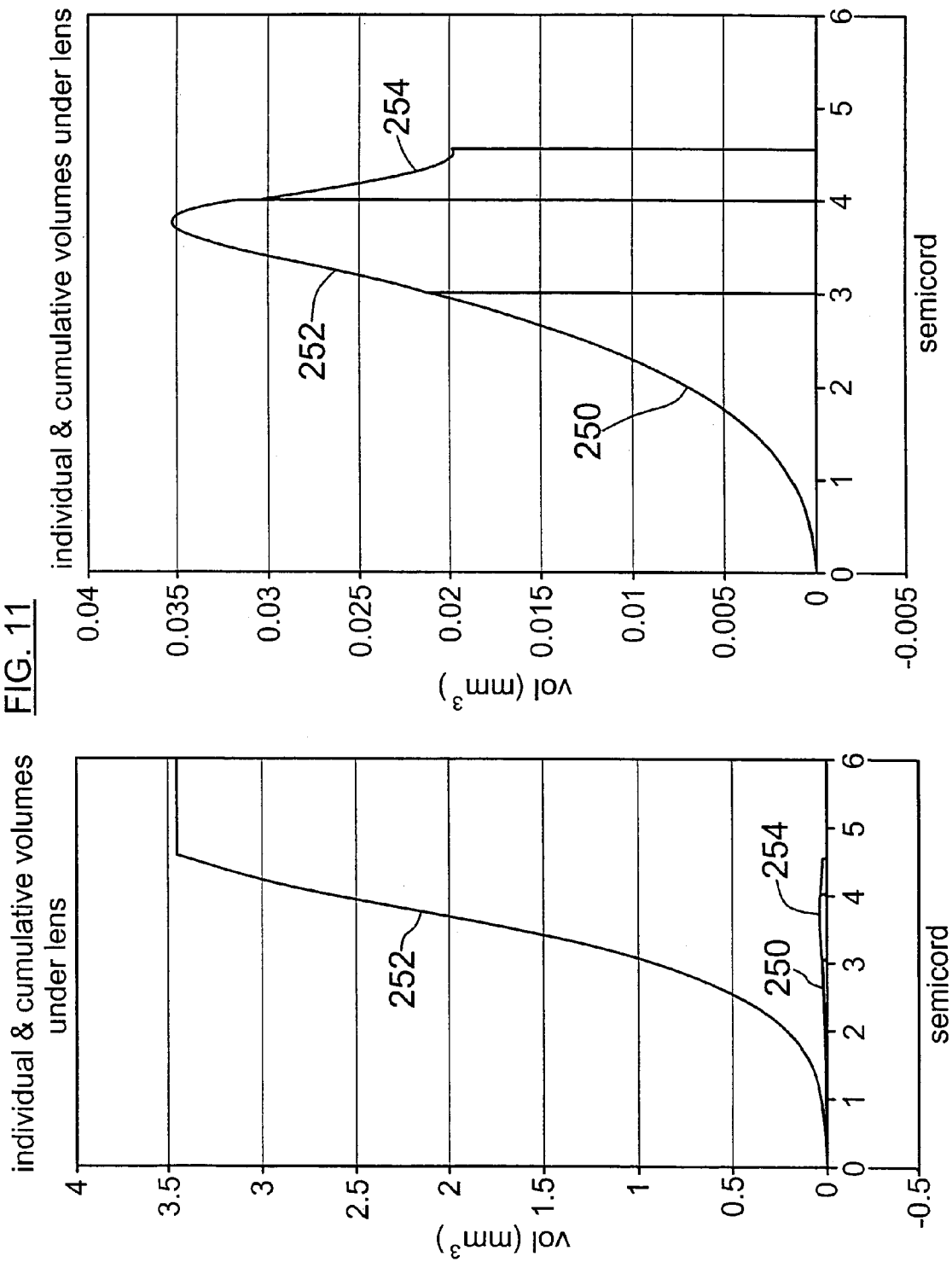
Figure 13:
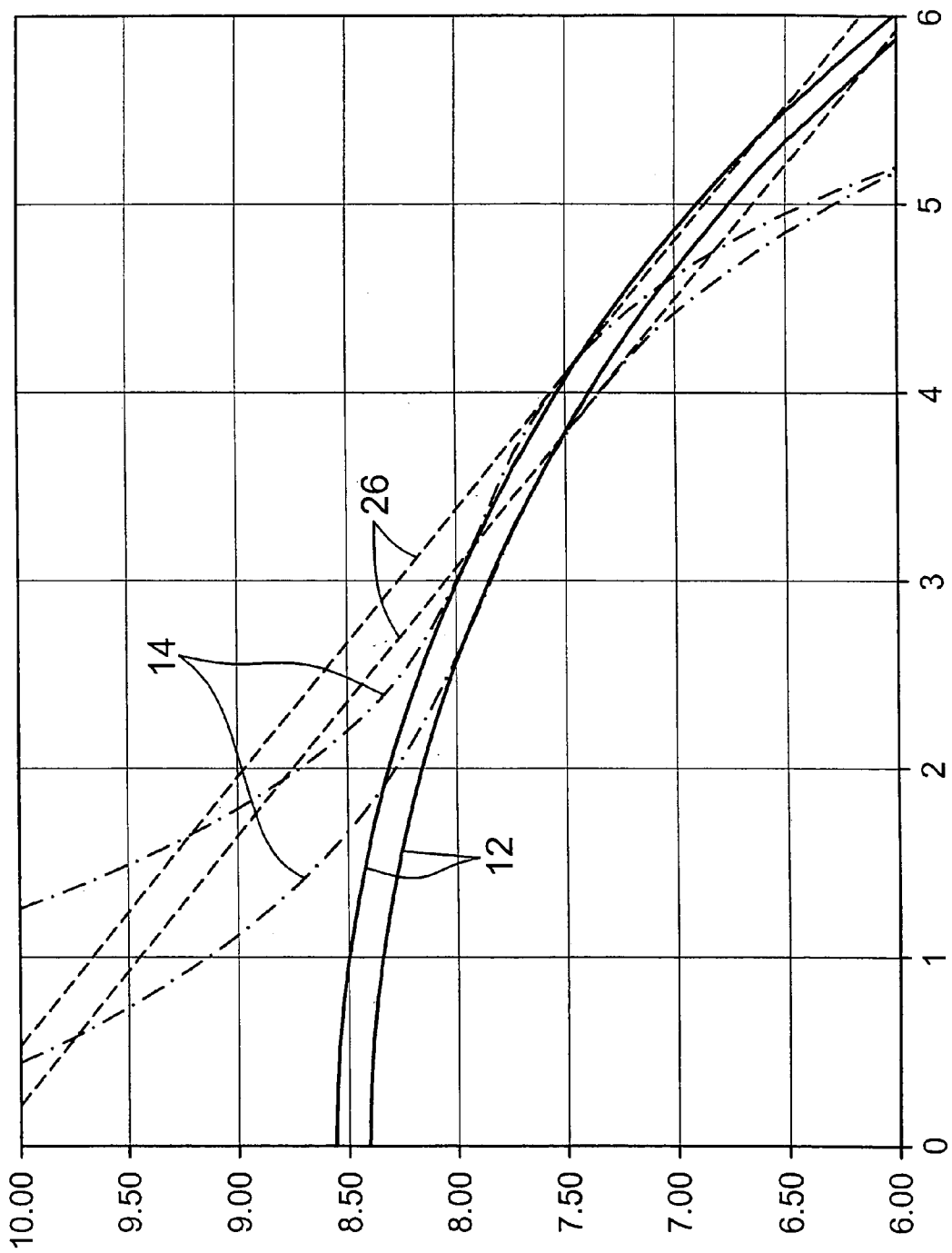

Based upon the prescription of patient 1 above, a lens designer would select the power of the lens to correct the patient to a desired degree. In this example, with reference to FIG. 9, the lens/cornea power difference wanted for patient 1 is selected as −4.5 diopters as indicated at 200. The power difference selected is slightly more than the degree of correction required for the patient, to allow substantial correction of visual acuity over a longer period of time after reshaping of the cornea using the lens according to the invention. Patient 1 also has a fairly high astigmatism of 0.75, and the ellipticity of the cornea is 0.5 as shown at 202. Patient 1 has an HVID of 11.6, as noted at 204, and based upon this HVID, the diameter of the lens which is recommended is 10.6 mm as indicated at 206, being 1 mm less than the measured HVID. The selected diameter for the lens is shown at 209, being chosen based upon the recommended diameter and the relationship between the zones of the lens. Based upon the lens/cornea power difference wanted, a base curve of 8.4 is selected for this patient as indicated at 208. Other parameters of the lens may be selected which provide desired characteristics for most patient conditions, including the radial distance from the lens center to the junction between the base curve and the sigmoidal curve, indicated at 210 as 3.0 in this example. The width of the sigmoidal curve is selected to be 1.0 mm as indicated at 212, the lens power is selected at 214, representing examples of variables which could be used to modify characteristics of the lens, but to simplify lens design, may be held constant to limit the number of variables used by the lens designer. Based upon the desired correction, it was previously mentioned that the peripheral zone is initially elevated above the cornea to a predetermined degree to provide for redistribution of corneal tissue to a predetermined shape. The angle of the peripheral zone 216 is selected to be −35 to provide the proper relationship to the cornea as to spacing and to avoid toe down or heel down engagement as previously described. As an example, the elevation of the peripheral zone above the cornea can be selected at six microns per diopter of correction to be imparted by the base curve. As indicated at 218, the recommended depth of the sigmoidal curve for providing the desired elevation of the peripheral zone is 0.51 mm. Based upon these factors, the lens designer can note the relationship of the surface visually, such as shown in FIG. 10, representing the elevation of the posterior surface from the cornea along a semi-chord diameter of the lens. As seen, the base curve 250, the sigmoidal curve 252 and the peripheral zone 254 are shown in relationship to one another, and allow the designer to select the proper diameter of the lens. To achieve proper tangential contact between the peripheral zone and the cornea upon redistribution of corneal tissue as previously described, the position of the peripheral zone can be determined, along with its angle, allowing the fitter to vary the depth of the sigmoidal curve to obtain the proper relationship to the cornea. Variations of the depth of the sigmoidal curve will in general move the peripheral zone curve 254 up and down in the graph of FIG. 10, while changing the angle of the peripheral zone will move this surface right or left. It should be evident that the relationship of the surfaces relative to each other and to the cornea are easily visualized and facilitate simple and proper design of the lens for a particular patient. It is also possible to show the individual and cumulative volumes under the lens according to a particular design of this type, such as shown in FIG. 11, relative to a model cornea. This representation of the lens design provides the designer with an easy tool for identifying any void spaces, which may lead to the creation of bubbles beneath the lens. A semi-meridian section 255 of the lens according to this example is shown in FIG. 12, and the front and back individual curves for each of the zones 12, 14 and 26 are shown in FIG. 13. It is noted that the thickness of the central and peripheral zones remain substantially constant, with the sigmoidal curve thickness transitioning between the two, as shown in FIG. 13. Due to the relatively high astigmatism of patient 1, the thickness of the peripheral zone is increased slightly relative to the central zone to avoid possible warping of the lens over time by lid pressure applied thereto. It is possible to change the thicknesses of the zones simply, allowing great flexibility in designing the central and peripheral zones in a desired manner to achieve proper lens stability as well as to allow proper oxygen transmission and tear flow beneath the lens. With reference to FIG. 9, to change the center thickness, a designer may vary the delta r value for the junction between the base curve and the sigmoidal curve as shown at 222. This controls the thickness of the lens at that location, and allows calculation of the true center thickness at 224 based upon the power of the lens. Again, it is possible to limit the variables to simplify the design of a lens which would cover most patient conditions, but flexibility exists in the lens design and system according to the invention, to facilitate achieving the desired objectives for a given patient.

EXAMPLE 2

For patient 2, having a prescription as follows:

42.00×44.00@165, Rx−3.50−1.00×160, $e=0.6$, HVID 11.4

Figure 15:
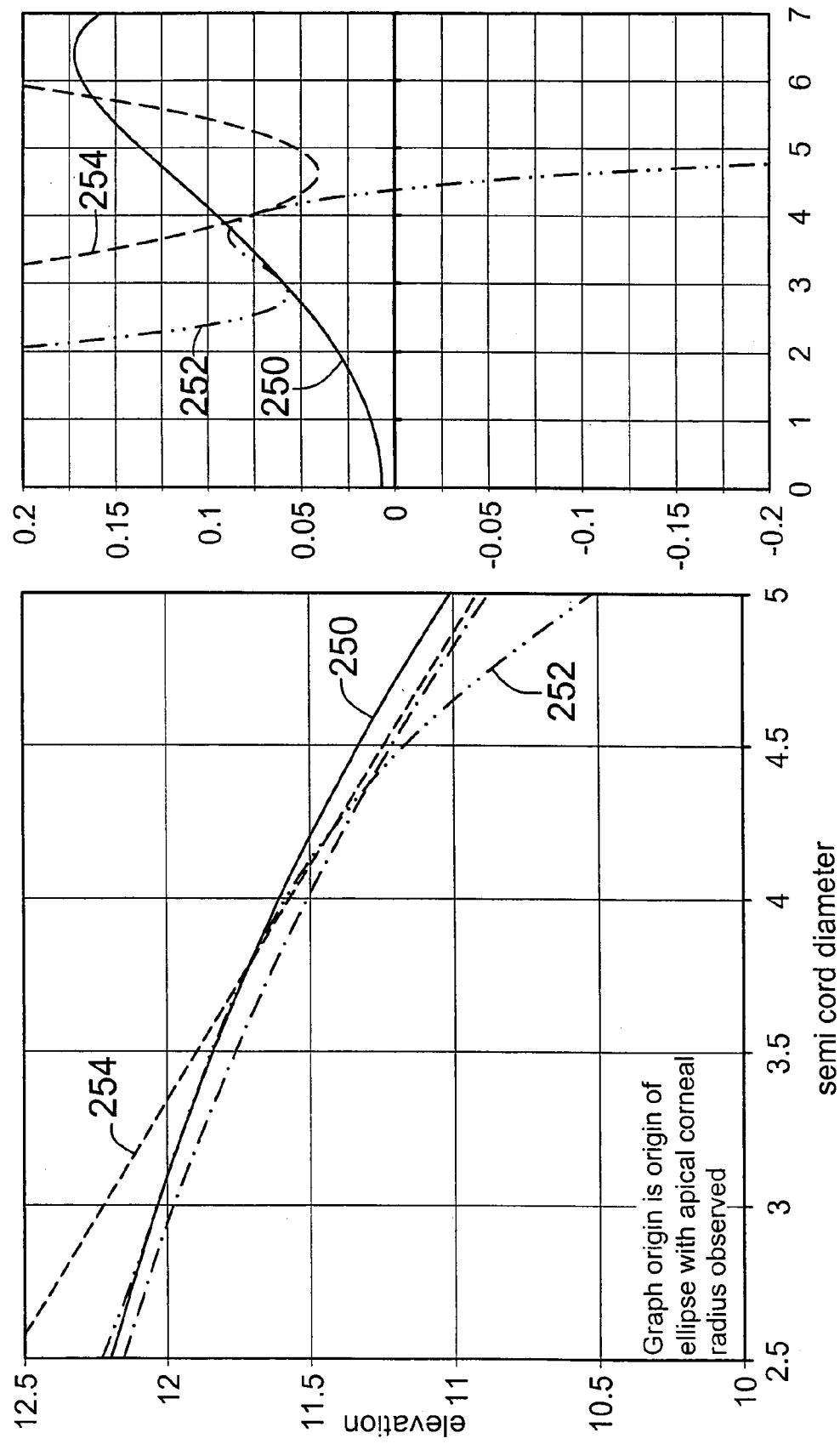
Figure 17:
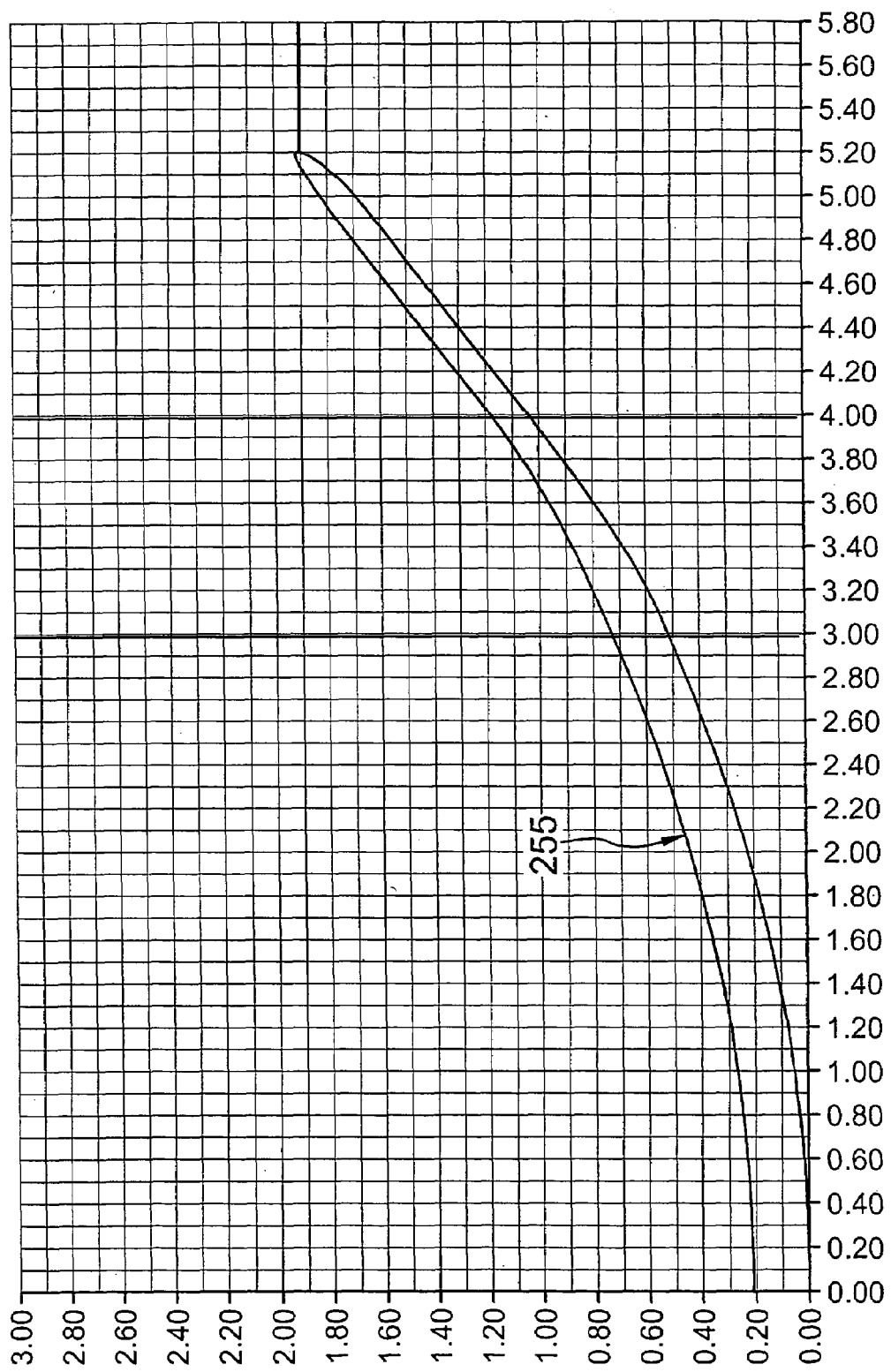
Figure 18:
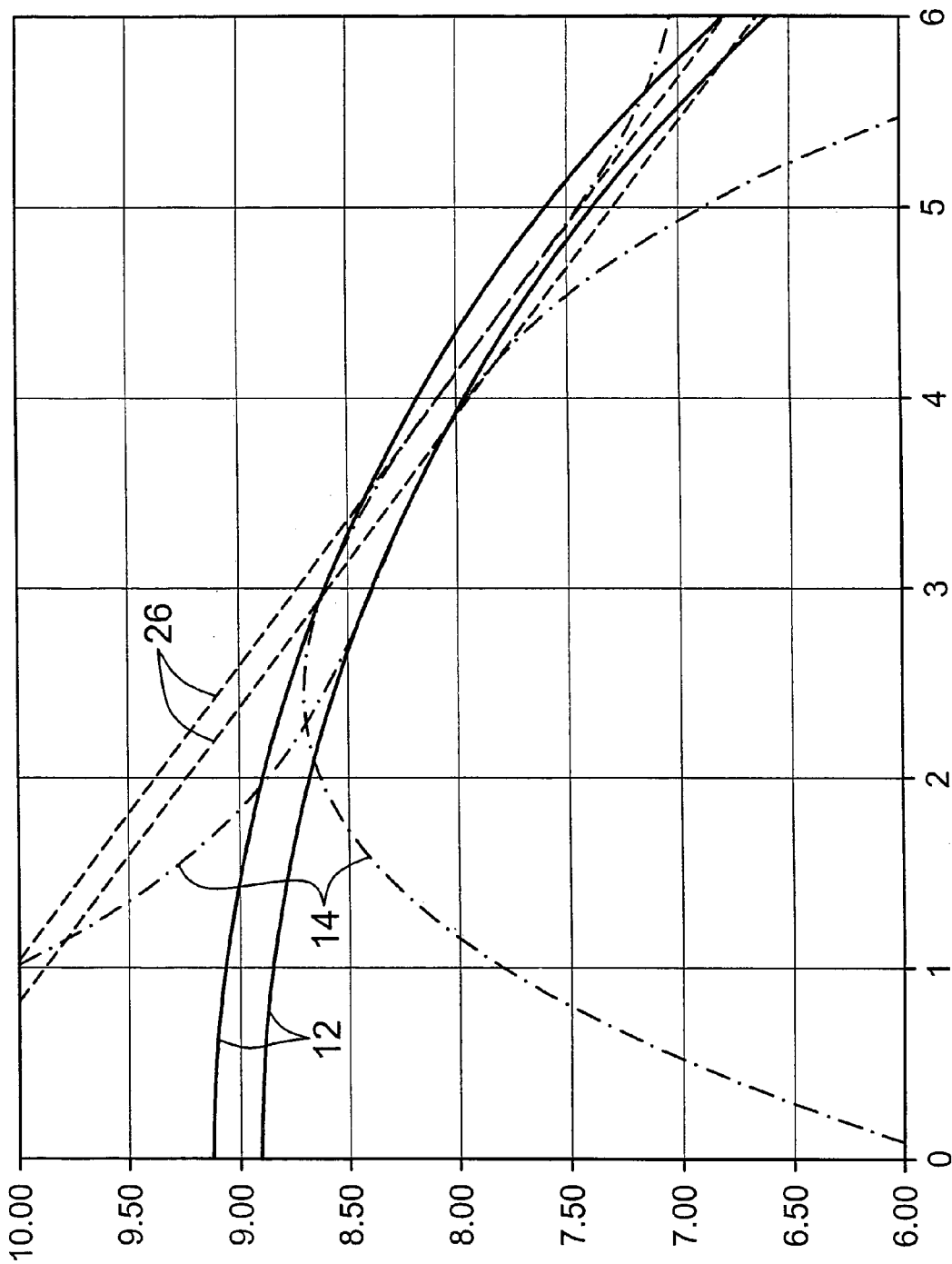
Figure 20:
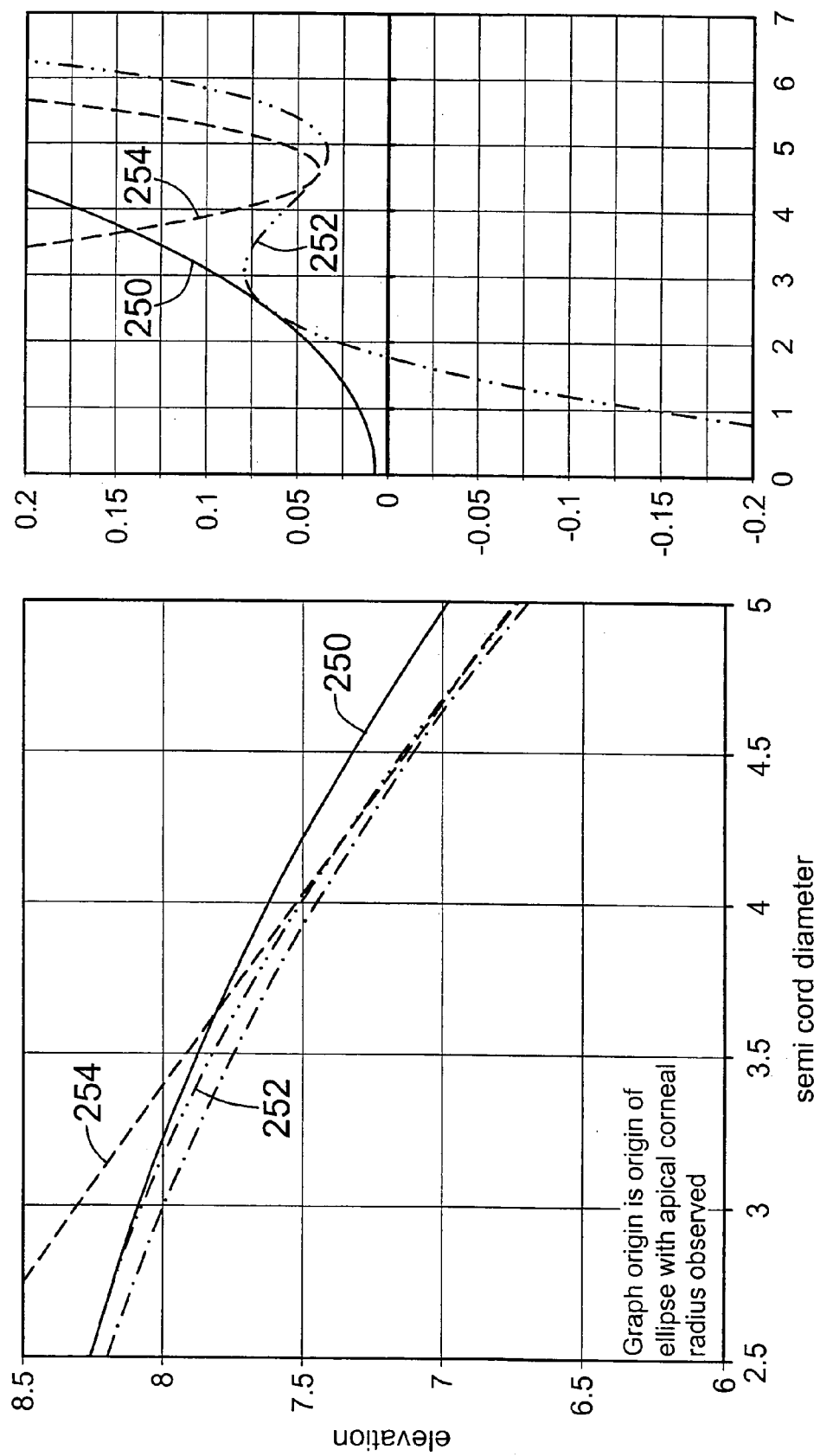
Figure 22:
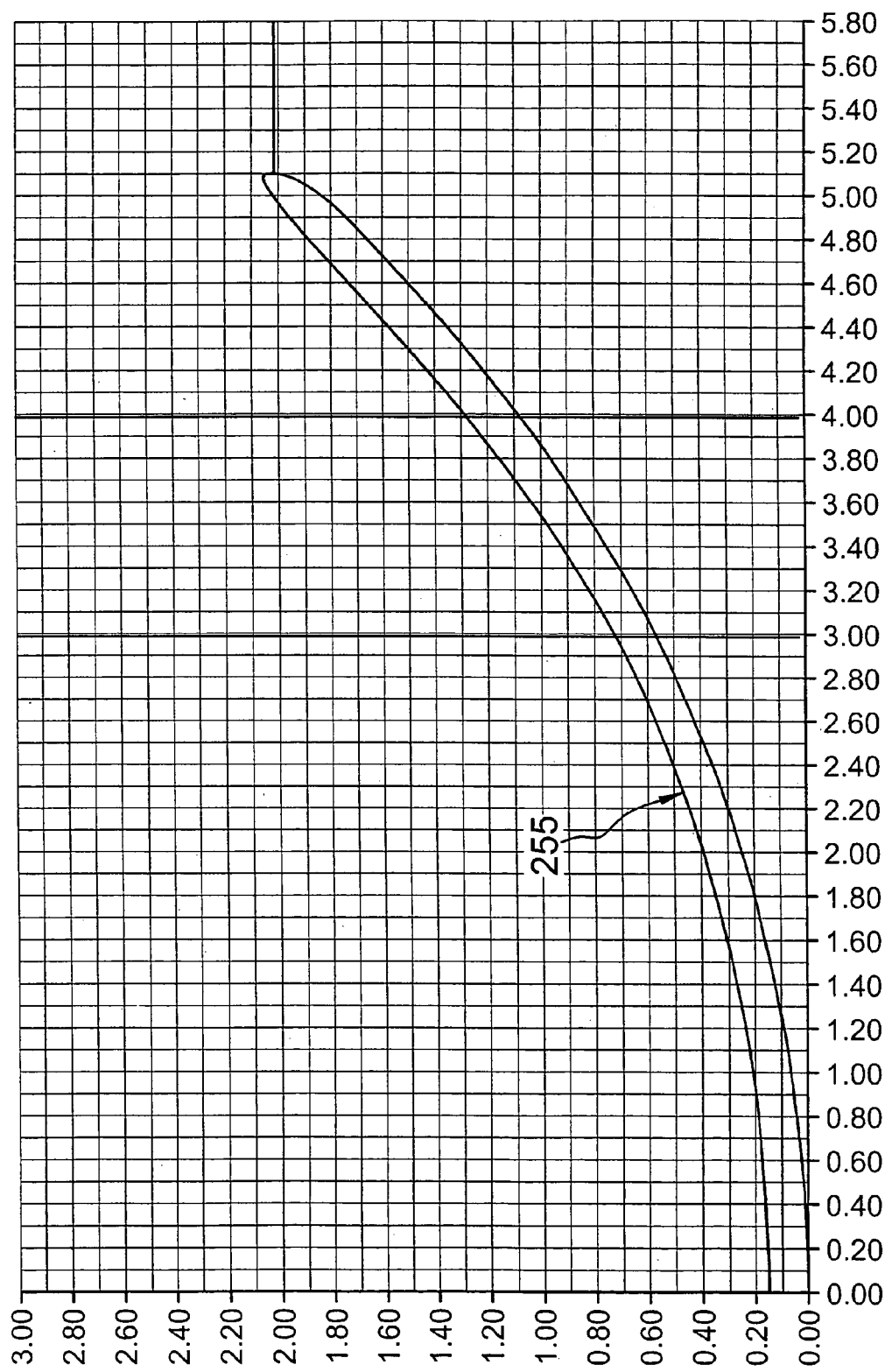
Figure 23:
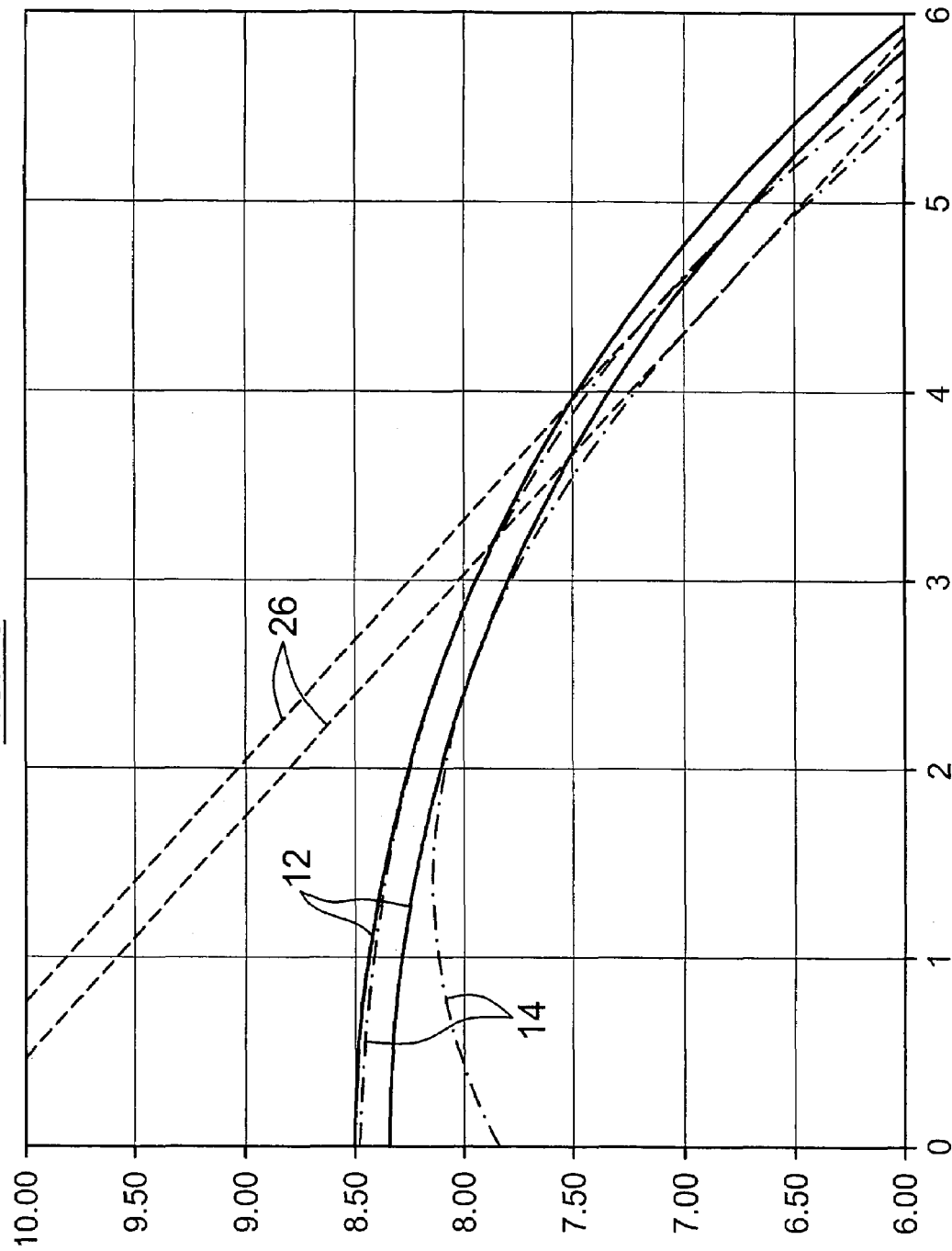
Figure 25:
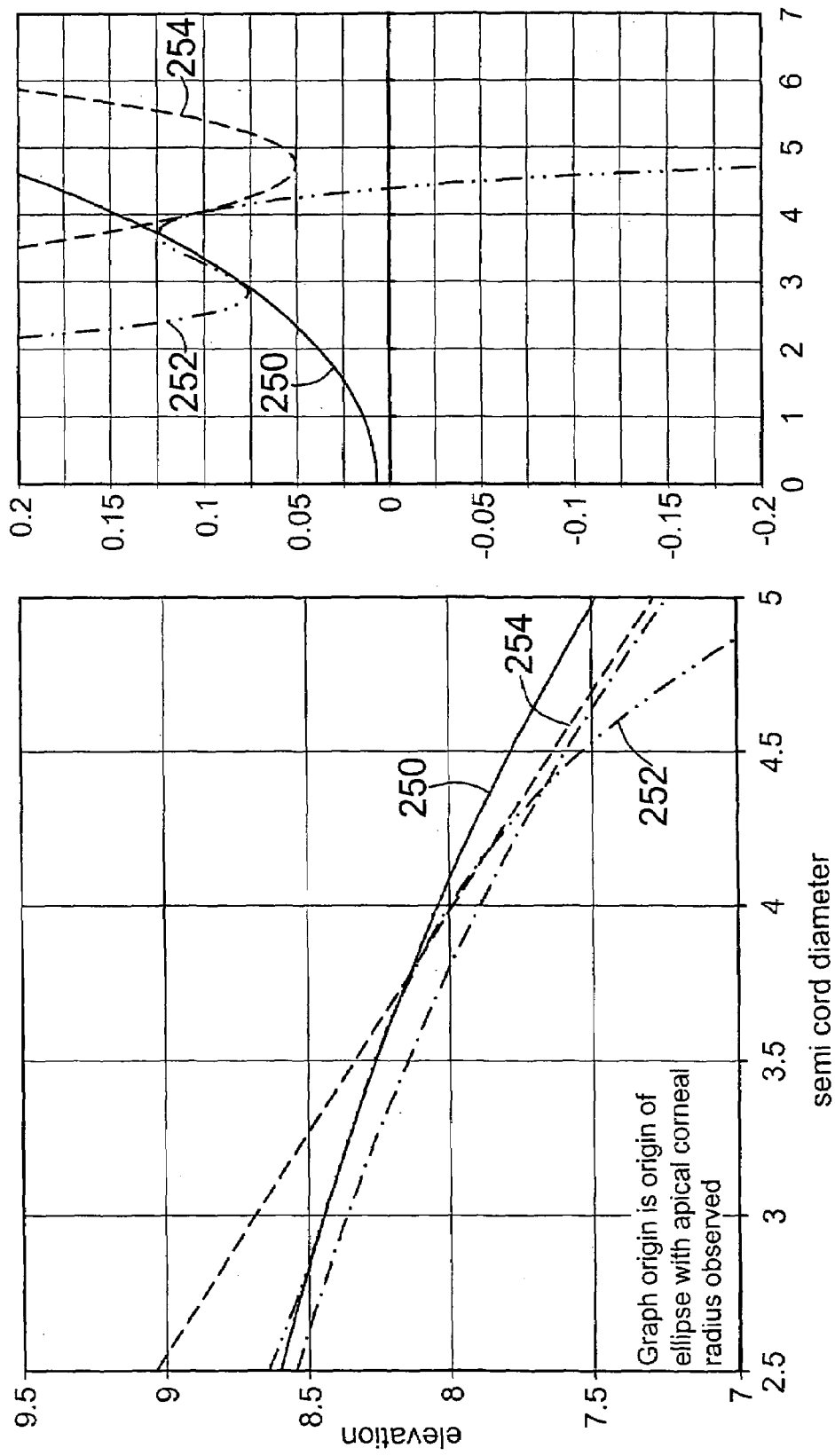
Figure 26:
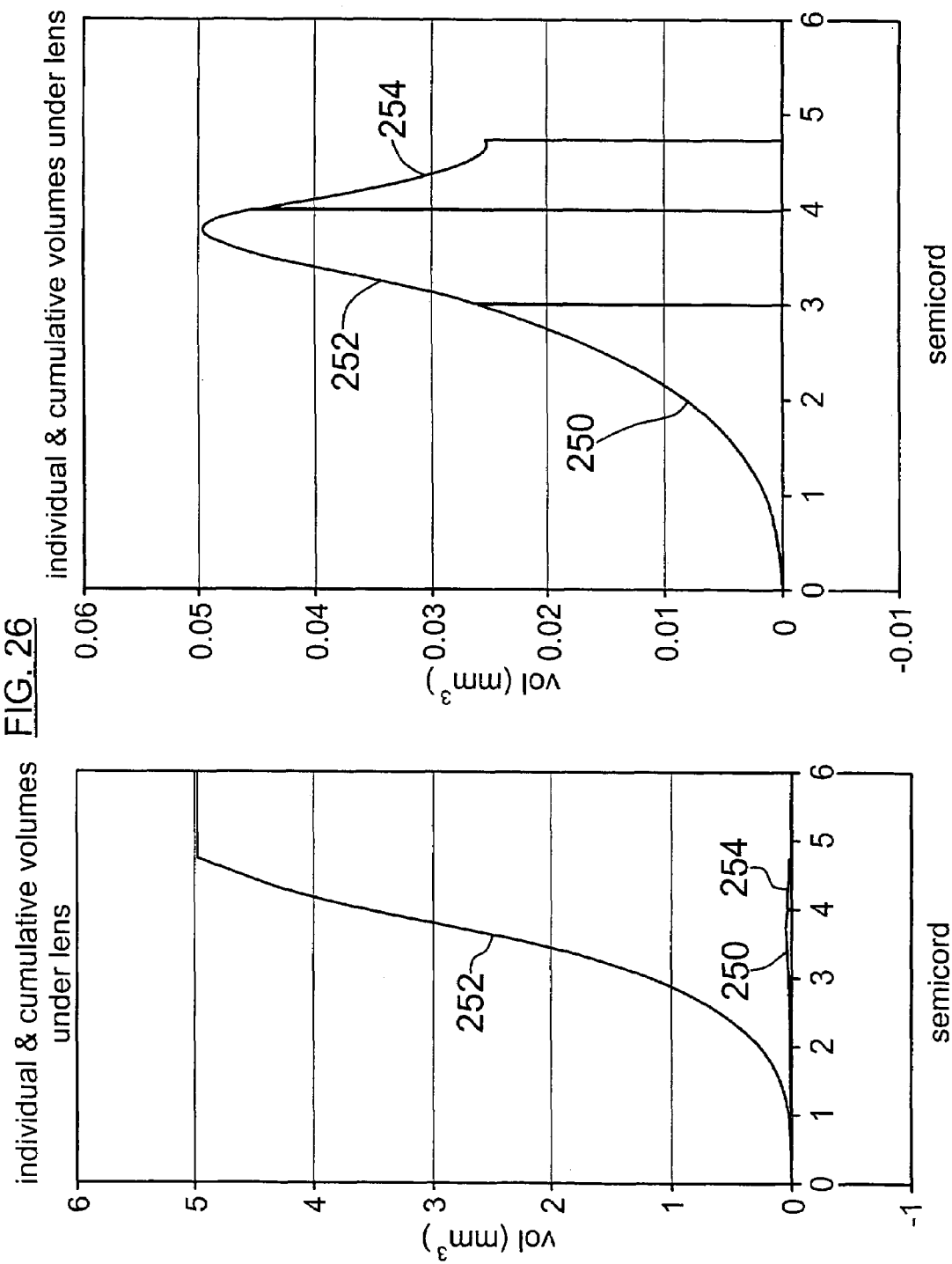

With patient 2, a relatively high refractive error along with high astigmatism is noted, which again will lead the lens designer to increase the value of the ellipticity of the cornea as shown at 230 in FIG. 14. Due to the high astigmatism, it is desired to have a thicker center in the lens, which again is easily accommodated by varying the delta r for the first junction between the base curve and the sigmoidal curve as shown at 232. Other aspects of the particular lens design for patient 2 are determined in a manner similar to that described with reference to patient 1 in Example 1. Particular values for the variables, including base curve, lens diameter, angle of the peripheral zone as well as depth of the sigmoidal curve are shown in FIG. 14, with the relationship between the zones shown graphically in FIG. 15. The relatively thick center and thinner edge portion in this lens design is visually represented in the semi-meridian section 255 in FIG. 17, with individual and cumulative volumes under the lens shown in FIG. 16. FIG. 18 shows the relationship of the front and back surfaces in each zone 12, 14 and 26 relative to one another.

EXAMPLE 3

For patient 3 having a prescription as follows:

46.50×46.50@180, Rx−6.00−0.75×90, $e=0.4$, HVID 11.2

With reference to FIGS. 19–23, a lens design according to the present invention for patient 3 is shown. Selecting parameters of the base curve, base diameter, angle of peripheral zone as well as depth of the sigmoidal curve are selected in a manner similar to that previously described, providing a first indication of fit to the lens designer. For patient 3 using a value of 3.0 mm as the radial distance from the lens center to the first junction, which may in general be held uniform, produced a relatively large void space adjacent the base curve at the first junction. The lens designer therefore has the flexibility to reduce or narrow the optical zone, as indicated by the use of 2.5 mm at 210 and increases the width of the sigmoidal curve indicated at 212 as 2.0. The relationship of the zones relative to one another and the cornea are shown in FIGS. 20–23, wherein the void space adjacent the base curve at junction 1 was reduced.

EXAMPLE 4

For patient 4 having a prescription as follows:

41.50×43.00@180, Rx−5.00−0.75×180, $e=0.3$, HVID 11.9

Figure 27:
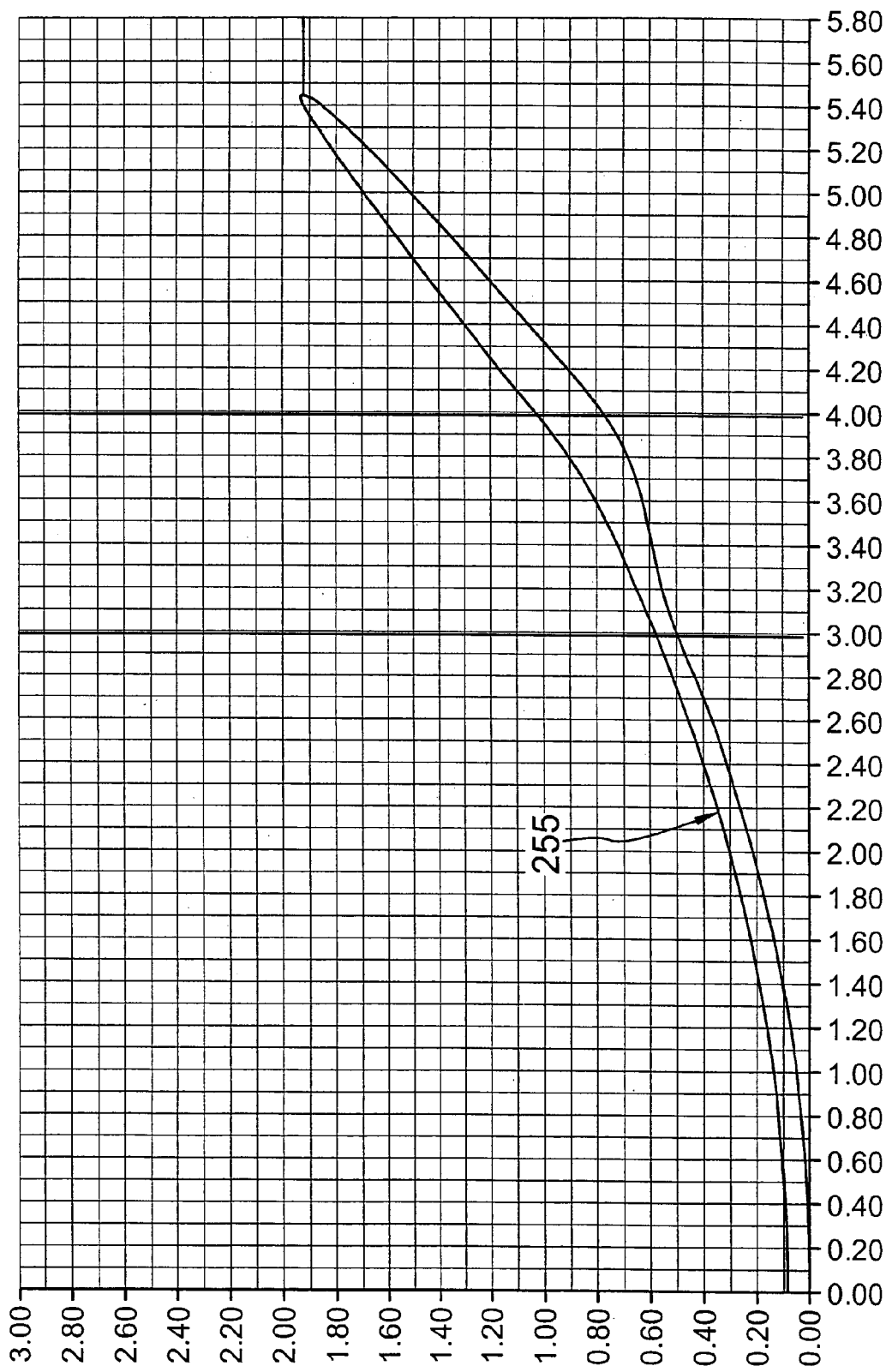
Figure 28:
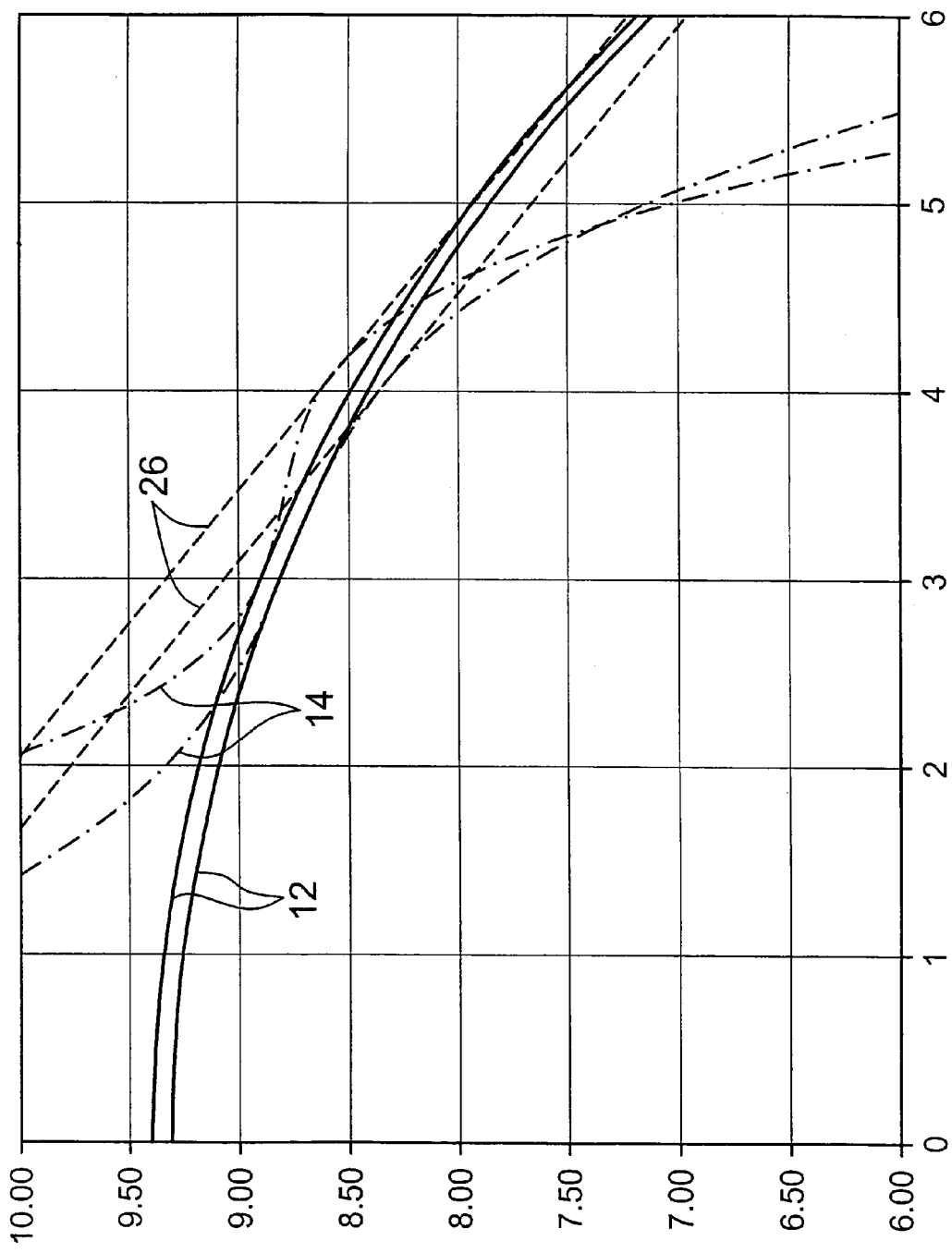
Figure 29:
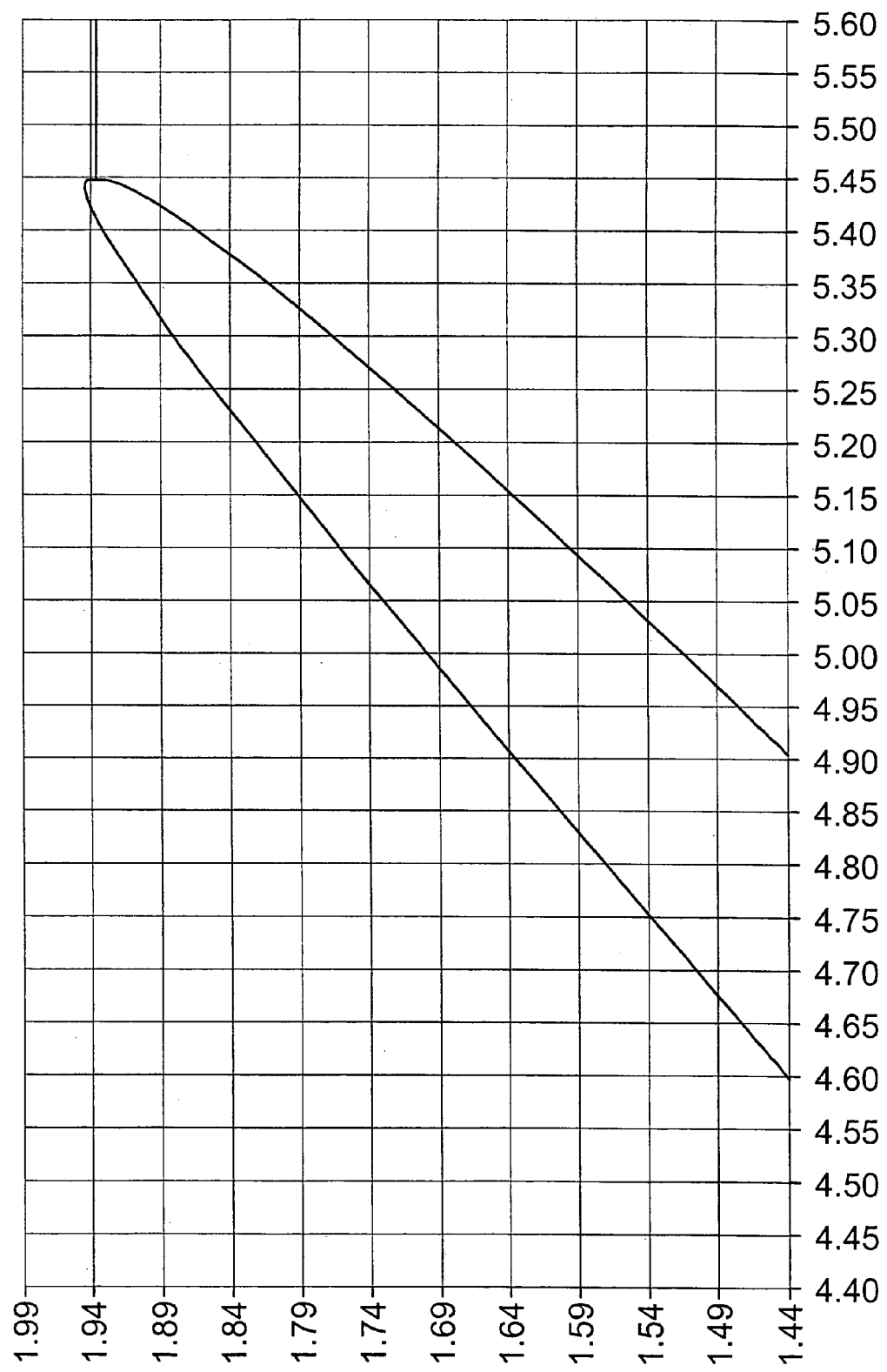
FIG. 29 is a partial cross section of the edge of the lens as shown in the example of FIGS. 24–28.
Figure 31:
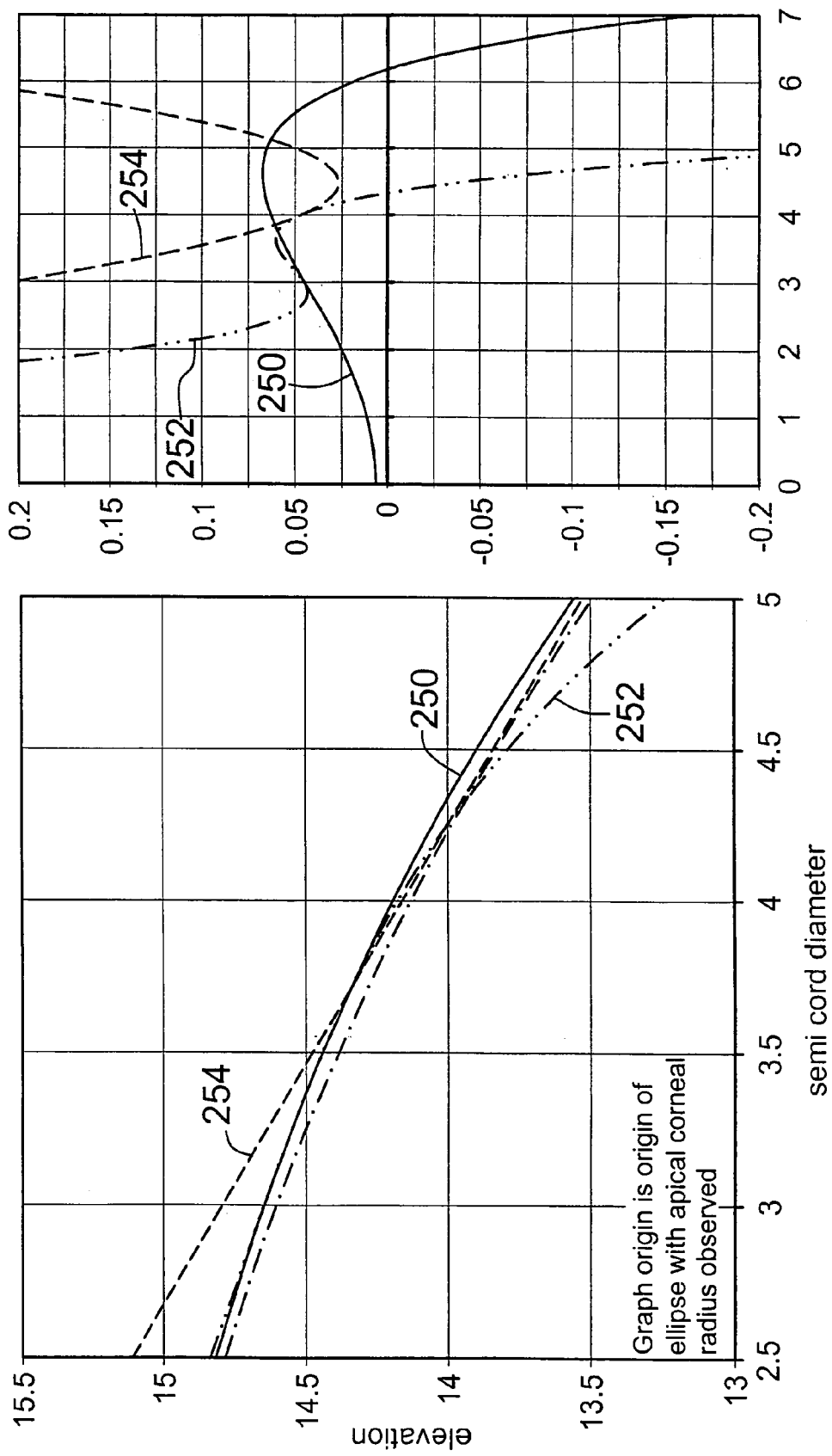
Figure 33:
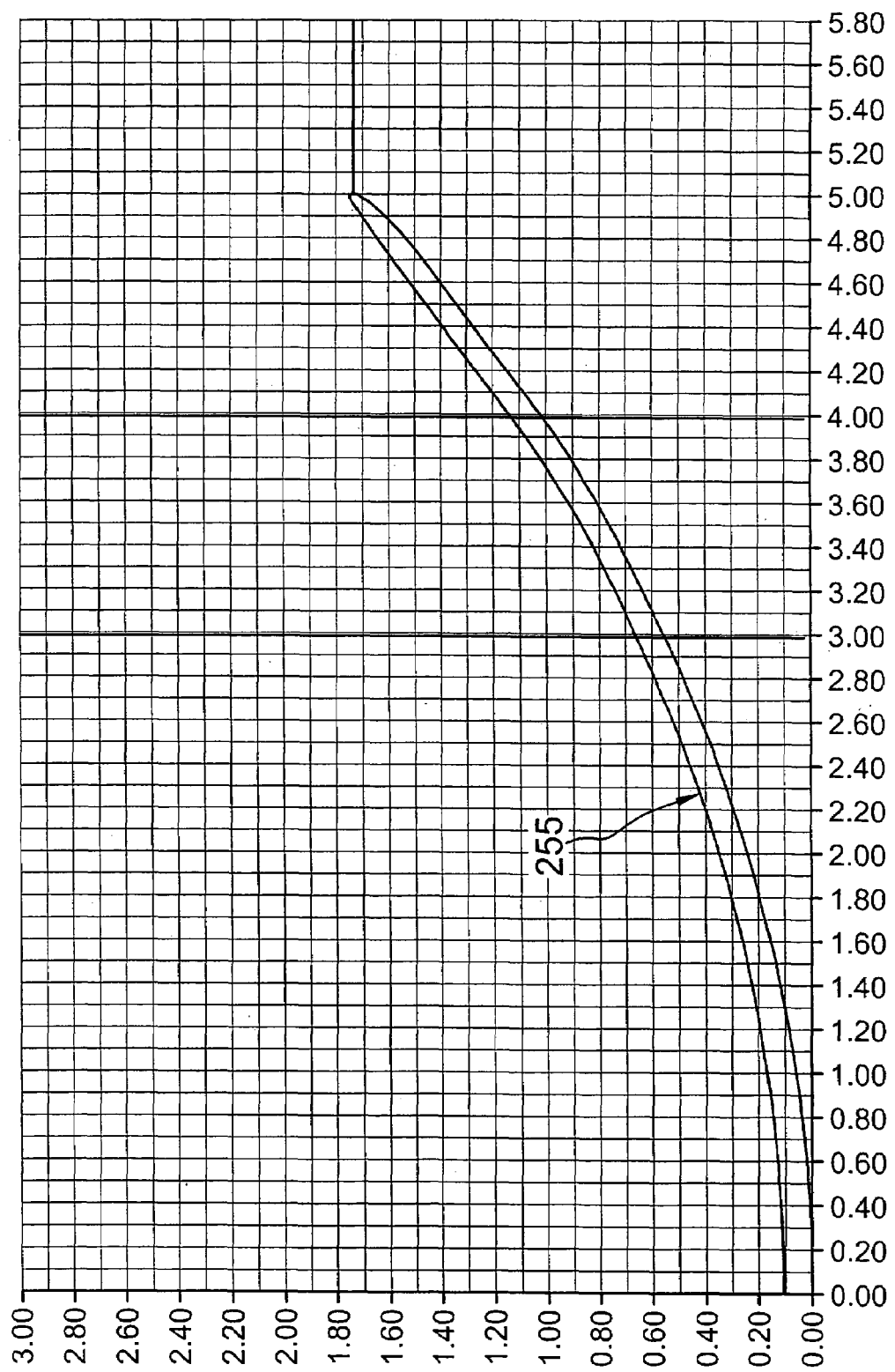
Figure 34:
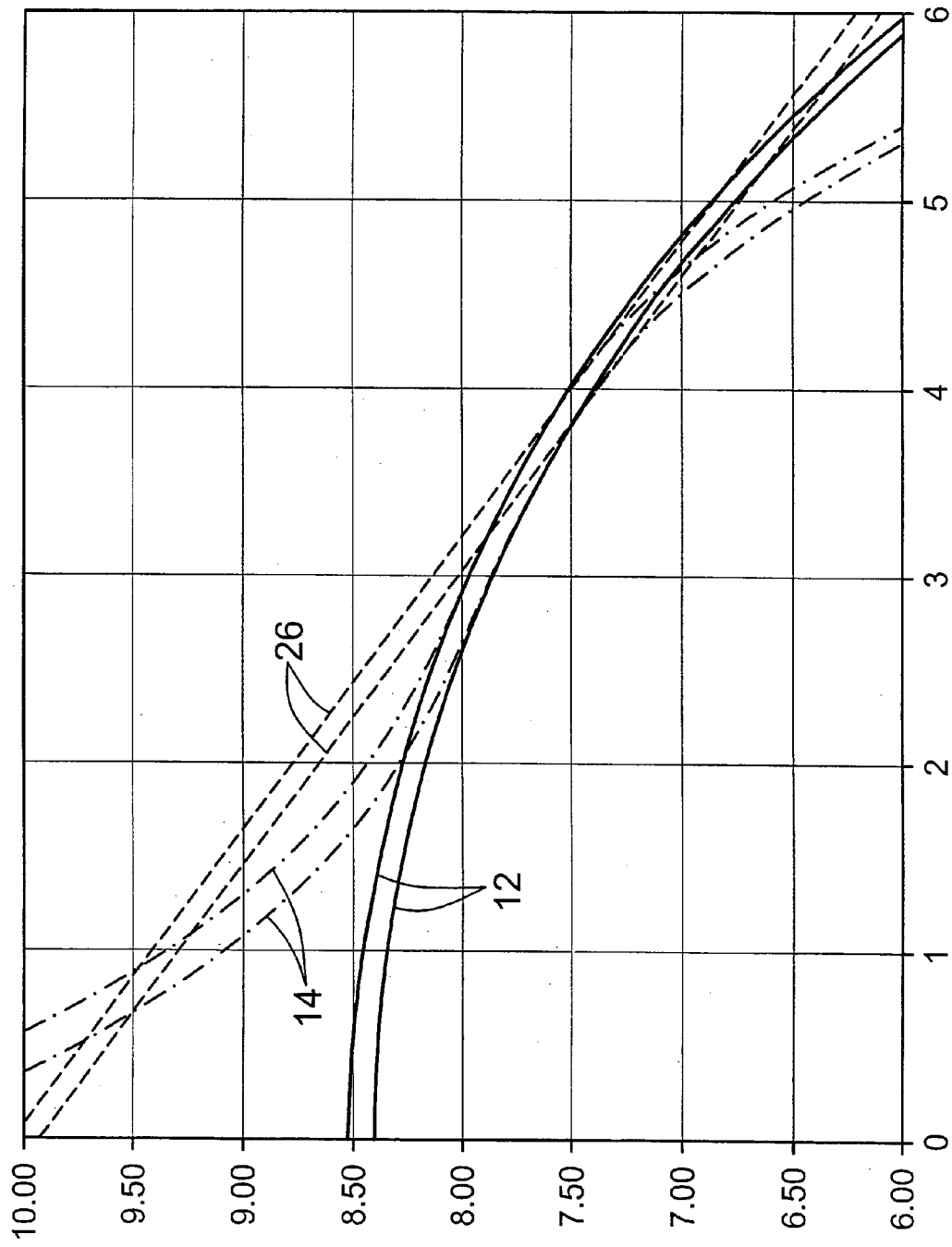

Patient 4 has a large refractive error, as well as a large HVID, translating to a relatively larger lens diameter than previous examples as shown at 209. At the same time, patient 4 has a low ellipticity, such that proper support for the lens may not be provided at peripheral regions. In this circumstance, it is possible that lens might warp or bend out on the outside peripheral edges due to the low ellipticity, such that the designer may wish to thicken the outside portion of the lens. At the same time, thickening the peripheral regions of the lens will reduce oxygen transmission to the cornea, and therefore the designer may wish to reduce the thickness of the central zone to allow better oxygen transmission. As shown in FIGS. 24–28, a lens designed according to the invention for patient 4 may accommodate such changes by reducing the delta r translation of the first junction at 222 and increasing the delta r translation of the second junction at 242. Although these modifications allow redistribution of mass toward the peripheral region of the lens as shown in FIG. 27, and reduces the thickness of the central zone, the lens designer may also want to extend the edge profile and control the edge shape to minimize discomfort. In this example, the edge contour provided in a desired design is started earlier to reduce the mass at the very peripheral regions of the lens as shown in FIG. 29 reducing the mass at the edge where the eyelid will engage the lens facilitates comfort. To facilitate shaping the edge in this manner, the parameters of the ellipse creating the posterior curve edge are modified at 243, 244 and 245 to facilitate imparting the desired edge contour and promoting tear flow and oxygen transmission.

EXAMPLE 5

For a patient 5 having a prescription as follows:

43.50×44.00@180, Rx–3.00, e=0.7, HVID 11.0

For patient 5, it is noted the cornea is very spherical with no astigmatism. In such a case, lens stability concerns are minimized, and the lens may be made thin at central and peripheral portions. Reducing the thickness of the lens may be accomplished by reducing the delta r translation points for the first and second junctions as shown at 222 and 242 in FIG. 30. FIGS. 31–34 show the lens design for patient 5 in more detail.

In the above examples, the prescriptions represent a very wide range of myopic corneas. It should also be recognized that the lens design can accommodate patients having hyperopia. In such a lens, the final desired shape of the cornea is achieved by redistributing corneal tissue to form a steeper corneal surface. Thus, such a design would typically use a steeper base curve accordingly, which in turn would suggest a greater apical separation between the cornea and lens to ensure the base curve does not penetrate the cornea when analyzed on a model cornea. The central zone may also be narrower, which again is easily accomplished by widening the connecting zone in the lens design. The peripheral zone may also need not be elevated from the cornea at initial stages to the degree a myopic design would, due to the correction to be imparted to the corneal shape, as the lens will effectively be squeezing the cornea from a larger annular zone to fill a smaller central zone of the lens.

EXAMPLE 6

Figure 36:
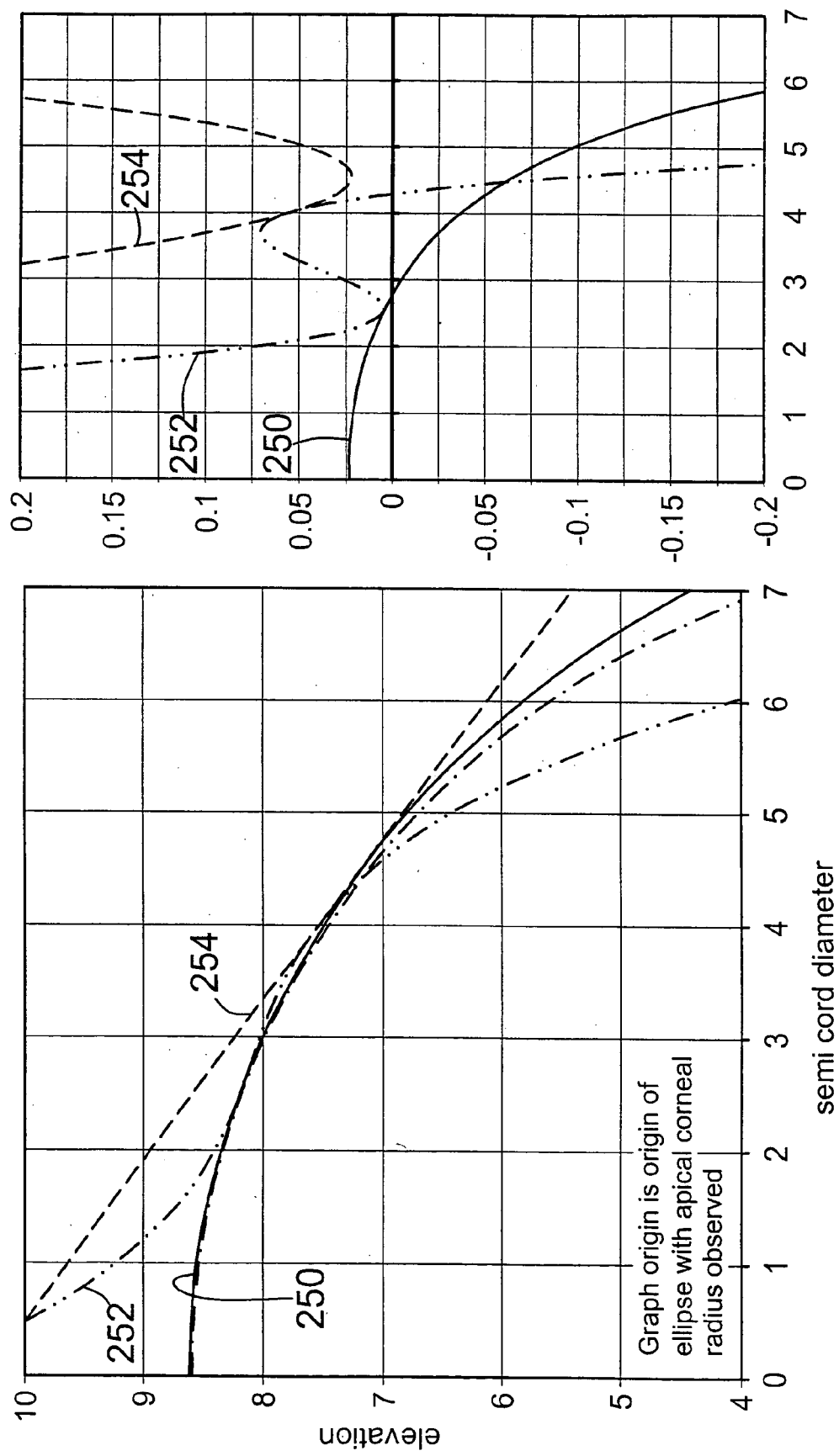
Figure 37:
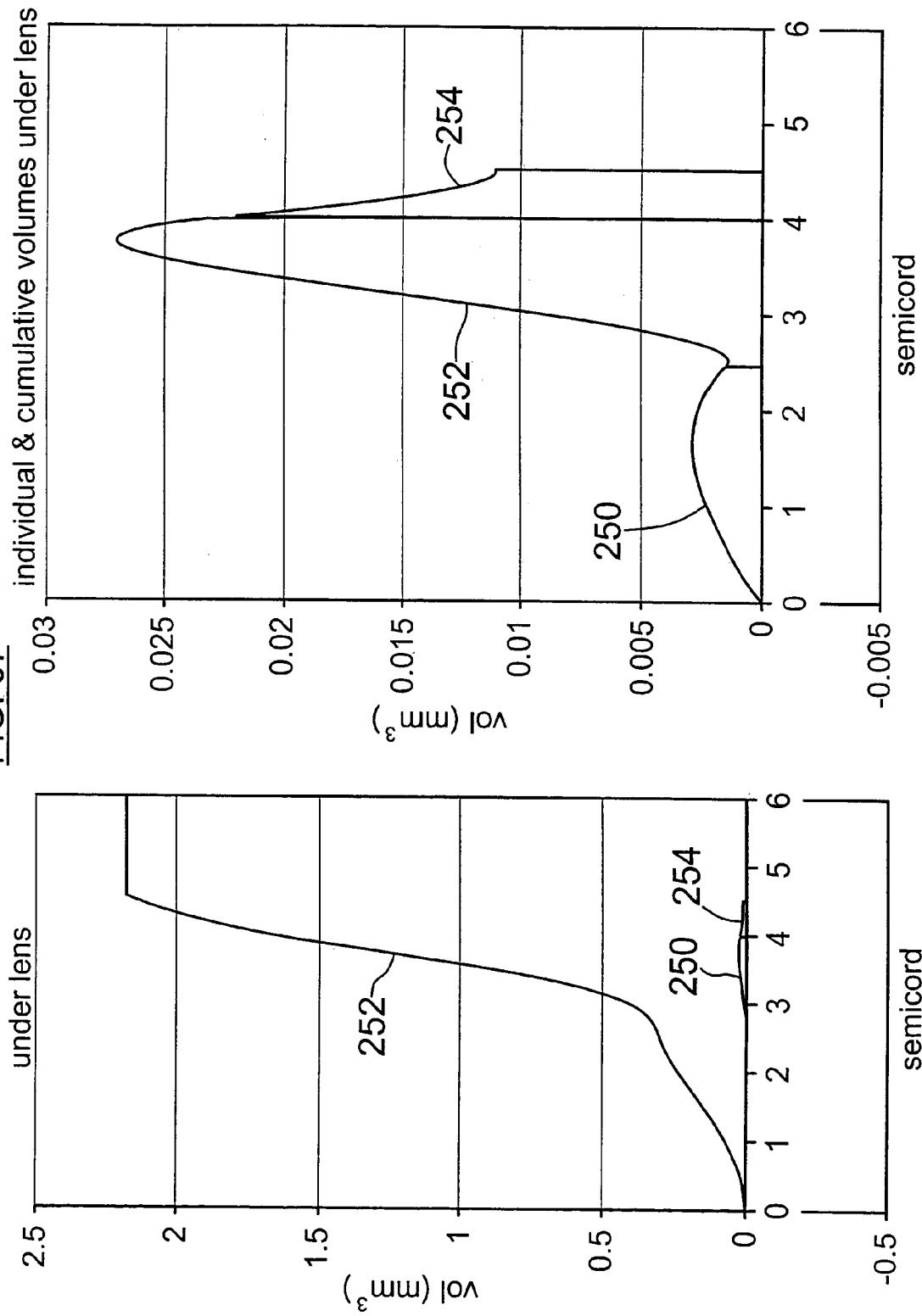
Figure 38:
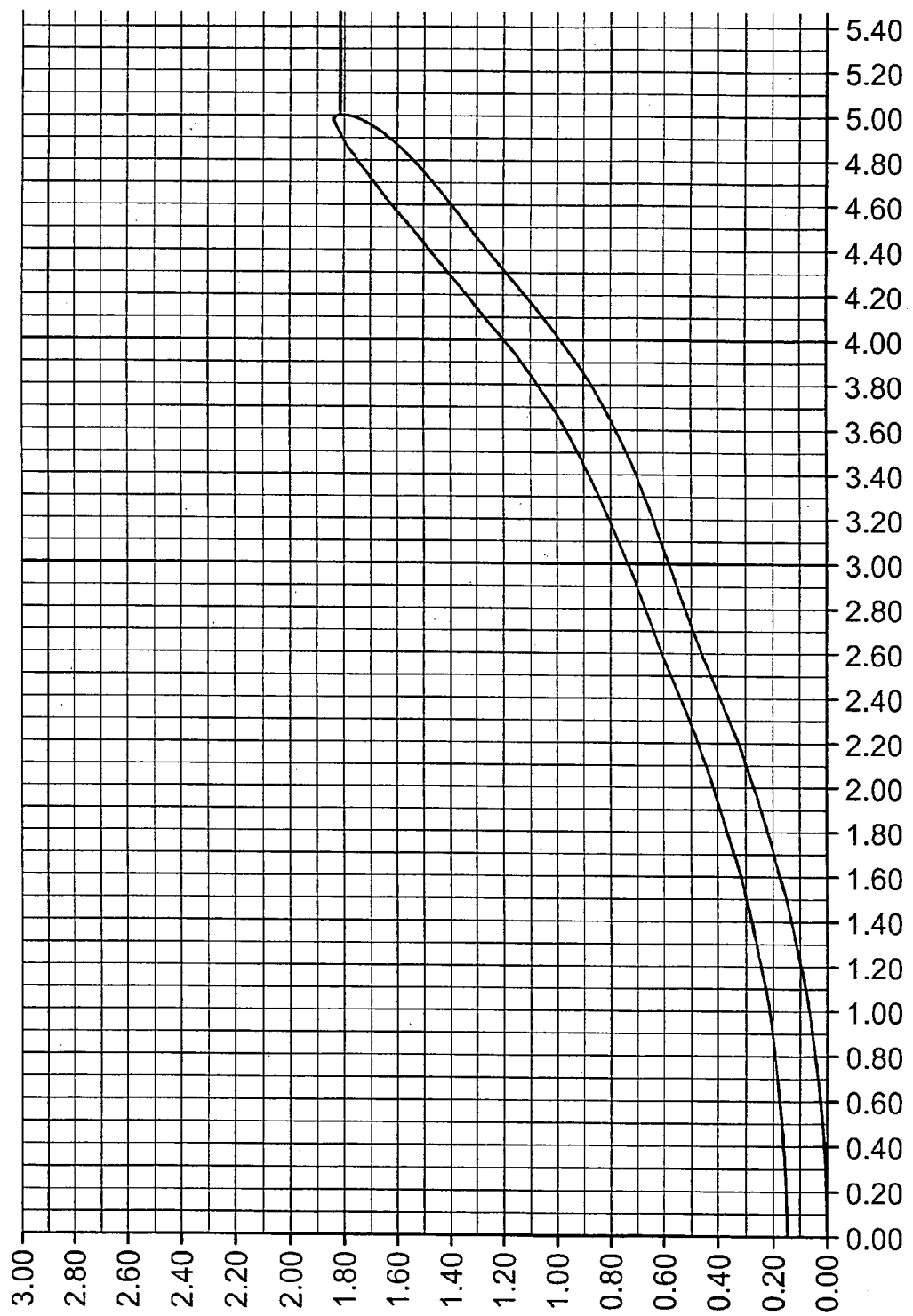
Figure 39:
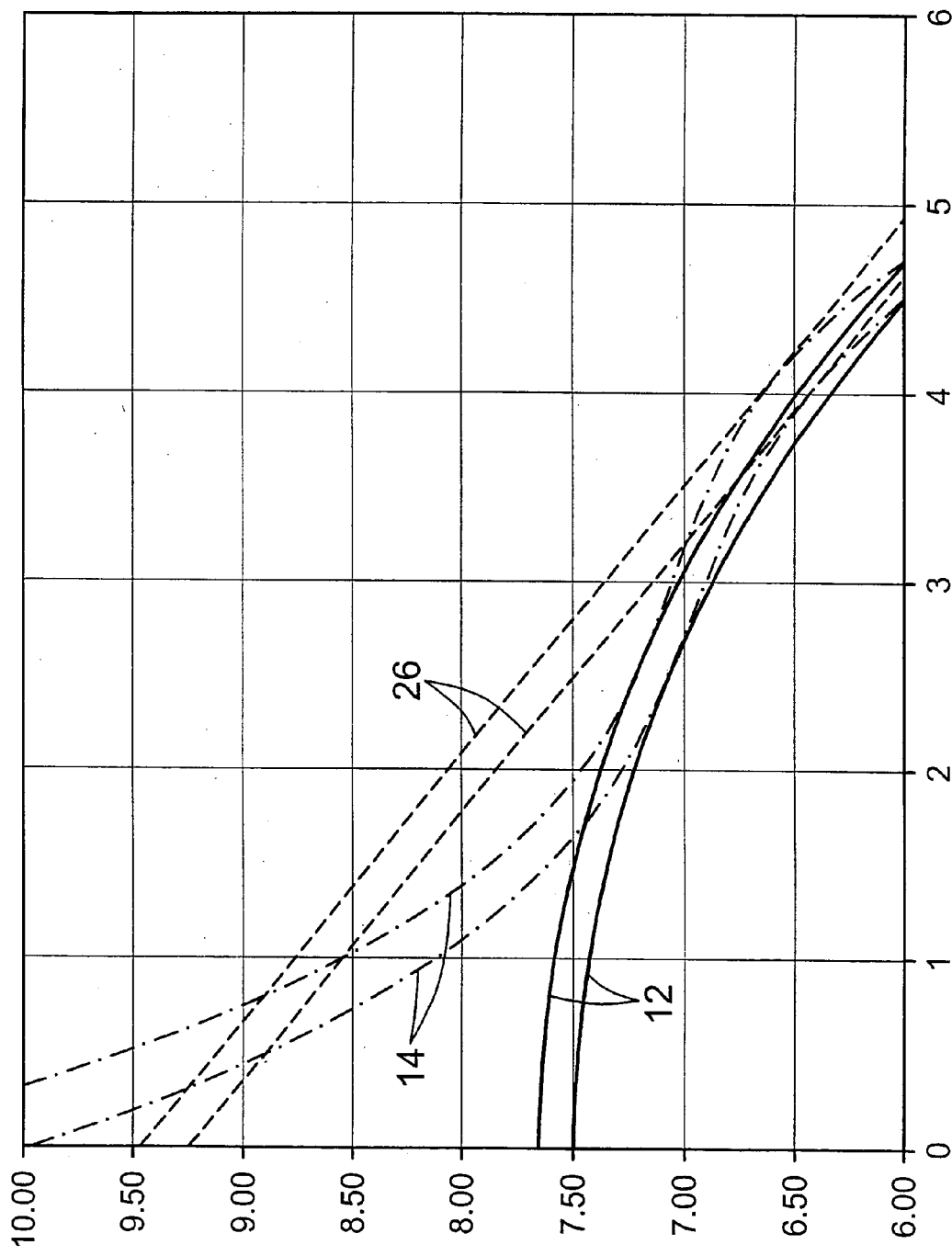

For a patient 6 having a hyperopic prescription, the lens was designed as follows: The lens design for the hyperopic condition of patient 6 is shown in FIGS. 35–39. The lens is designed to provide a lens/cornea power difference for patient 6 of 2.0 diopters as indicated at 200 in FIG. 35. The selected base curve has a 7.50 mm radius, as indicated at 208. The power difference may again be selected as slightly more than the degree of correction required for the patient, if desired. Other parameters of the lens may be chosen similarly to that previously described, such as lens diameter. The lens is then designed to have a narrower central zone, with the radial distance from the lens center to the junction between the base curve and the sigmoidal curve, indicated at 210, being reduced to 2.5 mm in this example. In turn, the width of the sigmoidal curve at 212 is increased to 1.5 mm. The height above the pretouch peripheral zone and cornea is somewhat less in this example, indicated as 0.024 mm at 244. Similarly, the volume between the pretouch peripheral zone and cornea is less in this example, indicated as 0.491 (uL) at 246, and as shown in FIG. 37. The apical separation of the lens from the cornea is chosen to ensure the base curve doesn't penetrate the cornea, as indicated in the graph of FIG. 36 at 250.

As previously mentioned, it may be desirable in practice to limit the number of variables which are modifiable to design the lens for simplifying the design process. As an example, lenses can be designed limiting the variables to BC, DIA, sigmoidal curve depth and peripheral zone angle. The patients and lenses in the examples include relative extremes, one could imagine unusual problems that might occasionally arise with such patients. In the examples, additional parameters were then modified as needed to alleviate any problems in properly fitting the unusual patient. All patients were successfully fit as the graphs and measures show. Other variables beyond the BC, DIA, sigmoid curve depth and peripheral zone angle can then be used to treat these special cases. Additional variables include but are not limited to: Thick center/thin edge, such as shown in Example 2, which has very high cylinder and eccentricity warpage was possible. For Patient 3 which had a very high correction, requiring a big discrepancy between corneal radius and base curve, this led to a large volume at junction 1 so in this case the central zone diameter was reduced and the connector zone widened with the expected result bringing the connector closer to the cornea and reducing bubble possibilities. The low eccentricity exhibited by patient 3 has led to high edge lift and junction 2 elevation. A smaller diameter and lower angle would solve this problem if the patient found the lens uncomfortable.

Patient 4 was prescribed a very large diameter lens, allowed by their large HVID to assure good centration on his high correction and cylinder This will reduce oxygen under the lens from tear movement, and a thin center was provided. Extra thickness on the outside was added to minimize warpage but to make this thick edge comfortable the edge zone was extended to 2 mm and the dividing line moved away from the base curve for extra tear pumping.

Patient 5 is very spherical with high eccentricity, such that the lens will hug the cornea, thickness could lead to excessive movement so this patient offers an opportunity for extra oxygen and comfort with the thin profile throughout. As seen in FIG. 18 as an example, showing the relationship between front and back surfaces, the anterior surface is designed to substantially mirror the posterior surface zone 12 and peripheral zone 26, while the connecting zone 14 is designed such that the posterior and anterior curves deviate from one another to a predetermined degree. As mentioned previously, the front or anterior surface may be designed such that there is different spacing between the surfaces from the apical point to the peripheral edge of the lens, for example to provide better oxygen transmission to the center of the lens and yet provide desired structural support at the periphery of the lens. The spacing difference is easily adjusted by adjusting the length and width of the anterior sigmoidal curve as compared to the posterior sigmoidal curve. As shown in FIG. 17, a semi-meridian section of an alternative embodiment is shown to include varying thickness toward the periphery of the lens.

Figure 40:
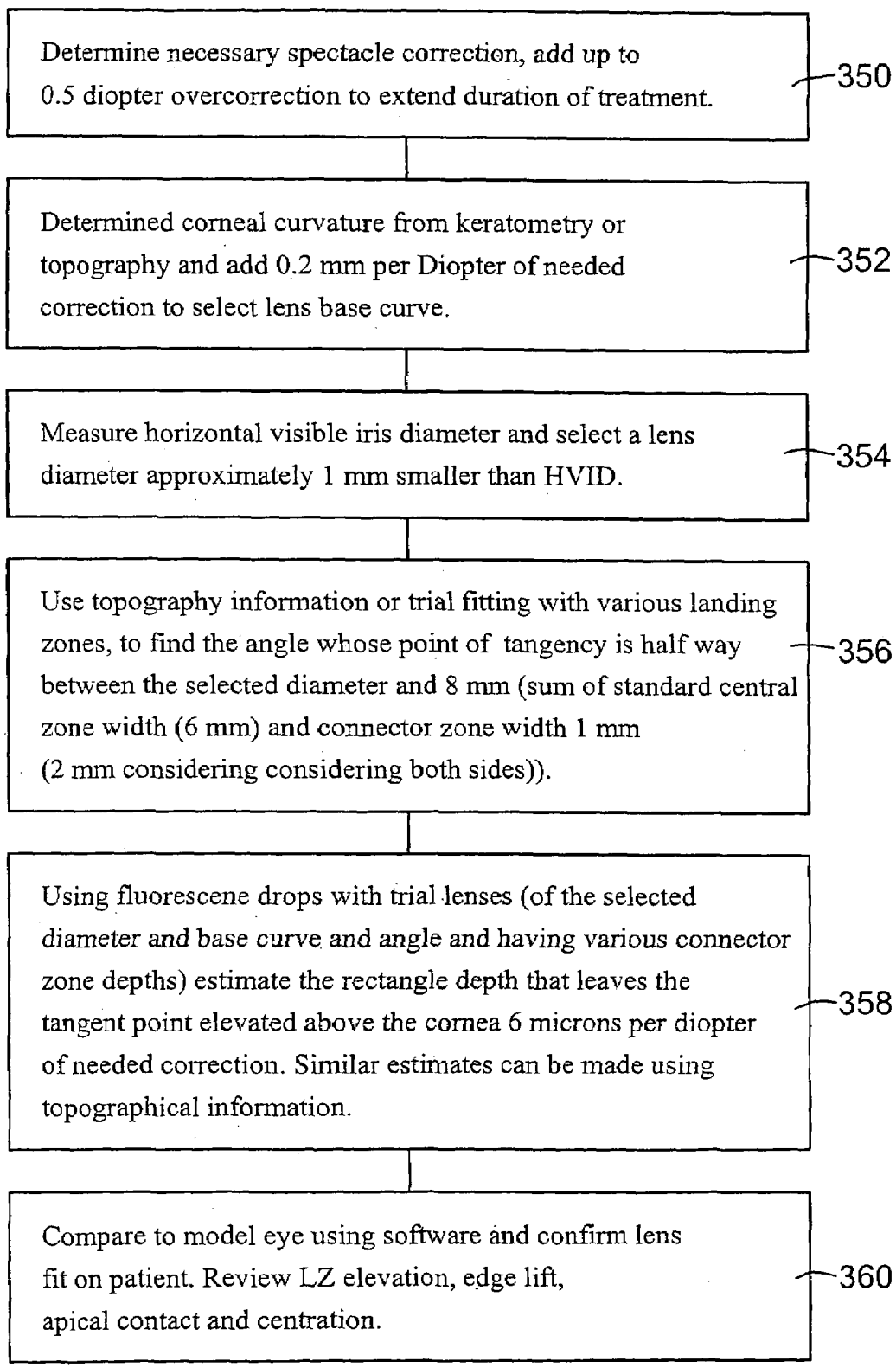
FIG. 40 shows a method of fitting a patient in an embodiment of the invention.

In accordance with the lens design as described according to the present invention, it is then possible to provide a method of fitting a patient with an CRT for treatment, such as shown in FIG. 40. The patient's visual acuity and corneal curvature is measured at 350 to determine the present shape of the cornea and enable a practitioner to select a base curve for correction of the corneal shape to a desired degree. The determination of the base curve of the central zone to affect desired corneal reshaping at 352 is then made, providing the design of the central zone 12. Thereafter, at 354, the diameter of the lens is determined, such as by measurement of the HVID. The slope of the peripheral zone may then be selected at 356, to in effect provide the design of the central zone 12 and peripheral zone 26 relative to a given patients cornea and the desired correction to be imparted. With this information, the sigmoidal curve of the connecting zone 14 is designed at 358 for connecting the base curve 12 and peripheral zone 26. The proper rectangle depth for the sigmoidal curve which leaves the tangent point elevated to a predetermined height above the cornea can be determined at 358, with the fitter able to compare the lens design to a model eye, by fluoroscene with trial lenses, or topographical information. If necessary, the relationship of the lens zones to the cornea can be adjusted by varying the connector zone depths. The lens design can then be compared to a model eye using software, and trial lenses can be fit on the patient to verify the lens design, and particularly the design of each of the independent zones 12, 14 or 26 as shown at 360.

As previously mentioned, the method of fitting as described may account for a series of lenses, designed to progressively impart partial correction to the corneal shape until the final desired correction is achieved. In the method of fitting, adjustment of the lens design, visualization and assessment of the lens design, and the ability to teach and communicate design variables to a fitter are facilitated and enabled by the lens design itself. The method of fitting could utilize adjustments in the sagittal depth of the lens 10 to adjust the corneal reshaping characteristics of the lens by changing the axial length of the connecting zone 14. Adjustments of the axial length of the connecting zone 14 result in directly corresponding changes in the sagittal depth of the lens 10. Similarly, the method of fitting may include varying the volume distribution of the void space created adjacent the base curve 12 in association with the connecting zone 14. As previously mentioned in a CRT and/or Ortho K treatment process, the characteristics of this void space enable corneal tissue to be redistributed in the desired manner. Changes to the volume of this space may be provided by varying the diameter of the central zone 12, the axial length of the connecting zone and the radial width of the connecting zone, without otherwise affecting the lens design and fit. The method of fitting also allows changes to the radial location of possible tangential contact of the redistributed cornea to the peripheral zone 26 by varying the angle of the peripheral zone 26 to the central axis of the lens, again without otherwise affecting the lens design and fit. The edge contour which may be desired in the peripheral zone 26 is also easily adjusted by changing the extension of the lens beyond the point of possible tangential contact of the peripheral zone with the cornea of the wearer. The edge profile itself is also easily modified by changing the axes of imaginary ellipses, and the location of the imaginary dividing line between the posterior and anterior ellipses.

The method of fitting can thus allow the manufacture of a lens set having the central zone diameter, connecting zone width, lens diameter and edge profile provided with predetermined shapes. With such a lens set, the fitter then measures the preferred corneal curvature needed to eliminate refractive error for a patient, and may measure the central corneal curvature of the patient's cornea. Thereafter, the fitter need only determine two parameters, the connecting zone depth and peripheral zone angle from fitting or computer modeling. As previously described, the parameters of connecting zone depth and peripheral zone angle may be derived by fitting lenses from a fitting set having a fixed connecting zone depth with a series of base curves or a fixed base curve with a series of connecting zone depths and another set having a fixed connecting zone depth with a series of peripheral zone angles from which the final selection is derived. Again, it is also possible to provide the set of fitting lenses with a plurality of visible concentric rings as mentioned with respect to FIG. 4, to determine the lens diameter at which substantially tangential touch occurs between the lens and the cornea, and thereby determine the angle of the at least one peripheral zone.

Figure 41:
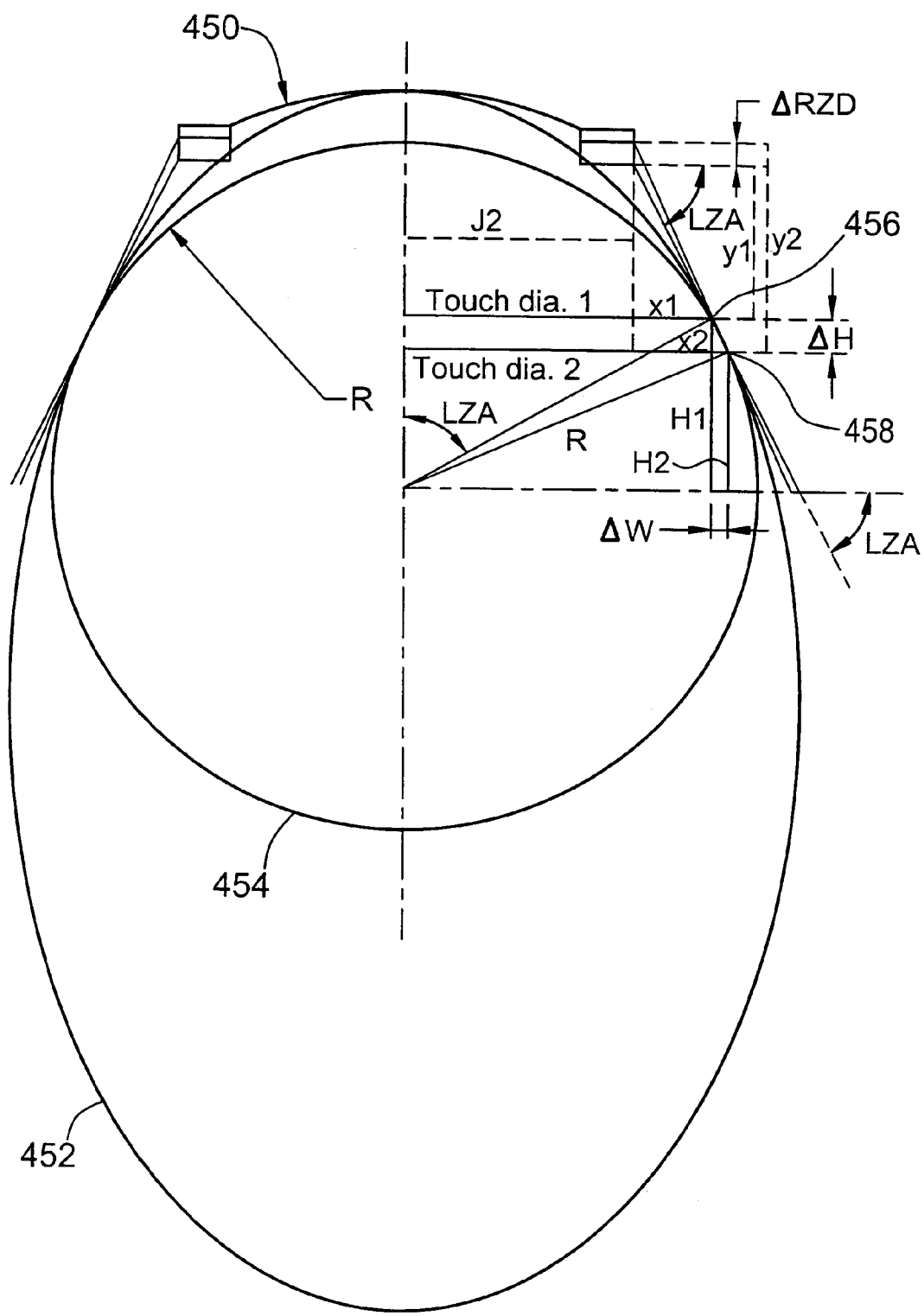
FIG. 41 shows a schematic representation of a patient's eye and the lens according to the invention for visualizing the fit therebetween.

As stated previously, the fitting of the lenses is simplified as the fitter is able to easily visualize the fit of the lens in association with a patient' cornea. In FIG. 41, a schematic representation of the patients eye and cornea are shown with the lens design positioned thereon. The actual corneal surface is represented by the ellipse at 452. In assessing the fit of the lens 450 on the cornea 452, particularly at the peripheral regions where the peripheral zone of the lens is positioned, the cornea can be approximated by a circle 454 over a portion of the corneal surface. As can be seen, the circle 454 is tangent to the ellipse 452 at the peripheral portion of the cornea. To determine the appropriate fit of the lens 450, the characteristics of the lens can be determined and changes in parameters visualized. From measurement or observation, the fitter provides information regarding a test lens 450 positioned on the patient's cornea, particularly the angle (A1) used in the lens of the test series. As seen in FIG. 41, the lens 450 tangentially touches the cornea represented by the circle 454 at 456 relating to the touch diameter 1 (TD1). The optimum location, or touch diameter 2 (TD2), for the tangential touch of the peripheral zone as set forth previously is then determined, and shown at 458, yielding a change in the height and width of triangles formed between the center of circle 454, the touch diameters TD1 and TD2 and the line perpendicular to a vertical radius of the sphere 454. With these parameters identified, the change in the height and width result in a change in the connecting zone depth (RZD). The radius of the sphere 454 to be determined relating to the spherical cornea which would have a tangential contact with a line at angle A1 from a line perpendicular to a vertical radius of the sphere by Eq. 9:

$$R = \frac{TD1/2}{SIN(A1)} \qquad \text{(Eq. 9)}$$

where H is the distance along the vertical radius of the sphere from the origin to the intersection with the sag diameter passing through the tangential point when A1 is fitted by Eq. 10.

$$H1 = \frac{TD1/2}{TAN(A1)} \quad \text{(Eq. 10)}$$

Using R from above, we can calculate TD2 and H2 by Eqs. 11 and 12:

$$TD2 = 2*R*SIN(A2) \quad \text{(Eq. 11)}$$

$$H2 = R*COS(A2) \quad \text{(Eq. 12)}$$

The difference between the height for A1 and A2 is found by subtraction, as is the difference in sagittal diameter. Both of these values are arranged to yield positive values when A2>A1 by Eqs. 13 and 14.

$$\Delta H = H1 - H2 \quad \text{(Eq. 13)}$$

$$\Delta W = 2*(TD2/2 - TD1/2) \quad \text{(Eq. 14)}$$

Considering the smaller triangles in the upper right of FIG. 41, where x and y are the horizontal and vertical components respectively, these coordinates are found as follows:

$$x1 = TD1/2 - J2 \quad \text{(Eq. 15)}$$

$$y1 = x1*TAN(A2) \quad \text{(Eq. 16)}$$

$$x2 = TD2/2 - J2 \quad \text{(Eq. 17)}$$

$$y2 = x2*TAN(A2) \quad \text{(Eq. 18)}$$

From this, the change in the connecting zone depth RZD is determined $$\Delta RZD = y1 - y2 \quad \text{(Eq. 19)}$$

with the relationship between peripheral zone angle and connecting zone depth seen to correspond in a manner the fitter can visualize and verify proper fit of the lens. In the example shown in FIG. 41, the RZD change is only the component due to an angle change, and base curve changes must be independently considered. In this example, the original parameters observed relating to the fit of the fitting lens and the resultant changed parameters are given as follows:

| | | |
|---|---|---|
| J2 radius | 4 | |
| Angle A1 | −32 | RZD change due to angle change only |
| Angle A2 | −33 | −0.023 |
| Touch Diameter | 9.75 | 10.02083 touch diameter after change |

The present invention also provides for a method of establishing centration over the visual axis of the lens by adjusting the location of possible peripheral tangential contact and the extension of the lens beyond the point of peripheral contact of the lens with the cornea.

This ability in the lens design would allow better fitting of any contact lens, not just for corneal refractive therapy, and would enhance comfort and provide other advantages by maintaining centration of the visual axis over the cornea.

The present invention is also directed at a computer program product for designing orthokeratology contact lenses. A person of ordinary skill in the art would appreciate that the invention may be embodied as a method, data processing system, or computer program product. As such, the present invention may take the form of an embodiment comprised entirely of hardware, an embodiment comprised entirely of software, or an embodiment combining software and hardware aspects. In addition, the present invention may take the form of a computer program product on a computer-readable storage medium having computer-readable program code embodied in the medium. Any suitable computer-readable medium may be utilized including hard disks, flash memory cards, CD-ROMs, optical storage devices, magnetic storage devices or the like.

The method of fitting and the computer program product of the invention are described with reference to flow charts or diagrams that illustrate methods, and systems, and the computer program product. It should be understood that each block of the various flow charts, and combination of blocks in the flow charts, can be implemented by computer program instructions. Such computer program instructions can be loaded onto a general-purpose computer, special purpose computer, or other programmable data processing device to produce a machine, such that the instructions that it executes on the computer or other programmable data processing apparatus, create means for implementing the functions specified in the flow charts. The computer program instructions can also be stored in a computer-readable memory that directs a computer or other programmable data processing device to function in a particular manner, such that the instructions stored in the computer-readable memory produce an article of manufacture including instruction means which implement the functions specified in the flow charts or diagrams. The computer program instructions may also be loaded onto a computer or other data processing apparatus to cause a series of operational steps to be performed on the computer, to produce a computer implemented process, such that the instructions which execute on the computer or other programmable apparatus provide steps for implementing the functions specified in the flow charts or diagrams.

It will also be understood that blocks of the flow charts support combinations of means for performing the specified functions, combinations of steps for performing the specified functions and program instructions means for performing the specified functions. It is also to be understood that each block of the flow charts or diagrams, and combination of blocks in the flow charts or diagrams, can be implemented by special purpose hardware-base computer systems which perform the specified functions or steps, or combinations of special purpose hardware and computer instructions.

The software program of the present invention could be written in a number of computer languages, and any suitable programming language is contemplated. It is also to be understood that various computers and/or processors may be used to carry out the present invention, including personal computers, main frame computers and mini-computers.

Figure 42:
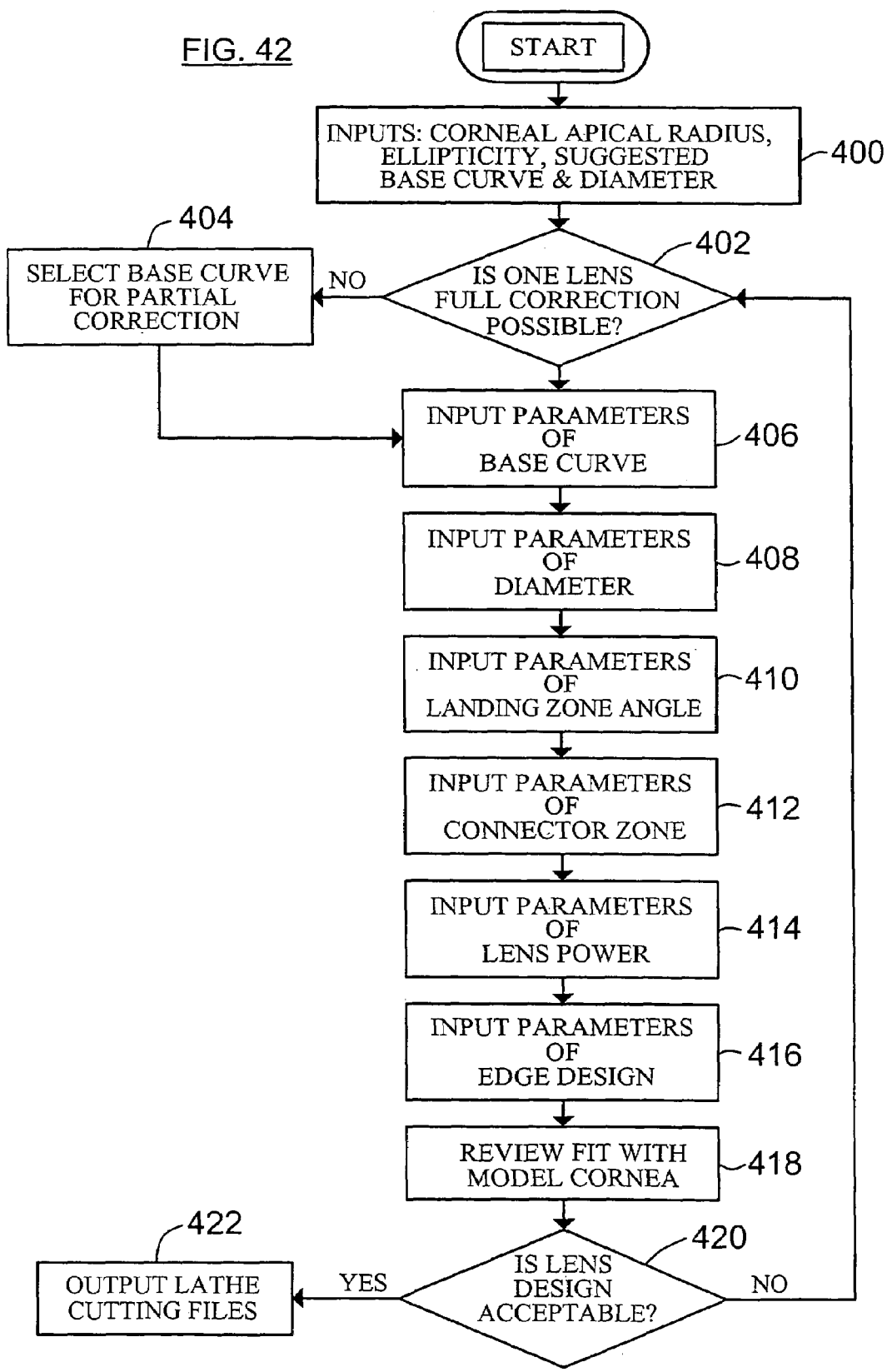
FIG. 42 shows a flowchart for a computer program according to an embodiment of the invention.

In FIG. 42, the user first inputs the corneal apical radius and ellipticity, as well as the suggested base curve for correction of visual defects of a patient at 400. It is then determined whether a base curve is available for total correction of the visual defects of the patient at 402. If not, the user selects a base curve for partial correction at 404, or if such a base curve is available, the user inputs the base curve and the diameter of the selected curve at 406. The user then inputs the parameters of the diameter at 408, and selects the parameters of the peripheral zone angle at 410. The parameters of the sigmoidal curve are input at 412 as well as the lens power at 414. The parameters of the edge design may be input at 416. The lens is designed using the input parameters, and the relationship of the designed lens to a model cornea is determined at 418. From this analysis, it is determined whether the lens design is acceptable at 420, and if not the system returns to selection of a base curve at 402 or redesign of the other zones for redesign of the lens.

In an embodiment of the invention, a hand-held computer, such as a Personal Digital Assistant (PDA), is programmed with the computer program of the invention, to compute the best lens fit from the fitters observations. The program may utilize different approaches as previously described, such as the angle series of fitting lenses wherein the fitting lens set has a fixed base curve with a series of connecting zone depths and another set having a fixed connecting zone depth with a series of peripheral zone angles from which the final selection is derived. Another approach as described may utilize the fitting lenses having concentric visible rings to determine the diameter of the desired tangential touch and compute the angle of the peripheral zone. In both methods, the computer program will prompt the user for inputs relating to a flat keratometry reading on the patient, the patients refractive error, the final target refractive error (usually piano but may be different), the horizontal visible iris diameter and the lens code for the fitting set lens that just touched centrally and peripherally. The program will prompt the user for the angle of the lens from the angle series of fitting lenses whose tangential touch was at the preferred location as described. The other method requests the diameter at which fitting set lenses (all having the same angle) displayed their ring of tangential touch.

Upon determining an acceptable design, lathe parameters and cutting data is calculated and generated at 422. As previously mentioned, based upon the lens characteristics according to the invention, it is possible to provide "unfinished base curve buttons" to be inventoried by lens finishing labs or other similar entities. Using the unfinished base curve button, a lens finishing lab may be given the lathe parameters and cutting data for a particular lens, which are simply downloaded to a computer controlled lathe for generating the particular lens design for a patient. In the unfinished base curve button, the buttons may be provided with a portion of the finished edge at a fixed diameter or may be provided with the maximum diameter to be commercially provided. In the latter case, when the fitter specifies the required diameter, the lenses can be cut down to that diameter in the area of the peripheral zone without any effect upon the rest of the precut portions of the lens. Thus, one button having particular base curve and sigmoidal curve characteristics may be used for all possible peripheral zone diameters. Further since all aspects of lens optical power are provided on the anterior surface of a finished lens, a base curve selected to fit a particular patient may be employed to make a lens of nearly any optical power. This inventory advantage exists even if the button is already provided with a predetermined diameter and edge contour. In this way, the number of buttons to be inventoried is minimized, while providing significant flexibility in the ultimate lens design. The ability to provide lathe cutting instructions to the finishing lab also greatly simplifies manufacture of a lens according to the invention, again greatly facilitating use of such lenses as well as reducing costs thereof and assuring reproducibility regardless of the lab of origin.

The present invention may also accommodate multifocals and astigamatic lenses, both of which use the design according to the invention, but toric lenses for astigmatism and/or improved peripheral fit (on non-spherical eyes). With the design approach, this allows the designer to choose two orthogonal meridians of corneal shape, and designing a corresponding portion in the lens for each separately. Present lathe technology can accept designs that vary in two meridians, and the design of the invention makes programming these lathes as easy as non-toroidal designs. One simply subtracts the z axis value of one meridian at each x point and uses this data as difference data to be used by the lathe during each rotation. The technique is not limited to two orthogonal meridians, but could incorporate many such meridians.

One of the benefits of the present invention is the ability to precisely control the elevation of the lens center with respect to the corneal surface. In CRT, the center of the lens may contact the central cornea, but some situations exist where one wishes to minimize or eliminate this contact. In normal rigid lenses, this control is obviated by the use of base curves that mimic the corneal surface, and thus no change arises as a result of the contact. But in some situations, it is desirable to have a different geometry on the base curve. Presbyopic lenses with multiple curves are a case in point, though other situations also exist. Being able to support a lens off of the corneal surface can make many new base curve geometry designs possible, as multifocals are an example. It is also possible to provide the base curve with a geometry which when that geometry is impressed on the cornea could make it multifocal. Such base curves may thus be formed with one or more spherical or aspherical zones to provide these characteristics. The benefits are obvious, such as allowing a patient to wear contact lenses while they sleep to avoid wearing reading glasses during the day. Examples of other applications for the present invention could also include providing a corneal shape controlling device to control or improve laser surgery. Use of the invention could reduce failures and annoying compromises.

The foregoing disclosure is illustrative of the present invention and is not to be construed as limiting the invention. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention, and are not to be construed as limited to the specific embodiments disclosed.

What is claimed is:

1. A corneal contact lens comprising
   a central zone having a posterior surface curvature,
   a connecting zone having a posterior surface and provided adjacent to said central zone, said connecting zone having a shape defined as a sigmoidal curve, and
   at least one peripheral zone having a posterior surface and provided adjacent to said connecting zone, wherein the sigmoidal curve of the connecting zone is spaced from the cornea substantially over its extent to create a void space thereunder when the lens is positioned on the cornea of a patient.

2. A corneal contact lens according to claim 1 wherein the curvature of the central zone is spherical.

3. A corneal contact lens according to claim 1 wherein the curvature of the central zone is aspherical.

4. A corneal contact lens according to claim 3 wherein the curvature of the central zone comprises a combination of annular spherical and aspherical zones.

5. A corneal contact lens according to claim 1 wherein the central zone, connecting zone and at least one peripheral zone each have appreciable width, such that the central zone overlays a significant portion of the central cornea and the at least one peripheral zone overlays a significant portion of the peripheral cornea.

6. A corneal contact lens according to claim 1 wherein the meridional profile of the connecting zone is shaped such that the portion adjacent the central zone is matched to the slope of the central zone and the portion adjacent the peripheral zone is matched to the slope of the at least one peripheral zone.

7. A corneal contact lens according to claim 1 wherein the meridional profile of the connecting zone is specified by a predetermined axial length and horizontal width.

8. A corneal contact lens according to claim 1 wherein each of the zones is independently designed, and the junctions between the connecting zone to the central zone and the at least one peripheral zone require substantially no polishing or blending.

9. A corneal contact lens according to claim 7 wherein the meridional profile of the connecting zone is described by $$y_s := A \cdot x^3 + B \cdot x^2 + C \cdot x + D \qquad \text{(Eq. 1)}$$

with the Y value for the junction ($J_1$) between the central zone and connecting zone defined by the equation $$y_{j1} := \sqrt{r_b^2 - J_1^2} \qquad \text{(Eq. 2)}$$

wherein $r_b$ is the radius of the central zone, and the X value for the junction ($J_2$) between the connecting zone and peripheral zone defined by the equation $$x_{j2} := J_1 + W \qquad \text{(Eq. 3)}$$

while the Y value for the junction $J_2$ is defined by the equation $$y_{j2} := y_{j1} - L \qquad \text{(Eq. 4)}$$

with the coefficients A, B, C, D of Equation 1 are defined by Equations 5–8 as follows:

$$A := \frac{-\left[\frac{-1}{(2 \cdot J_1 - 2 \cdot x_{j2})} \cdot M - \frac{1}{\left[(2 \cdot J_1 - 2 \cdot x_{j2}) \cdot \sqrt{r_b^2 - J_1^2}\right]} \cdot J_1 + \frac{1}{(J_1^2 - 2 \cdot J_1 \cdot x_{j2} + x_{j2}^2)} J_1 \cdot M + \frac{1}{(J_1^2 - 2 \cdot J_1 \cdot x_{j2} + x_{j2}^2)} y_{j2} - \frac{1}{(J_1^2 - 2 \cdot J_1 \cdot x_{j2} + x_{j2}^2)} \cdot x_{j2} \cdot M - \frac{1}{(J_1^2 - 2 \cdot J_1 \cdot x_{j2} + x_{j2}^2)} \cdot \sqrt{r_b^2 - J_1^2}\right]}{\left[\frac{-3}{(2 \cdot J_1 - 2 \cdot x_{j2})} \cdot J_1^2 + \frac{3}{(2 \cdot J_1 - 2 \cdot x_{j2})} \cdot x_{j2}^2 + \frac{1}{(J_1^2 - 2 \cdot J_1 x_{j2} + x_{j2}^2)} \cdot J_1^3 - \frac{3}{(J_1^2 - 2 \cdot J_1 \cdot x_{j2} + x_{j2}^2)} \cdot J_1 \cdot x_{j2}^2 + \frac{2}{(J_1^2 - 2 \cdot J_1 \cdot x_{j2} + x_{j2}^2)} \cdot x_{j2}^3\right]} \qquad \text{(Eq. 5)}$$

-continued $$B := \frac{-\left(A \cdot J_1^3 - 3 \cdot J_1 \cdot A \cdot x_{j2}^2 + J_1 \cdot M + y_{j2} + 2 \cdot A \cdot x_{j2}^3 - x_{j2} \cdot M - \sqrt{r_b^2 - J_1^2}\right)}{(J_1^2 - 2 \cdot J_1 \cdot x_{j2} + x_{j2}^2)} \qquad \text{(Eq. 6)}$$

$$C := -3 \cdot A \cdot x_{j2}^2 - 2 \cdot B \cdot x_{j2} + M \qquad \text{(Eq. 7)}$$

$$D := y_{j2} + 2 \cdot A \cdot x_{j2}^3 + B \cdot x_{j2}^2 - x_{j2} \cdot M \qquad \text{(Eq. 8)}.$$

10. A corneal contact lens according to claim 1 wherein the meridional profile of the at least one peripheral zone is substantially uncurved over at least a substantial portion thereof.

11. A corneal contact lens according to claim 1 wherein the meridional profile of the at least one peripheral zone includes a width which is substantially flat and is terminated by a rounded shape directed away from the underlying cornea, to thereby provide edge lift.

12. A corneal contact lens according to claim 1 wherein the meridional profile of the at least one peripheral zone is modeled as the quadrant of an ellipse having an ellipse center on an imaginary dividing line between the posterior and anterior surfaces of the lens which merges with the profile of the at least one peripheral zone and replaces that portion of the meridional profile of the peripheral zone in that region beyond the intersection of the short axis of the ellipse and the profile of the peripheral zone.

13. A corneal contact lens according to claim 12 wherein the dividing line is chosen to be at a location 10 to 90% of the thickness of the lens from the posterior to the anterior surfaces and the long axis of the ellipse chosen to be about 0.01 mm to 2.0 mm in length.

14. A corneal contact lens according to claim 1 wherein the anterior surface of said lens is comprised of surfaces selected from the group consisting of contiguous spherical surfaces, contiguous aspherical surfaces, toric surfaces or combinations thereof.

15. A corneal contact lens according to claims 1 wherein the anterior surface of said lens is made to substantially the same shape as the posterior surface of said contact lens.

16. A corneal contact lens according to claim 1, wherein the posterior curve of said central zone in combination with the anterior surface curve will yield a desired optical power in the central zone of said contact lens.

17. A corneal contact lens according to claim 1 wherein the anterior surface of said contact lens is designed to have analogous elements to said posterior surface and said analogous elements of the anterior and posterior surfaces are equally spaced from each other.

18. A corneal contact lens according to claim 1 wherein different meridional surface profiles for each of said zones are designed at different angles of rotation about the lens central axis.

19. The corneal contact lens of claim 1, wherein each of the central, connecting and at least one peripheral zones has a width over 1.0 mm.

20. The corneal contact lens of claim 1, wherein the lens is designed to impart desired forces to said cornea to alter the shape of the cornea in a predetermined manner.

21. A corneal contact lens comprising
   a central zone having a posterior surface curvature, wherein the curvature of the central zone is toric, a connecting zone having a posterior surface and provided adjacent to said central zone, said connecting zone having a shape defined as a sigmoidal curve, and at least one peripheral zone having a posterior surface and provided adjacent to said connecting zone, wherein the sigmoidal curve of the connecting zone is spaced from the cornea substantially over its extent to create a void space thereunder when the lens is positioned on the cornea of a patient.

22. A corneal contact lens comprising a central zone having a posterior surface curvature, wherein the central zone is designed to correct presbyopia without contacting the cornea, a connecting zone having a posterior surface and provided adjacent to said central zone, said connecting zone having a shape defined as a sigmoidal curve, and at least one peripheral zone having a posterior surface and provided adjacent to said connecting zone.

23. A corneal contact lens comprising a central zone having a posterior surface curvature, wherein the central zone is designed to correct presbyopia by reshaping the cornea, a connecting zone having a posterior surface and provided adjacent to said central zone, said connecting zone having a shape defined as a sigmoidal curve, and at least one peripheral zone having a posterior surface and provided adjacent to said connecting zone.

24. A corneal contact lens comprising a central zone having a posterior surface curvature, a connecting zone having a posterior surface and provided adjacent to said central zone, said connecting zone having a shape defined as a sigmoidal curve, and at least one peripheral zone having a posterior surface and provided adjacent to said connecting zone wherein the at least one peripheral zone is formed as a truncated conoid.

25. A corneal contact lens comprising a central zone having a posterior surface curvature, a connecting zone having a posterior surface and provided adjacent to said central zone, said connecting zone having a shape defined as a sigmoidal curve, and at least one peripheral zone having a posterior surface and provided adjacent to said connecting zone wherein the at least one peripheral zone is formed as a truncated conoid and the meridional profile of the at least one peripheral zone is described by the angle it makes with a line perpendicular to the central axis of the lens, its curvature and its extension.

26. A corneal contact lens comprising a central zone having a posterior surface curvature, a connecting zone having a posterior surface and provided adjacent to said central zone, said connecting zone having a shape defined as a sigmoidal curve, and at least one peripheral zone having a posterior surface and provided adjacent to said connecting zone, wherein the anterior surface of said contact lens is designed to have analogous elements to said posterior surface and said analogous elements of the anterior and posterior surfaces are unequally spaced from each other.

27. A corneal refractive therapeutic contact lens for selectively altering the curvature of a patient's normal cornea, comprising:

a central zone having a posterior surface with a curvature;

a connecting zone having a posterior surface provided adjacent and concentric to said central zone, and at least one peripheral zone having a posterior surface provided adjacent and concentric to said connecting zone, said peripheral zone being integral with said connecting zone and being formed as a truncated conoid, wherein the lens is designed to impart desired forces to a normal cornea to alter the shape of the cornea by redistribution of corneal tissue, wherein the meridional profile of the at least one peripheral zone is modeled as the quadrant of an ellipse having an ellipse center on an imaginary dividing line between the posterior and anterior surfaces of the lens which merges with the profile of the at least one peripheral zone and replaces that portion of the meridional profile of the peripheral zone in that region beyond the intersection of the short axis of the ellipse and the profile of the peripheral zone.

28. A corneal refractive therapeutic contact lens for selectively altering the curvature of a patient's normal cornea, comprising:

a central zone having a posterior surface with a curvature;

a connecting zone having a posterior surface provided adjacent and concentric to said central zone, and at least one peripheral zone having a posterior surface provided adjacent and concentric to said connecting zone, said peripheral zone being integral with said connecting zone and being formed as a truncated conoid, wherein the lens is designed to impart desired forces to a normal cornea to alter the shape of the cornea by redistribution of corneal tissue, wherein the parameters of connecting zone depth and peripheral zone angle are derived by fitting lenses on the cornea of a patient from one or more fitting sets selected from the group of fitting lenses having a fixed base curve and a fixed peripheral zone angle with a series of connecting zone depths, having a fixed connecting zone depth and a fixed peripheral zone angle and a series of base curves, having a fixed connecting zone depth and a fixed base curve with a series of peripheral zone angles, or sets of these three types contain one or more lenses that are marked with a plurality of visible concentric rings.

29. A corneal refractive therapeutic contact lens for selectively altering the curvature of a patient's normal cornea, comprising:

a central zone having a posterior surface with a curvature;

a connecting zone having a posterior surface provided adjacent and concentric to said central zone, and at least one peripheral zone having a posterior surface provided adjacent and concentric to said connecting zone, said peripheral zone being integral with said connecting zone and being formed as a truncated conoid, wherein the lens is designed to impart desired forces to a normal cornea to alter the shape of the cornea by redistribution of corneal tissue, wherein the lens has a plurality of visible concentric rings formed over at least a portion thereof, wherein the lens has a plurality of visible concentric rings formed over at least a portion thereof.

30. A corneal refractive therapeutic contact lens comprising a central zone having a posterior surface curvature, a connecting zone having a posterior surface and provided adjacent to said central zone, said connecting zone having a shape defined as a sigmoidal curve, and at least one peripheral zone having a posterior surface and provided adjacent to said connecting zone, wherein the central zone and the at least one peripheral zone are designed independently from one another such that each of the central and at least one peripheral zone have a width positioned relative to a predetermined portion of the cornea on which the lens is placed, and the connecting zone being designed to connect to the central zone at the periphery of the central zone, and to the at least one peripheral zone at the periphery of the connecting zone, with the connecting zone being shaped such that the portion adjacent the central zone is matched to the slope of the central zone and the portion adjacent the peripheral zone is matched to the slope of the at least one peripheral zone, and wherein the shape of the central and at least one peripheral zone are chosen to redistribute corneal tissue in a desired manner.

31. The corneal contact lens of claim 30, wherein the lens is designed to impart desired forces to said cornea to alter the shape of the cornea in a predetermined manner.

32. A corneal contact lens comprising,
a central zone having a first width,
at least one peripheral zone having a second width, and
a connecting zone positioned between the central and at leas on peripheral zone and having a shape defined by a sigmoidal curve, the connecting zone having a third width, wherein the first and second widths are greater than the third width.

33. The corneal contact lens of claim 32, wherein the lens is designed to impart desired forces to said cornea to alter the shape of the cornea in a predetermined manner.

34. The corneal contact lens of claim 31, wherein the shape of the cornea is altered to correct at least one of the refractive errors selected from the group consisting of myopia, hyperopia, presbyopia and astigmatism.

35. The corneal contact lens of claim 30, wherein, the curvature of the central zone is toric.

* * * * *